(12) United States Patent
Konda et al.

(10) Patent No.: US 7,065,588 B2
(45) Date of Patent: Jun. 20, 2006

(54) METHOD AND SYSTEM FOR DATA TRANSFORMATION IN A HETEROGENEOUS COMPUTER SYSTEM

(75) Inventors: Suresh L. Konda, Washington, DC (US); Michael Collins, Pittsburgh, PA (US); Pranab K. Nag, Pittsburgh, PA (US)

(73) Assignee: Chaavi, Inc., Pittsburgh, PA (US)

( * ) Notice: Subject to any disclaimer, the term of this patent is extended or adjusted under 35 U.S.C. 154(b) by 708 days.

(21) Appl. No.: 09/928,256

(22) Filed: Aug. 10, 2001

(65) Prior Publication Data

US 2003/0041095 A1 Feb. 27, 2003

(51) Int. Cl.
*G06F 15/16* (2006.01)

(52) U.S. Cl. .................................................. 709/246

(58) Field of Classification Search ............... None
See application file for complete search history.

(56) References Cited

U.S. PATENT DOCUMENTS

| | | | |
|---|---|---|---|
| 5,088,032 A | 2/1992 | Bosack | |
| 5,101,451 A | 3/1992 | Ash et al. | |
| 5,119,465 A | 6/1992 | Jack et al. | |
| 5,163,156 A | 11/1992 | Leung et al. | |
| 5,177,680 A | 1/1993 | Tsukino et al. | |
| 5,202,977 A | 4/1993 | Pasetes, Jr. et al. | |
| 5,251,314 A | 10/1993 | Williams | |
| 5,283,887 A | 2/1994 | Zachery | |
| 5,299,304 A | 3/1994 | Williams et al. | |
| 5,406,557 A * | 4/1995 | Baudoin ............... | 370/407 |
| 5,513,323 A | 4/1996 | Williams et al. | |
| 5,608,874 A | 3/1997 | Ogawa et al. | |
| 5,701,423 A | 12/1997 | Crozier | |
| 6,092,114 A | 7/2000 | Shaffer et al. | |
| 6,182,136 B1 | 1/2001 | Ramanathan et al. | |
| 6,339,775 B1 | 1/2002 | Zamanian et al. | |

OTHER PUBLICATIONS

Konda, S. and Nag, P., BABELATOR, A Document Format Translation Service, Oct. 1999, 1 page.
Konda, S. and Nag, P., "Work-Centered Information Management", Oct. 1999, 1 page.
Cormen, Thomas H., et al., "Introduction to Algorithms", The MIT Press, 1989, pp. 469-475; 532-535; 552-558.
Ockerbloom, John, "Mediating Among Diverse Data Formats", Thesis, Carnegie Mellon University, 1998, pp. 1-150.
Ockerbloom, John, "Mediating Among Diverse Data Formats: Thesis Summary", Jan. 14, 1998, pp. 1-14.

* cited by examiner

*Primary Examiner*—John B. Walsh
(74) *Attorney, Agent, or Firm*—Kirk D. Houser; Eckert Seamans Cherin & Mellott, LLC

(57) ABSTRACT

A data transformation system includes clients, which initiate requests for transformation of data between first and second data formats. The system also includes peer transformation servers having data converters and graphs of available transformations between input and output data formats of such servers. The graph includes unidirectional edges, which extend between corresponding pairs of the formats. The servers collectively include one or more converters for each of the edges. The servers receive the requests and select plural intermediate transformations from the first format to plural intermediate formats, and a final transformation from an intermediate format to the second format. Each of the intermediate and final transformations is associated with a corresponding one of the edges. The servers initiate the converters corresponding to the selected transformations, in order to obtain and dispose the data in the second format. A communication network provides communication among the client and servers.

65 Claims, 20 Drawing Sheets

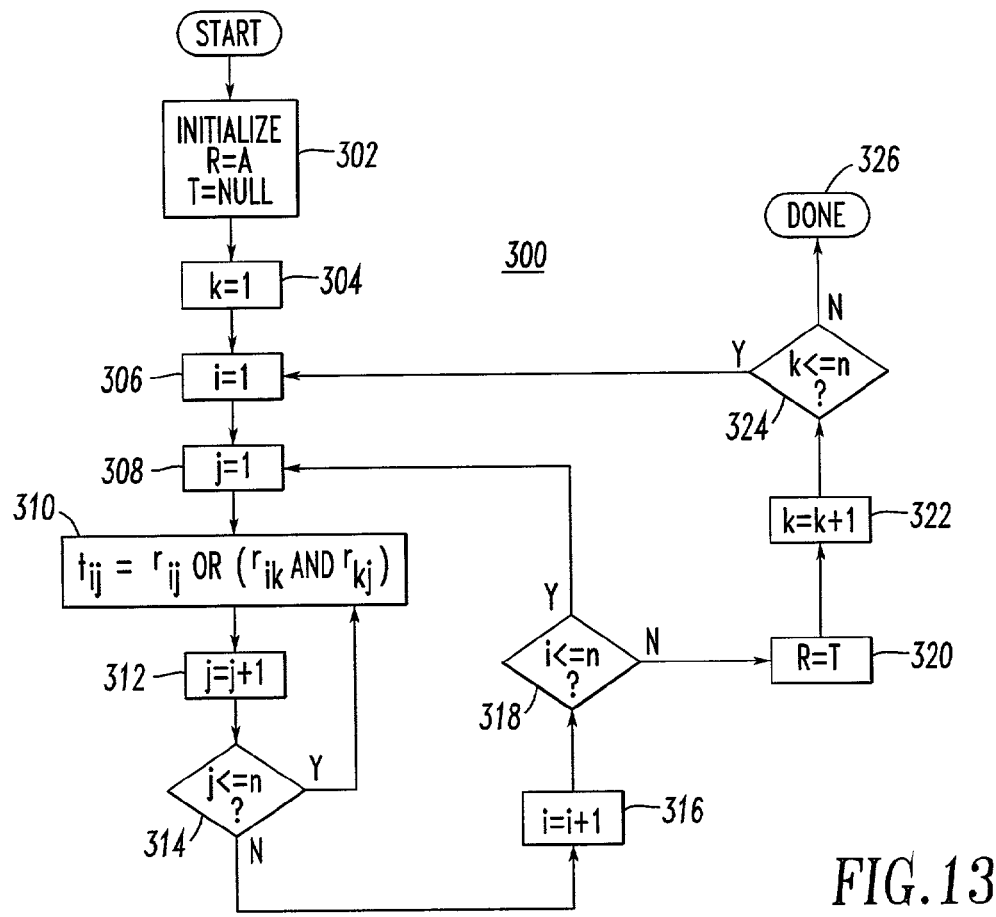

METHOD AND SYSTEM FOR DATA TRANSFORMATION IN A HETEROGENEOUS COMPUTER SYSTEM

BACKGROUND OF THE INVENTION

1. Field of the Invention

The invention relates to systems for transforming data, such as, for example, a file or document format, from one data format to another data format and, in particular, to such systems for use in a heterogeneous computer system. The invention also relates to methods for transforming data.

2. Background Information

Most computer systems are a heterogeneous environment of software, hardware and communication networks. Electronic data is generated by a user employing software known as applications (e.g., word processors) or by devices (e.g., digital cameras, electrocardiogram machines). The electronic data is often referred to as a document or a file. This electronic data may be displayed (e.g., word-processing document, image file, video file), played (e.g., voice file, music file), processed or sent to another point in the computer system to be displayed, played, processed, printed, or transmitted (e.g., by facsimile).

Regardless of its purpose, the electronic data undergoes numerous transformations using a variety of software and hardware. Often, during each of these steps, the language (or the format) of the electronic data is interpreted and then transformed to different format, which is suitable for the next step in the transformation. Sometimes, interpretation of the data format may not be necessary when the data is simply encoded or encapsulated perhaps for transmission across the network or encrypted for security. Quite often, the transformation may be accomplished by an expert in interpreting and translating the electronic data, such as, for example, voice transcriptions and filling standard forms in an office environment. In essence, electronic document transformation is essential and ubiquitous in a networked world. The required transformations may be completely automatic, as is the case, for example, when an e-mail message/attachment undergoes numerous transformations in a sequence decided by pre-configured sequencing of software and hardware tools. The transformation may also be initiated by a user, for example, as in the transformation of word processing documents to PDF (Portable Document Format) or through printing of such documents by a printer.

Not all transformations are always straightforward or even feasible. Rapid innovations in information technology have resulted in the proliferation of newer and better representations and delivery of data. Usually, each new representation of data requires yet another set of software and/or hardware solutions to transform the data. Hence, there may be a substantial delay in acquiring such solutions and updating a computer system. This problem is further complicated by the heterogeneity of the computer infrastructure. This heterogeneity is the result of varied computing platforms based on different architectures (e.g., x86 architecture of most PCs, PowerPC architecture of Macs, a variety of RISC and CISC architectures of servers from SUN and IBM), a variety of operating systems for these architectures (e.g., Windows, MacOS, SunOS, Linux, IBM AIX) and a variety of applications using these operating systems. The same heterogeneity exists within input and/or output devices such as printers, facsimiles, medical instruments and wireless devices.

The imposition of standards on data representations and formats can alleviate some of this problem. However, standards are very few and far between mainly because most information technology manufacturers deem it advantageous to develop proprietary formats. Also, no single standard can effectively deal with all possible combinations of formats even for a limited application area such as word-processing.

Using a standard intermediate format in a two-stage transformation system for electronic documents is widely known. For example, in an Electronic Data Interchange (EDI) system, where the creator knows the formats, the transformation system can be a two-step system. See U.S. Pat. Nos. 5,202,977; and 5,701,423. The reliability of such systems can be ensured if and only if all the file input formats of interest can be reliably transformed to one known format, which, in turn, can be transformed to the desired output format. In some systems where the formats are known, or publicly known, this is a feasible scheme, although it requires a centralized transformation system with a completely defined software/hardware environment. Centralized systems, however, are vulnerable to failure and are hard to scale and manage with increasing load.

The application which generates a file is often best suited for interpreting it and, in many cases, transforming the file to other standard formats (e.g., files created by Microsoft Word (MS Word) can best be read by MS Word and translated into Rich Text Format (RTF)). Thus, the use of native applications may be a better solution than the use of third-party software, which may cause some loss or modification of content during interpretation and translation. While best suited for the task, native or first-party software may be prohibitively expensive, especially if a majority of the users are only using the software to view files in a specific format. In such a case, using an instance of the software as a service to convert files to a common readable format provides a cost-effective technique for sharing information.

In addition, third-party software may be faster, cheaper and/or provide a wider range of document formats than native applications. Further, the loss/modification of content may be acceptable depending upon the purpose of the final document. U.S. Pat. Nos. 6,092,114 and 5,283,887 disclose the use of native and third-party applications in a centralized transformation system in an e-mail environment, in which the transformation process is a single-step process using a known application. The process of discovering any change in availability of new transformation applications is through static configuration files (i.e., files that cannot be updated while the server is operational) at a central server (i.e., one master controlling server).

One step transformations based upon static configuration files are a problem because software versions and electronic file formats are being rapidly upgraded. This results in incompatibility between versions of the same application. For example, a PowerPoint version 4 document is not compatible with the latest PowerPoint version in Office2000. One has to first use Office97 to convert the former document to an intermediate format that can then be converted to the latter format. Thus, there is an ever increasing volume of legacy documents that become unreadable unless one has access to the original application that created it. Also, some applications preclude the simultaneous use of multiple versions on the same computer.

U.S. Pat. No. 5,251,314 discloses multiple application versions, in which a single application performs the same transformation. The substeps required for a full transformation are pre-determined and stored in centralized static configuration files. The available transformations are also centrally stored. Recovery of the original file is provided.

U.S. Pat. Nos. 5,251,314; 5,299,304; and 5,513,323 disclose the use of plural applications or stages to perform a more complex transformation through a series of conversions. The system of U.S. Pat. No. 5,251,314 finds out whether a requested transformation can actually be performed and in how many stages. This determination is used to a priori decide whether to proceed with the requested transformation. In a real system, the number of stages of transformation is not the only issue in deciding which sequence of transformation is more efficient or less expensive. U.S. Pat. No. 5,513,323 discloses a similar problem except that the goal is to find the sequence with the least cost. A fixed cost is associated with each primitive transformation and a sequence of primitive transformations is chosen.

Ockerbloom, J., "Mediating Among Diverse Data Formats," Carnegie Mellon University, pp. 1–145 (1998), discloses a conversion system including clients, servers, and mediators called type brokers. The servers provide data and perform operations on the data, such as conversions, method executions and attribute fetches. The clients retrieve data and request operations on the data. The type brokers take client requests and find servers that return data and operation results that clients seek.

There is room for improvement in methods and systems for transforming data in heterogeneous computer systems.

In summary, the task of transforming documents is costly, tedious and time-consuming. Many people regularly face this problem. This is especially true inside an organization where the transformation needs may be specific to the type of documents that are handled daily. There is no known solution that systematically manages this problem inside a networked organization or for loosely connected communities on the Internet. Ideally, such a system should be able to grow as the transformation needs of an organization increases, new document formats and software are introduced, and existing software versions change.

SUMMARY OF THE INVENTION

This need and others is met by the present invention which provides a data transformation system and method. A plurality of peer transformation servers each include a plurality of data converters and a representation of available data transformations between a plurality of input and output data formats. The graph includes unidirectional edges, which extend between corresponding pairs of the formats, and the transformation servers collectively include one or more of the data converters for each of the edges. The transformation servers are adapted to receive requests from clients for transformation of data and select at least one intermediate data transformation from the first data format to at least one intermediate data format, and a final data transformation from the intermediate data format to the second data format. Each of the intermediate and final data transformations is associated with a corresponding one of the edges. The transformation servers are also adapted to initiate a plurality of the data converters corresponding to the selected intermediate and final data transformations, in order to obtain the data in the second data format.

As one aspect of the invention, a data transformation system for use in a heterogeneous computer system comprises: at least one client adapted to initiate a request for transformation of data in a first data format to data in a second data format; a plurality of peer transformation servers, each of the transformation servers including a plurality of data converters and a representation of available data transformations between a plurality of input data formats associated with at least some of the transformation servers and a plurality of output data formats associated with at least some of the transformation servers, the representation including a plurality of unidirectional edges, with each one of the edges extending from one of the input and output data formats to another of the input and output data formats, the transformation servers collectively including at least one of the data converters for each of the edges, at least one of the transformation servers adapted to receive the request for transformation of data and select at least one intermediate data transformation from the first data format to at least one intermediate data format and a final data transformation from the intermediate data format to the second data format, with each of the intermediate and final data transformations being associated with a corresponding one of the edges, the at least one of the transformation servers adapted to initiate a plurality of the data converters corresponding to the selected intermediate and final data transformations, in order to obtain the data in the second data format, and dispose the data in the second data format; and a communication network adapted to provide communication among the transformation servers and the client.

As a further aspect of the invention, a data transformation system for use in a heterogeneous computer system comprises: at least one client adapted to initiate a request for transformation of data in a first data format to data in a second data format; a plurality of peer transformation servers, each of the peer transformation servers comprising: means for receiving the request, a plurality of data converter means for converting data in a data format to data in another data format, means for representing data transformations between a plurality of input data formats associated with at least some of the peer transformation servers and a plurality of output data formats associated with at least some of the peer transformation servers, the means for representing including a plurality of unidirectional edges, with each one of the edges extending from one of the input and output data formats to another of the input and output data formats, the peer transformation servers collectively including at least one of the data converter means for each of the edges, means responsive to the received request for selecting at least one intermediate data transformation from the first data format to at least one intermediate data format and a final data transformation from the intermediate data format to the second data format, with each of the intermediate and final data transformations being associated with a corresponding one of the edges, means for initiating a plurality of the data converter means corresponding to the selected intermediate and final data transformations, in order to obtain the data in the second data format, and means for disposing the data in the second data format; and means for providing communication among the peer transformation servers and the client.

As another aspect of the invention, a method for transforming data in a heterogeneous computer system comprises: initiating a request for transformation of data in a first data format to data in a second data format; communicating the request over a communication network; receiving the request in one of a plurality of peer transformation servers; including with each of the peer transformation servers a plurality of data converters and a representation of data transformations between a plurality of input data formats associated with at least some of the peer transformation servers and a plurality of output data formats associated with at least some of the peer transformation servers; including with the representation a plurality of unidirectional edges, with each one of the edges extending from one of the input and output data formats to another of the input and output data formats; providing at least one of the data converters for each of the edges; selecting at least one intermediate data transformation from the first data format to at least one intermediate data format; selecting a final data transformation from the intermediate data format to the second data format; initiating a plurality of the data converters corresponding to the selected intermediate and final data transformations, in order to obtain the data in the second data format; and disposing the data in the second data format.

As a further aspect of the invention, a method for representing data transformation capabilities and selecting a data transformation for a heterogeneous computer system comprises the steps of: forming a graph to represent a plurality of data transformations between a plurality of input data formats and a plurality of output data formats; including with the graph a plurality of unidirectional edges, with each one of the edges representing a capacity to transform from one of the input and output data formats to another of the input and output data formats; associating with some of the unidirectional edges at least one edgelet each of which represents a data converter for a corresponding one of the some of the unidirectional edges; associating with at least one of the unidirectional edges a plurality of edgelets each of which represents a data converter for a corresponding one of the at least one of the unidirectional edges; and selecting at least one of the data converters.

As another aspect of the invention, a data transformation server for use in a heterogeneous computer system comprises: means for receiving a request for transformation of data in a first data format to data in a second data format; a plurality of data converters, each of which transforms data from one data format to another data format; means for storing a graph to represent a plurality of data transformations between a plurality of input data formats and a plurality of output data formats, the graph including a plurality of unidirectional edges, with each one of the edges representing a capacity to transform from one of the input and output data formats to another of the input and output data formats, some of the unidirectional edges including at least one edgelet each of which represents one of the data converters for a corresponding one of the some of the unidirectional edges, at least one of the unidirectional edges including a plurality of edgelets each of which represents one of the data converters for a corresponding one of the at least one of the unidirectional edges; means for initiating at least one of the data converters, in order to obtain the data in the second data format; and means for disposing the data in the second data format.

BRIEF DESCRIPTION OF THE DRAWINGS

A full understanding of the invention can be gained from the following description of the preferred embodiments when read in conjunction with the accompanying drawings in which:

FIG. 12A shows an Adjacency Matrix usable by an ETS in accordance with the present invention.

FIG. 12B shows a Reachability Matrix for the Adjacency Matrix of FIG. 12A.

FIG. 13 is a flowchart of an algorithm employed by an ETS to calculate a Reachability Matrix in accordance with the present invention.

DESCRIPTION OF THE PREFERRED EMBODIMENTS

Figure 1:
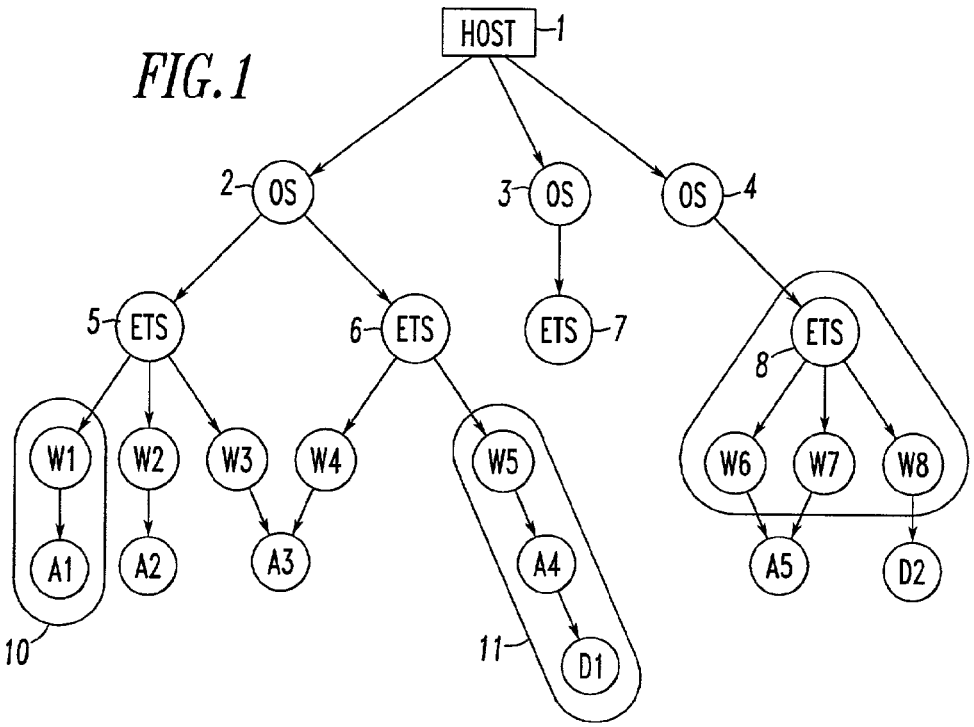
FIG. 1 is a block diagram of a hardware-software hierarchy including Electronic Transformation Servers (ETSs) in accordance with the present invention.

The following are non-limiting definitions of various terms employed herein.

Application: A software package, possibly coupled with specific hardware, capable of reading an input data format, such as a file or document format, and producing one, of possibly many, output data formats.

Monolithic Conversion: A direct, one-step conversion from a source format to a destination format with no intervening steps (e.g., from WordPerfect to PDF).

Glass Box Conversion: Conversion of a file where the converting application is aware of extensive details about the file's format; in particular, the converter can diagnose the results of a conversion for quality.

Black Box Conversion: Conversion of a file where the converting application does not know sufficient details about the file's format in order for the converter to diagnose the quality of conversion.

Wrapper: An application shell, which hides the details of conversion from the Electronic Transformation Server (ETS), and provides a model of conversion execution that the ETS can manipulate to provide consistent quality of service. A wrapper is associated with only one application and/or device. There can be many wrappers for the same application to provide different types of conversions.

Converter: a combination of wrapper and application which provides a conversion (e.g., xyz.com:application/WORDPERFECT:application/PDF signifies that the server on xyz.com is able to convert a WordPerfect document to a PDF document). A converter enables a monolithic conversion.

Node: a specific document format which might include, for example, the version of the application producing the document, and the operating system.

Edge: a connection between two nodes, which reflects the existence of one or more converters that are able to convert a document in the source format into a document in the target format. Edges are "directed" in that an edge connecting node "A" to node "B" does not imply the reverse conversion of node "B" to node "A". Such a reversing ability is denoted by a second edge from node "B" to node "A".

Edgelet: Any converter that performs the conversion specified by an edge. There can be more than one edgelet associated with an edge denoting that the conversion implied by an edge can be performed by more than one converter. An edgelet is associated with one wrapper.

Transformation graph: a collection of "nodes" and "edges," with no isolated nodes and no duplicated edges.

Transformation: the complete sequence of conversions employed to obtain the desired end format, given the starting format (e.g., the sequence WordPerfect→POSTSCRIPT→PDF to achieve the transformation of a WordPerfect document into a PDF document). This is equivalent to the existence of a "directed" path connecting one node to another node (i.e., two nodes denoting the starting format and the target format).

Server: Software that provides specific services to requesters, generally called clients.

Client: Software that enables an agent, human or otherwise, to obtain services from a server. A client may be embedded in other applications, such as a web client, to provide web-based transformation services directly to users.

ETS (Electronic Transformation Server): Software that provides the transformation service. Zero or more wrappers may be managed by an ETS.

Instance: refers to a specific running ETS (e.g., a single copy of an ETS executing on a single hardware/software platform). An ETS can, as needed, become the "client" of another server. There can be plural instances of an ETS running on a single hardware/software platform.

ETMS: The web of connected ETS instances comprises the Electronic Transformation Management System (ETMS).

IPC (Inter-Process Communication): A software-based mechanism by which two programs can communicate with each other (e.g., a wrapper sends a message to the ETS when it has completed a conversion).

Acquisition: The manner in which data, a file or other electronic data is acquired by an ETS instance.

Disposition: The manner in which data, a file or other electronic data is delivered to the intended recipient (e.g., another application, a user).

Document format: Document format can be defined in a number of ways such as, for example: (1) application specific, which is generally, but not necessarily, proprietary (e.g., MS Word, WordPerfect); (2) standard format (e.g., HTML, RTF); and (3) media (e.g., facsimile, printed page). Each such format is a legitimate document starting or ending format in the ETMS. Thus, for example, a legitimate request is to transform a facsimile message into a WordPerfect file.

FIG. 1 shows an example of a hardware-software hierarchy in accordance with the present invention. At the top of the hierarchy is the host machine 1 (e.g., physical hardware). One or more operating systems (OS) 2,3,4 may run on the host. Usually, only one operating system runs on a given hardware platform; however, using specialized software, like VMware™, more than one operating system may run on the same platform. One or more instances of ETSs, such as 5,6,7,8, may run under the OSs 2,3,4. An ETS may control zero or more wrappers (W1–W8) (e.g., three wrappers W6–W8 as shown with ETS 8) which, in turn, control an application (A1–A5) and/or a device (D1,D2). A wrapper along with an application and/or a device is denoted as a converter. For example, wrapper W1 and application A1 form converter 10, and wrapper W5, application A4 and device D1 form converter 11.

Figure 2:
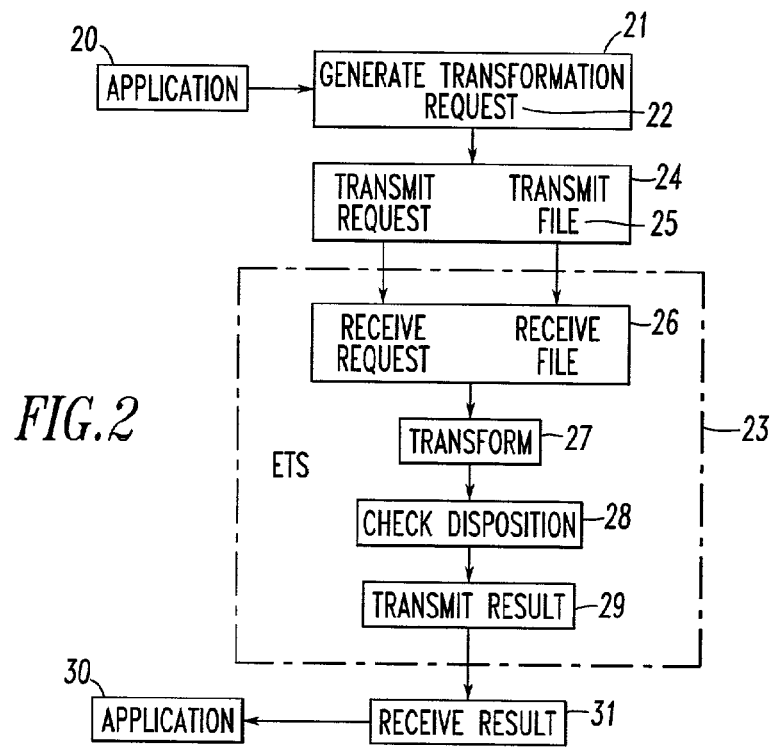
FIG. 2 is a flowchart of steps employed by the ETSs of FIG. 1 to provide a data transformation.

FIG. 2 shows events which lead to a transformation using an instance of an ETS. First, an application 20 generates, at 21, a transformation request 22 (as understood by the ETS 23). The request 22 contains information about the type of transformation desired and the manner in which the result should be disposed. Next, at 24, the application 20 transmits the request 22 and the file 25 to be transformed. Then, the ETS 23 receives, at 26, the request 22 and the file 25 to be transformed. Next, at 27, the ETS 23 performs the transformation. This step may employ other peer ETSs (not shown) that also provide some portion of the transformation service. The ETS 23 then checks, at 28, the disposition requirements and transmits, at 29, the results to the intended application 30. Finally, the application 30 receives the results at 31. This application 30 may be the same application as the application 20, which originated the transformation request 22.

As discussed herein, there may be alternatives to the exemplary sequence of events, such as, for example, the manner in which the request 22 is acquired by the ETS instance and the specific disposition requirements.

Figure 3:
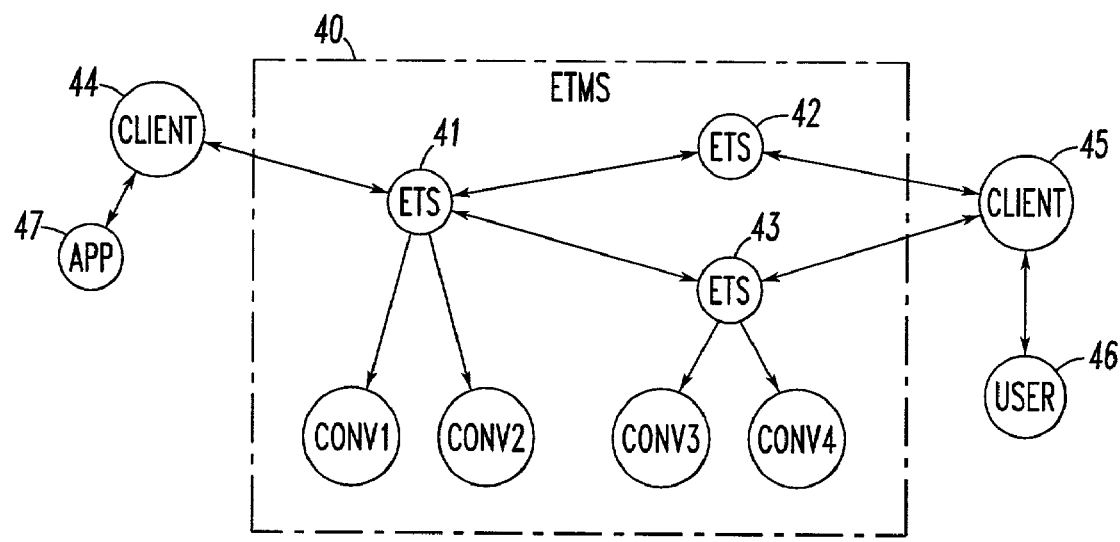
FIG. 3 is a block diagram of an Electronic Transformation Management System (ETMS) including a plurality of peer ETSs in accordance with the present invention.

FIG. 3 shows an exemplary Electronic Transformation Management System (ETMS) 40, which is a collection of ETSs, such as 41,42,43, that suitably communicate with each other. A particular office environment may have multiple ETMSs (not shown), whose component ETSs can communicate with each other. However, if two ETSs are within different ETMSs in different environments (e.g., different companies), they may not be able to intercommunicate. An external client, such as 44,45, may contact any particular known ETS instance for a specific transformation service. The clients 44,45 may be directly invoked by a user 46 or by some other application, such as APP 47, acting on behalf of a user (not shown). Lower in the hierarchy come the wrappers (FIG. 1), which are controlled by ETSs 41,42, 43 to provide a transformation service. Lowest in the hierarchy are the applications and/or devices (FIG. 1) that are controlled by the wrappers and used by them to perform the actual one-step conversion, as shown by converters CONV1, CONV2, CONV3 and CONV4.

An ETS instance provides file transformation services and is capable of initiating, administering and terminating a transformation. A transformation can be provided using wrappers under the direct control of an ETS (e.g., 41) or under the control of the ETS' peer (e.g., ETSs 42,43). In the exemplary embodiment, an instance publishes or informs its peers about the conversions it can provide and accepts requests for specific transformations or conversions from its peers. However, each ETS can impose specific authentication and authorization (and other security) requirements that, if not satisfied by the peer ETS, can result in a refusal of information or service.

For a specific transformation, the requesting or initiating instance acts as the "client" of the responding ETS. Since these roles can be reversed between any pair of ETSs (even for a single transformation request), an ETMS 40 may be composed of a collection of peer-to-peer related ETSs 41,42,43. ETS instances discover other instances in various ways, such as, for example, from a configuration file on startup, from re-reading an updated configuration file, or by receiving messages from a peer ETS. An ETS can acquire the file to be converted in a wide variety of ways and can dispose of the results in a wide variety of ways. For example, an ETS might receive a "file" from a facsimile transmission and return the transformed result (of a facsimile to PDF transformation, for instance) as an e-mail message. These varying behaviors are handled by allowing clients to specify different delivery dispositions, ranging from, for example, file transfers to e-mail. Each ETS instance manages zero or more wrappers that provide the primitive transformation service. If an ETS, such as 42, has no wrapper under its control, then all transformation services it provides are executed using the services provided by its peers, such as 41 and 43. If an ETS has wrappers under its control, then its transformation services can result from using either those wrappers or else wrappers from its peers depending on, for example, demand, quality or cost.

Figure 4:
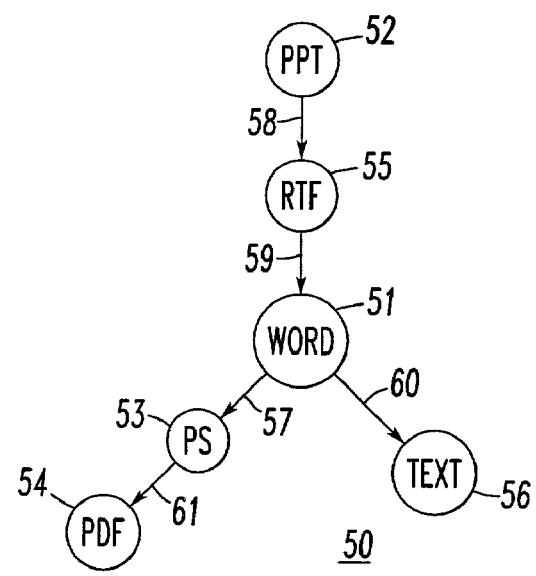
FIG. 4 is a diagram of a transformation graph for use with the ETMS of FIG. 3.

Since an ETS can have multiple peers, transformations and wrappers, any particular transformation request can be satisfied in many ways. A suitable graph representation is employed to help decide what transformations an ETS can provide and how it provides this transformation subject to a variety of conditions, such as, for example, costs, transmission latencies, and quality of conversion. The exemplary transformation graph 50 shown in FIG. 4 consists of nodes 51,52,53,54,55,56 representing document formats (e.g., Word, PowerPoint (PPT), PostScript (PS), Portable Document Format (PDF), Rich Text Format (RTF) and text) which are linked if there is a service that can convert from one format to another. This conversion may be local (e.g., using a wrapper controlled by the local ETS) or remote (e.g., using a wrapper controlled by another ETS). Hence, in FIG. 4, a Word-to-PS transformation employs only a single conversion step, 57, while a PowerPoint to text transformation employs a PowerPoint-to-RTF, an RTF-to-Word and a Word-to-text sequence of conversion steps 58, 59 and 60, respectively.

Each of the available conversions 57,58,59,60,61 is represented in the graph 50 by a directed link (e.g., one with an arrow at one end) and is called an edge. There can be several ways in which an edge may be traversed (e.g., there may be several wrappers each providing the same conversion service, several ETS peers providing the same service). Here, all such multiplicities are shown by a single edge, and the issue of which specific service to employ is delegated to a different step. The exemplary transformation graph 50 differs from known prior transformation graphs by representing the capacity for a document conversion rather than the actual application that will perform the conversion. The existence of any edge in a transformation graph represents any number (e.g., one or more) of available conversions. For example, the graph 50 collapses several available PS to PDF converters (e.g., GhostScript, Adobe Acrobat) into the single PS to PDF edge 61. The actual mechanics of picking a specific wrapper are performed in a separate step (e.g., as discussed below in connection with FIGS. 20–21).

Thus, the exemplary graph 50 consists of nodes 51–56 and directed edges 57–61 between such nodes. Those nodes represent a particular file format or type. An edge from one node to another node indicates that it is possible to perform that particular transformation. A list of all nodes and edges are maintained as a primary graph.

As discussed above in connection with FIG. 1, wrappers serve as an interface between the ETS instances and applications and/or devices. Wrappers may be employed to "coerce" (as discussed below) applications to provide conversion services that they were not necessarily designed to provide. Wrappers can range from simple software "scripts" to procedures involving a "human-in-the-loop". Simple scripts instruct the application to open the document, convert it, save the conversion, and quit. At the other extreme, a specific conversion might require a human agent to launch the application, open the document within the application, interactively perform the conversion, and save or distribute the resulting document in the new format. Thus, part or all of the application may be a human agent.

At the lowest level of the ETMS hierarchy are the applications (and/or in certain cases devices such as, for example, printers or facsimile machines). Although applications and devices are lowest in the hierarchy of FIG. 1, they are the engines of the transformation service since they perform the actual conversion. The rest of the ETMS is employed to manage and mediate the conversion facilities provided by the applications. The application, which generated the file, is often best suited for interpreting it and, in many cases, also transforming the file to other formats. Thus, employing native applications may be a better solution than using third-party software, which may cause some loss or modification of content during interpretation and translation.

However, third-party software may be faster, cheaper or provide a wider range of document formats than native applications. Further, the loss in fidelity or modification of content may be acceptable depending upon the purpose of the final document. Hence, applications may be of several types: (1) original (i.e., the application which produced the source document); (2) next-generation (i.e., a newer version of the original application which is able to read documents created by previous versions); and (3) third party applications (e.g., third party software packages which are able to perform one or more specific conversions).

Both static (i.e., known ahead of time and either fixed or changing only very sporadically) and dynamic information (i.e., information obtained as a consequence of repeated use) about an application are employed to determine the "best" application to use. The initial assumption is that the originating application (i.e., the specific version of the specific application on a specific operating system) is best suited for a conversion. This assumption is modified based on experience and the trade-off(s) made by, or on behalf of, the requester. Thus, for example, the requester may choose a less expensive, less accurate conversion using a third party application rather than the originating application.

Figure 5:
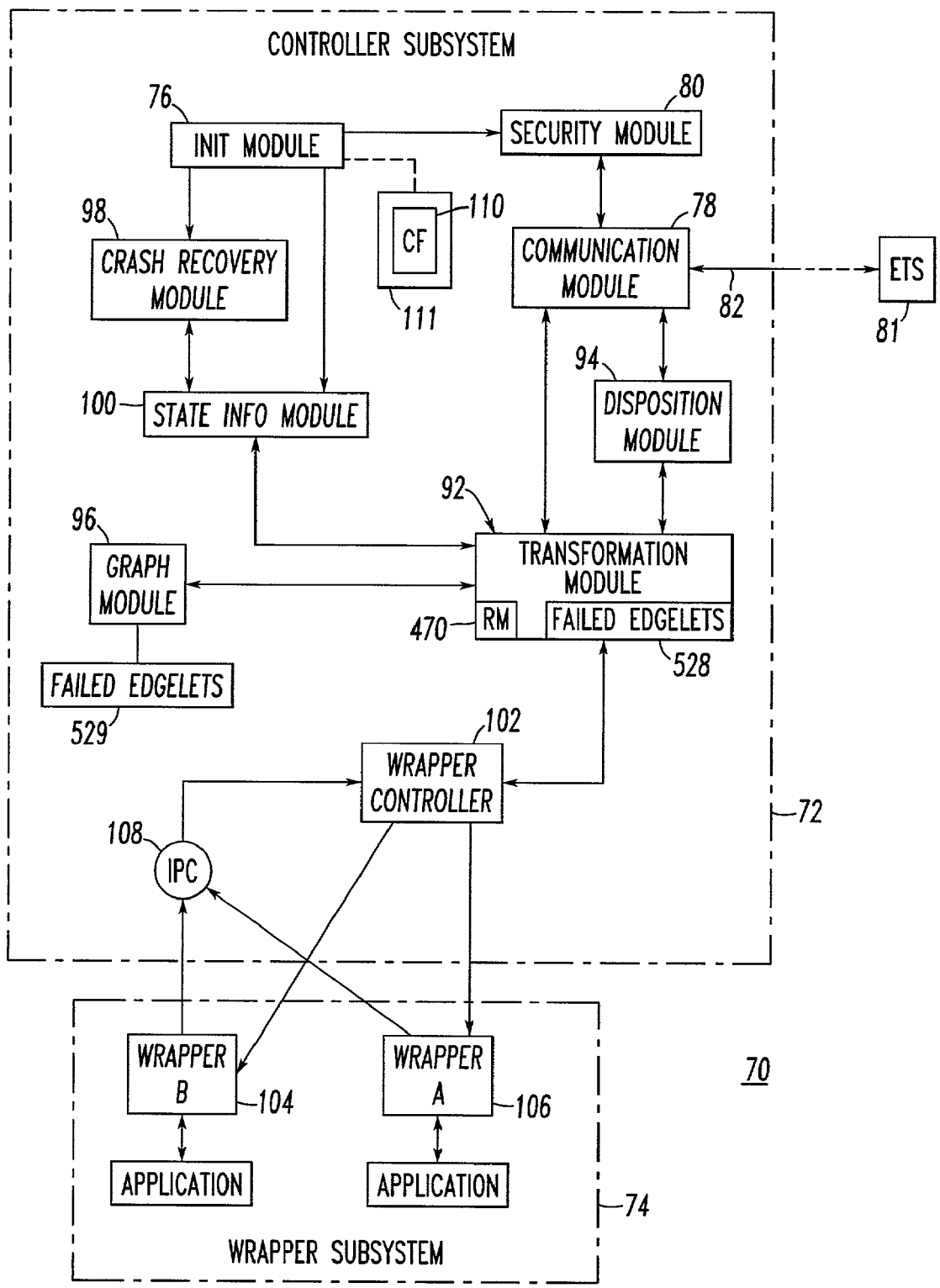
FIG. 5 is a block diagram of the controller and wrapper subsystems of an ETS in accordance with the present invention.

FIG. 5 shows an exemplary ETS 70 including two subsystems: the controller subsystem 72 and the wrapper subsystem 74. The controller subsystem 72 includes a plurality of modules. The init module 76 initializes the ETS 70 during startup. This includes reading the configuration, and initializing the communication and security modules 78,80.

Figure 6:
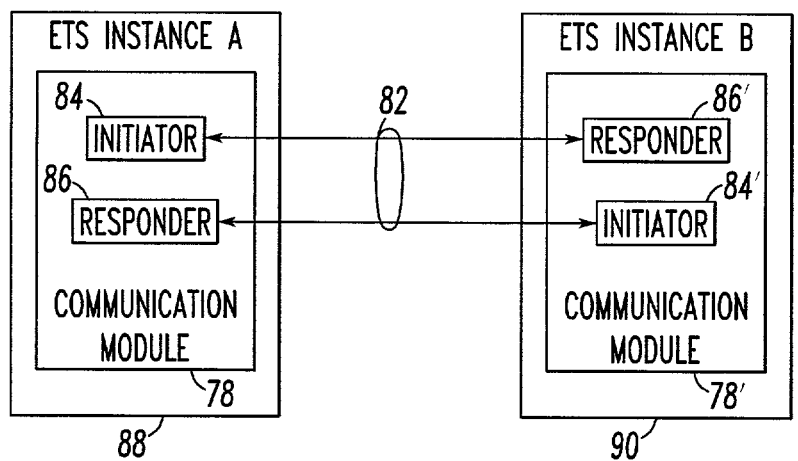
FIG. 6 is a block diagram of the initiator and responder interfaces for the ETS of FIG. 5 and a peer ETS.

The communication module 78 handles incoming requests and produces appropriate responses. The communication module 78 also generates appropriate requests to other ETS instances 81 on the communication network 82. As shown in FIG. 6, the communication module 78 exchanges information mainly with the communication modules 78' of other ETSs or clients, and handles requests using two subsystems: an Initiator 84 transmits requests, and a Responder 86 handles incoming requests. For example, the Initiator 84,84' of one ETS 88,90 communicates with the Responder 86',86 of the other ETS 90,88, respectively.

Referring again to FIG. 5, acquisition of the transformation request 22 and file 25 of FIG. 2 normally happens through the communication module 78 in which case it is merely a pass-through mechanism to the transformation module 92. The ETS 70 also has another mechanism of acquiring requests and files through its local file system. The communication module 78, in turn, hands over the request 22 to the transformation module 92.

The security module 80 sets up this ETS' security requirements and deals with the authentication and authorization of peer ETSs, such as 81. The communication module 78 accepts or rejects an incoming connection depending upon the security parameters.

The transformation module 92 performs the transformation of a given electronic input to the desired output. The transformation module 92 directly deals with the local application wrapper subsystem 74 to execute the atomic (single-step) conversions. For conversions employing a remote ETS instance, the transformation module 92 manages the conversion and employs the communication module 78 to interact with other ETS(s). The transformation module 92 gets the requests from the communication module 78 or the acquisition subsystem (not shown). The results of transformation are handed over by the transformation module 92 to the disposition subsystem (not shown) of the disposition module 94, which appropriately packages the results and manages the process to return the result, as negotiated, between the two ETSs 70,81.

The graph module 96 manages the graph representation and services queries, on the graph itself, from the transformation module 92. While the mechanics of obtaining information from a peer ETS are left to the communication module 78, the management of how a particular transformation request can best be carried out is the central role of the graph module 96. The graph module 96 also updates statistics on performance and failures as reported by the transformation module 92.

During startup, after a crash or otherwise, the crash recovery module 98 checks if there are any incomplete transformation tasks pending as a result of a prior system shutdown. This module 98 also queues any incomplete tasks for transformation after the startup sequence is completed.

The state information module 100 tracks suitable information in short term memory (e.g., RAM) and long-term memory (e.g., disk) for correct operation of the ETS 70 both during normal operations and for recovery from system shutdown.

The wrapper subsystem controller module 102 manages the communication between the transformation module 92 and the actual wrappers 104,106 that are locally available to the ETS 70. The communication is asymmetric in the sense that the controller 102 to wrapper 104,106 communication may be different from wrapper to controller communications. Specifically, the Inter-Process Communication (IPC) module 108 takes care of wrapper to controller communication in most cases. The controller subsystem 72 may exist without the application wrapper subsystem 74.

The application wrapper subsystem 74 is a collection of one or more wrappers 104,106, each of which behaves exactly the same way as far as the controller subsystem 72 is concerned. The wrappers 104,106 accept conversion requests from the transformation module 92, obtain the input file 25 (FIG. 2) from the specified location, deposit the results in the specified location, and report the status of the conversion (success or failure) to the transformation module 92.

Wrappers present a uniform representation of a conversion to the ETS by hiding all the details of conversions in a particular OS. This takes care of heterogeneity to a large extent. So far as an ETS is concerned, the interface to one converter is like the interface to any other converter. The wrapper invokes the application to obtain the requested service and returns status information to the ETS.

Initialization involves six general steps. First, the init module 76 reads the configuration file (CF) 110, which is maintained on local disk 111. The behavior of the ETS 70 can be controlled via the configuration file 110. Preferably, a "normal" text file is employed which contains name-value pairs where the name is one of the parameters which control the behavior of the ETS 70 and the value specifies the desired behavior.

The configuration file 110 is read on start-up before any other actions are taken. If changes to the configuration are to be made, two mechanisms are available to re-configure the ETS 70: (1) shutdown and re-start; and (2) sending a message to the running ETS. The details of the mechanism for sending such a message are dependent on the operating system and can range from sending a signal (on Unix type systems) to directly logging on the ETS' console (not shown) and issuing a re-configure command or sending an IPC message to re-configure the ETS.

The configuration file 110 has suitable options (a table of exemplary parameters is shown in Table 1) which may be grouped into the following sections: (1) General: this contains the very basic parameters of the ETS instance, such as, for example, ETS identifier, and available resources; (2) Directories: working directories of the ETS for storing information or files; (3) Disposition: control parameters for disposition of the results of the transformation; (4) Security: these control the authentication mechanism(s) to use, the keys for such mechanisms, the default polices, and allow/ deny lists and trusted ETS hosts within the ETMS; (5) Peer-to-Peer: known peer ETS instances and other policies such as whether to transmit global information, knowledge about other peers; (6) Wrappers: these specify which wrappers to use, basic wrapper costs and other optional information for wrapper invocation, such as the number of times a wrapper may be invoked before being considered faulty; (7) Cost Weights: weights assigned to the different cost components used for cost calculations; (8) Resources: limits on shared resources (e.g., printers, memory, disk-space) (this list may be expanded depending on the specific needs of the wrappers, such as, for example, facsimile and scanners); (9) Transformation Orders: these specify the variables that control how to treat transformations including, for example, default timeouts and failure tolerances; (10) IPC: these select which IPC mechanism to use and the parameters employed by the selected mechanism; (11) Mail: mail handling parameters; and (12) Maintenance: these specify various maintenance and housekeeping variables such as, for example, logging, the administrator and the mailer to use.

TABLE 1

Exemplary Configuration File Parameters

| Parameter Class (Subclass) | Parameter Name(s) | Parameter value | Comments |
|---|---|---|---|
| General | | | Basic configuration parameters |
| | ETS ID | ETS0001 | A character string identifier for the ETS |
| | ETS port number | 9080 | TCP/IP port number where the ETS listens for incoming requests |
| | Host IP address | 192.168.1.2 | IP address of the Host Operating System |
| | Clean on Startup | Yes/No | Whether to clean-up temporary files during startup |
| | Copy on Fail | Yes/No | Whether to copy the resulting failed file to the given destination |
| | Compressor | Zip/Unzip | Compression/decompression software to use in rotating the log file |
| | Loopback Address | 127.0.0.1 | IP address of the Host OS used to communicate with itself |
| | Console Port | 9081 | TCP/IP port number for interactive chat with the ETS (used for monitoring/debugging) |
| | Max Idle Time | 60 | Maximum number of seconds allowed before the responder disconnects |
| Directories | | | Working directories for various purposes |
| | Home Directory | /home/ETS/ETS0001 | The root directory of ETS; every other directory is relative to this directory |
| | Received Directory | received | Directory where incoming files are stored; the actual directory will be /home/ETS/ETS0001/received |
| | Working Directory | working | Directory to store intermediate files of the transformation |
| | Succeeded Directory | succeeded | Final successful results are stored here |
| | Failed Directory | failed | Final failed results are stored here |
| | Temporary Directory | temp | Temporary directory for ETS |
| | Log | log | Log files are stored here |

TABLE 1-continued

Exemplary Configuration File Parameters

| Parameter Class (Subclass) | Parameter Name(s) | Parameter value | Comments |
|---|---|---|---|
| | Directory | | |
| Disposition | | | Disposition control parameters |
| | Will hold | Yes/No | Whether the ETS will hold the results |
| | Will Return | Yes/No | Whether the ETS will return the results |
| | Hold Time | 1 hr | Time to hold the result before the file is purged (hold disposition) |
| | Max Return Attempts | 5 | How many times the ETS will try to return the result before giving up |
| | Return Retry Interval | 1 minute | Time interval between attempting to return result again |
| Security | | | Authentication/Authorization related parameters |
| | Default policy | P or D | If P then permit if not explicitly denied; if D then deny if not explicitly permitted |
| | Permit list | IP address, ETS ID | 192.168.1.15, ETS0021 | ETSs which are permitted to use the service |
| | Deny list | IP address, ETS ID | 192.168.2.76, ETS1234 | ETSs which are not permitted to use the service |
| Authorized Host list | Auth file name | Auth_file | File name of list of authorized hosts list; each line of this file contains an IP address, and ETS ID pair values for all hosts which can access this ETS |
| | Authorization key | 1a7r64x0pW15 | A random secret string for authorization |
| | Authorization type | MD5 | Type of authorization to use |
| Peer-to-Peer | | | Peer-to-peer control parameters |
| | Master | Yes/No | Whether it is a master server itself |
| | Master server | 192.168.1.25 | The master server which knows about all peers |
| | Global graph | Yes/No | Propagate global graph info or only local graph info |
| | Multicast Address | 192.168.1.90 | Officially assigned multicast address |
| | Cascade TTL | 5 | Number of times to forward message |
| | Propagate query | Yes/No | In cascade queries whether to propagate the query or terminate |
| | Repoll Time | 15 min | How often to re-poll peers; if 0 then no repoll |
| Peer Host list | Peer file name | Peer_file | File name of list of hosts; each line of this file contains an IP address, and ETS ID pair values; these are ETSs, which it can use to get service from |
| | Failed Peers file | Peers.fail | List of peers which have failed |
| Wrappers | | | Parameters for wrappers |
| | Wrapper polling | 10 min | Time interval for polling for new wrappers in the wrappers directory; if 0 then no polling is allowed |
| | Wrapper Directory | wrappers | Directory where the wrappers are installed |
| | Built-ins Directory | built-ins | Directory where built-ins are installed |
| | Wrapper Failure | 5 | Weight assigned to a failure; successes are always assigned |

TABLE 1-continued

Exemplary Configuration File Parameters

| Parameter Class (Subclass) | Parameter Name(s) | Parameter value | Comments |
|---|---|---|---|
| | Weight | | a weight of 1 |
| | Local Time-out | 20 | Number of seconds before a local time-out occurs |
| | Remote Time-out | 60 | Number of seconds before a remote time-out occurs |
| | Max Time-outs | 3 | Maximum time outs allowed for each wrapper |
| | Max Failures | 5 | Maximum number of failures allowed for a wrapper |
| | Max count | 5 | Maximum number of wrappers to check for picking best wrapper |
| Cost Weights | | | Weights assigned to different cost components |
| | Edgelet failure count | 5 | |
| | Local or Remote | 3 | |
| | Quality | 2 | |
| | Per kilobyte | 2 | |
| | Per invocation | 1 | |
| Resources | | | Global values of available resources |
| | Printers | 1 | Number of printers available |
| | Memory | 100 Mb | Amount of main memory available |
| | Disk | 1 Gb | Amount of disk space available |
| Transformation Orders | | | Parameters controlling transformation orders |
| | Transformation Time-out | 10 min | Default time-out for a transformation order |
| | Max Transformation Attempts | 4 | Maximum number of transformation attempts to be made per edge |
| | Transformations Orders File | T0001.tof | Where the transformation order is stored on disk (in working directory) |
| | Keep Transformation orders | Yes/No | Whether to store transformation orders which have completed successfully |
| IPC | | | Inter-Process Communication parameters |
| | IPC command | npipeipc.py | Which IPC command to use |
| | IPC Pipe Path | /tmp/ETSPIPE | The named pipe to use for IPC |
| | IPC port | 9082 | Which tcp/ip port to use |
| | File IPC Directory | /home/ETS/ETS0001/fileipc | If file IPC is used, where to find the files indicating a message |
| | File IPC Time | 2 | How many seconds elapse before checking for file-based IPC messages |
| Mail | | | Mail handling parameters |
| | Mail Transfer Agent | sendmail | Which mail transfer agent to use locally |
| | Mail Relay | xyz.com | Which site to use to relay mail |
| | Mail Message file | /home/ETS/ETS0001/mail | Where to store messages that could not be sent |
| Maintenance | | | Administration and maintenance related parameters |
| | Manager | John Smith | Name of manager |
| | Notify Manager | Yes/No | Whether to send messages to the manager when special events take place |
| | Manager's e-mail address | js@xyz.com | Where to send messages to the manager |

Second, after reading the configuration file 110, initializing the logging subsystem (not shown) includes opening the log file, and archiving previous logs.

In the third step, the communication module 78 is initialized. This module is set up so that the ETS 70 may query other ETSs in the system to build-up initial lists of ETSs it can use for transformation services. During this time, the ETS can also receive similar queries from other ETSs. However, the ETS still cannot entertain any Transformation request because the transformation module 92 is not yet set up do so.

Fourth, the security module 80 is initialized by setting up the list of hosts that are denied permission to access the ETS (Deny Host List) and the hosts which are permitted to access the ETS (Permit Host List). If so configured, other ETSs are queried for their knowledge regarding other ETSs. If new ETSs are found, then those are added to the Peer Host list (i.e., if the new ETS is not in the Deny Host List from the configuration file 110). The Authorized Host list contains some hosts from the Permit Host list and any other hosts which are not in the Deny Host list and yet allowed because of the default security policy.

In the fifth step, the IPC module 108 is initialized. This module is responsible for local communication from the wrappers 104,106 to the wrapper subsystem controller module 102.

Finally, the transformation module 92 is started. This module, then, essentially runs the rest of the time as the core controlling module.

Authorization and authentication in the ETMS (i.e., the community of ETSs) is delegated in the sense that an ETS authenticates and authorizes another ETS and depends on the latter to control access (user or application) to itself. Authentication means establishing that the entity is indeed the entity it claims to be, while authorization determines what an authenticated entity is permitted to do. Authentication can take a number of approaches, such as, for example, to permit the negotiation of authentication methods between two ETSs 70,81. In this approach, on initial negotiation, each side sends its preferred method to the other. Each then replies positively or negatively. The response to a negative reply can be to refuse connection or to suggest another authorization technique. This negotiation (or "chat") proceeds until both sides agree on the method to be used. Then, depending on the agreed method, other exchanges take place to establish each party's identities to the other's satisfaction. There are many known methods ranging from simple clear text passwords (the least secure) to much more secure one-time passwords. In the first case, the initiator is asked to send a password that is compared to the password expected by the responder. If they match, the responder authenticates the initiator. The reverse authentication is similar where the initiator authenticates the responder. The same password is used repeatedly. After a password is changed, both parties in the transaction update their information. Secure one-time password authentication is similar, but the password is never re-used. Although exemplary authentication techniques are disclosed, a wide range of authentication methods may be employed.

While there are a wide range of authorization techniques, the model used in the exemplary ETMS is a simple permit/deny model. This model has three elements: a permit list, a deny list, and a global default policy (these are defined in the Security section of the configuration file 110 and are set by the init module 76). The permit list defines those ETSs that are allowed to use this ETS 70. The deny list is employed to establish ETS(s) to whom services are refused. The global setting defines the default policy: permit if not explicitly denied, or deny if not explicitly permitted. While all three are configuration parameters, it is generally recommended that intranets use the restricted deny-then-permit policy, while Internet service providers might choose the permit-then-deny approach.

The communication module 78 deals with external communication (i.e., with remote peers or clients). As shown in FIG. 6, the communication module 78 performs two principal simultaneous roles: the responder 86 and the initiator 84. All communications started by an ETS (e.g., peer ETS A 88) to another (e.g., peer ETS B 90) take place between ETS A's initiator 84 and ETS B's responder 86'.

The responder 86 continuously looks for any incoming request for one of the various services that the ETS 88 is capable of providing. Once a request is made, the responder 86 decodes the request and passes the request on to the transformation module 92 of FIG. 5. The responder 86 deals with the following exemplary service requests: (1) peer request; (2) request for graph; (3) status request of prior transformation request; (4) cancellation of prior transformation request; (5) transformation request; (6) receive a file that has been transformed by the initiator; (7) send a file that has been transformed by the responder; and (8) notification as to success and failure when necessary.

For most cases, the initiator 84 of a communication is an instance of the ETS and is embedded in the communication module 78. However, when external software needs to contact an ETS, the initiator 84 can be used all by itself to generate the appropriate requests to the ETS. The initiator 84 may sleep and awaken whenever an ETS instance needs to communicate with an external entity, whether it is a client application or another ETS instance.

The communication between the initiator 84,84' of one ETS instance and the responder 86,86' of another ETS instance is symmetric. That is, the initiator generates the request, which the responder expects. Before every request can be made, an Open Connection step is employed during which security related negotiations are completed. Only after this initial "chat" does an ETS instance continue with the actual request. The following table illustrates the symmetry between what the initiator 84 sends and what the responder 86' receives:

TABLE 2

Initiator/Responder Communications

| Initiator | Responder | Comments |
| --- | --- | --- |
| Open Connection | Accept Connection | can initiate a security negotiation before accepting the connection |
| Send Peers | Peer Request | may be refused according to policy |
| Send Graph | Graph Request | request local conversion capabilities or all known capabilities |

TABLE 2-continued

Initiator/Responder Communications

| Initiator | Responder | Comments |
| --- | --- | --- |
| Send Status | Status Request | for a previous transformation request |
| Cancel | Cancel Request | for a previous transformation request |
| Transform | Transformation Request | request for a file transformation service |
| Send File | File Request | result of a previous transformation request |
| Receive File | Returning Request | wait to receive a file |
| Notification | Notification Request | a notification about some event |

Of these communications, the Transformation request is the main engine of the transformation service. This request depends upon the topology of the graph (e.g. 50 of FIG. 4) and the operations provided by the graph module 96 of FIG. 5. The rest of the requests are mainly administrative in nature. The Peer request, Graph request and Status request are employed to obtain information from an ETS. The Cancel request and the Transformation request lead to some action on the part of the ETS. The Send and Receive File requests involve a transfer of the result (or an intermediate result) file. Each incoming request is characterized by suitable arguments.

In the case where a client initiates the request instead of an ETS, the same information is employed.

Once a responder 86' receives a request from an initiator 84, it reacts to the request in a manner specific to each of the requests. As discussed below, every multi-step interaction employs an acknowledgement whereby the responder returns a positive acknowledgment (ACK) or a negative acknowledgement (NACK) indicating that it is OK to proceed or to stop the request, respectively.

For the Open Connection request, once the communication network connection is open, the two sides authenticate each other, as discussed above. The responder confirms with an ACK and a time stamp of when it was last started (booted up) and then waits for other requests from the initiator. The initiator may employ the time-stamp if that information is old. The initiator either sends requests or closes the connection depending on its reaction to the authentication exchanges.

For a Peer request, the initiator 84 of ETS 88 may request a list of peers known to the responder 86' of ETS 90. (Similarly, initiator 84' of ETS 90 may request a list of known peers from the responder 86 of ETS 88. According to the policy established by the administrator of the responder, the list may be sent to the initiator 84 of ETS 88. Otherwise, a NACK is sent. The ETS 90 maintains this list in the Peer Host list.

The Graph request returns a local or global graph as requested. A global graph contains all conversion services known by the responder. A local graph contains all services the responder controls locally. The list of valid wrappers (with appropriate information, such as costs) is sent to the initiator.

The Status request first checks the validity of the request by confirming a transformation ID as sent by the initiator and confirming that the host ID matches the host id stored for the transformation ID. Second, if the request is valid, then the current status of the transformation is returned. Otherwise, a NACK is sent.

The Cancel request first checks the validity of the request by confirming the transformation ID as sent by the initiator and confirming that the host ID matches the host id stored for the transformation ID. Second, if the request is valid, then the transformation identified by the ID is cancelled and a positive acknowledgement is sent. Otherwise, a NACK is sent.

The Transformation request is sent to the ETS responder along with the following information: (a) source type of the file, (b) the desired destination type, (c) the disposition of the file and the relevant disposition argument, (d) the acquisition parameter, and, if applicable, (e) the file encoding type.

Figure 7:
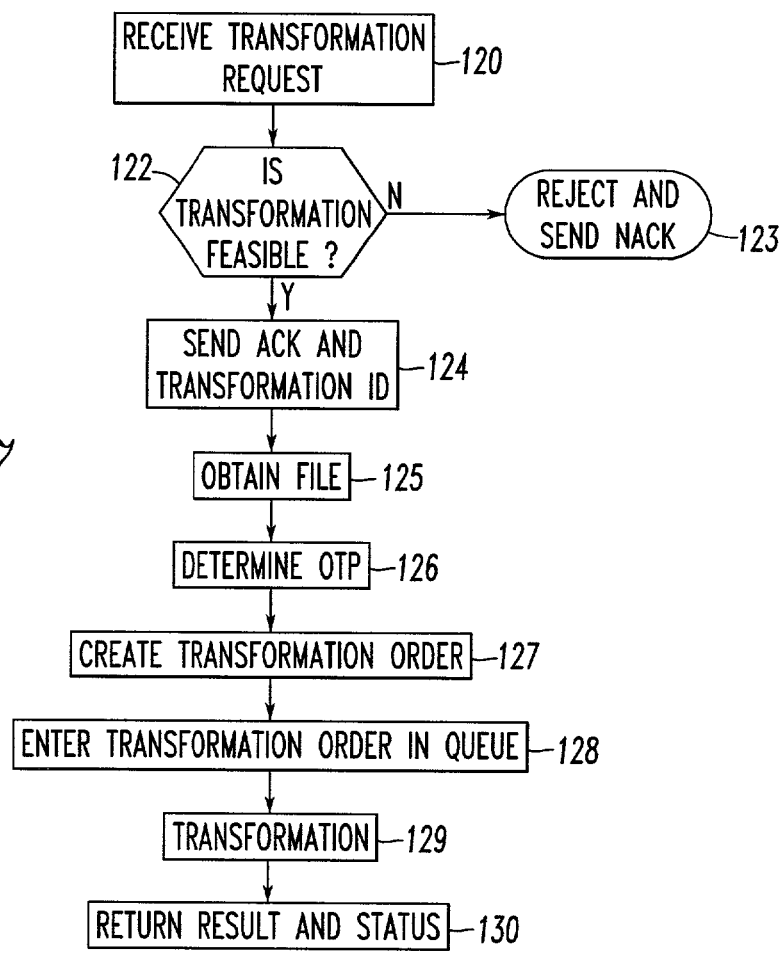
FIG. 7 is a flowchart showing steps performed by the ETS of FIG. 5 in response to a Transformation request.

As shown in FIG. 7, the following steps are performed in response to receiving, at 120, a Transformation request. At 122, the feasibility of the Transformation request is checked (as discussed below in connection with FIG. 12A, whether the ETS has the ability to perform the transformation, and whether the disposition type and acquisition types are acceptable). If not feasible, then a NACK is returned at 123. Otherwise, if the transformation is feasible, then a unique identifier or a key (transformation ID) is generated for future reference to the request and is sent back to the initiator along with an ACK at 124. The host id of the initiator is also stored for this Transformation request to confirm the validity of any future requests pertaining to this transformation ID. Next, at 125, the file is received from the initiator and decoded. At 126, the optimal transformation path (OTP) is determined as discussed below in connection with FIG. 15. Next, at 127, the transformation order is created and entered, at 128, into the transformation queue (452 of FIG. 18). Then, at 129, the transformation is performed. Finally, at 130, the result is returned along with the success or failure status of the transformation.

The above steps may be coarsely classified as acquisition (steps 122,124,125), disposition (step 130), and those using the transformation module 92 (steps 126,127,128,129). The above steps happen in a detached fashion. After the file is received, the connection may be closed depending on the disposition requirements and re-established, later, when the transformation module 92 finishes the task.

In the Send File request, the initiator asks the responder to return (send) the results of a previous transformation request from the initiator. The initiator sends the transformation ID with this request. The Send File request includes the following steps: (1) the validity of the request is checked by confirming the transformation ID as sent by the initiator (and confirming that the host ID matches with the one previously stored for the transformation ID); (2) if the request is valid, then the status of the transformation is checked; (3) if not done, a PENDING response is returned; (4) otherwise, a response indicating the status of the transformation is returned along with the size and encoding of the resulting file. The initiator responds with an ACK or a NACK. If a NACK, the transformation request is disposed; and (5) if an ACK is received, the file is sent to the initiator and the transformation request is disposed.

For the Receive File request, the initiator asks the responder to accept (receive) the results of a previous transformation request from the responder. The initiator sends the transformation ID with the request. The Receive File request includes the following steps: (1) the initiator sends the request along with the transformation ID, the transformation status, and the size and encoding of the resulting file; (2) the responder checks the validity of the request by confirming the transformation ID as sent by the initiator and confirming that the host ID matches with the one stored for the transformation ID. If the request is valid, then an ACK is sent and the responder waits to receive the file. Otherwise, a NACK is sent; and (3) the initiator sends the file to the responder.

The Notification request is used either for: sending a message to the administrator in the event of a failure, or for sending a message to another ETS in the event of a transformation failure. The former is used when a catastrophic failure occurs or when various time-outs expire without any relevant response. Here, the initiator sends a transformation ID of the order, which resulted in the failure and a text message.

Although an exemplary set of commands is disclosed, further commands to extend the functionality can be added to the above list. In addition, the list of arguments to each of the commands can also be extended to accommodate a particular situation. For example, a unique ID can be added to the transformation request parameters which then can be used by the responder to modify the behavior of a particular transformation or a subset of the converters.

Figure 8:
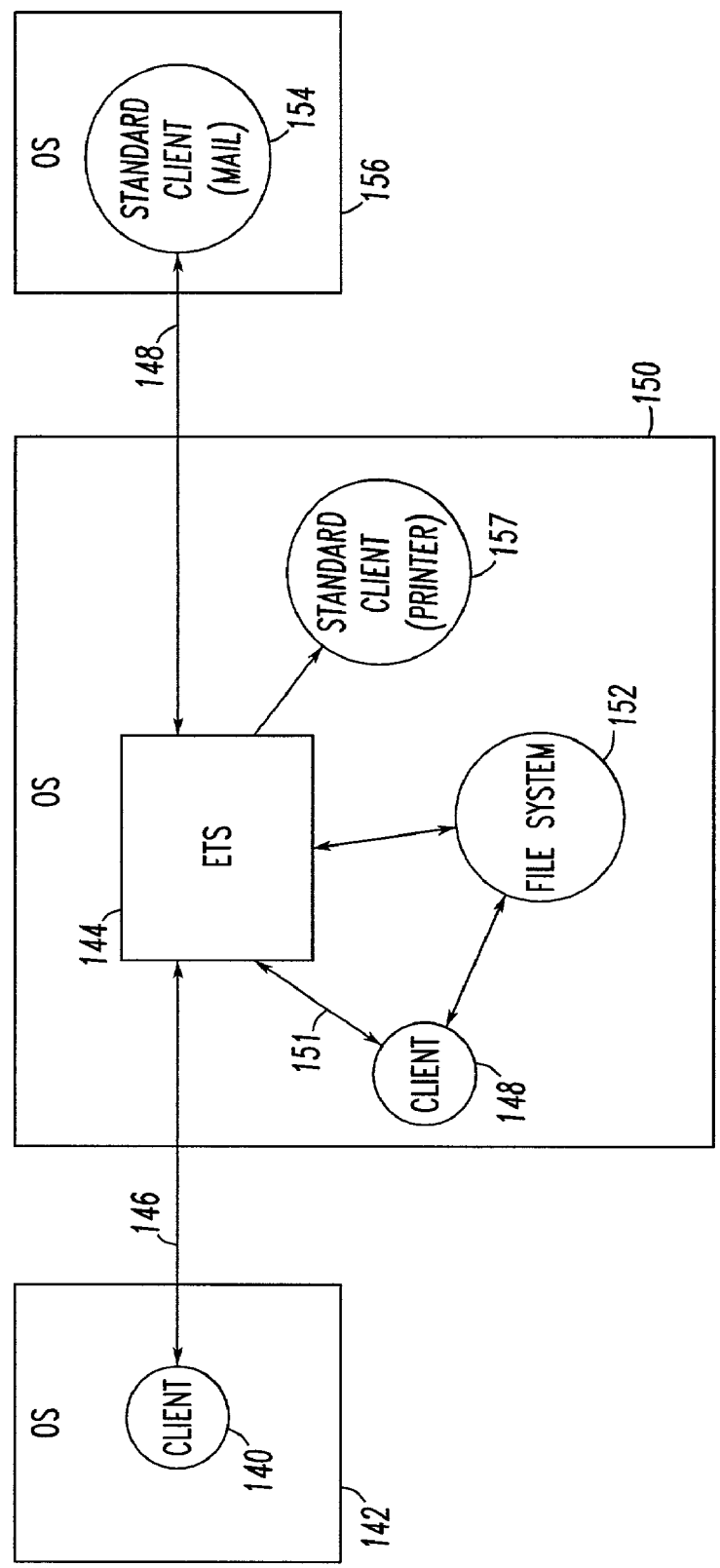
FIG. 8 is a block diagram showing file acquisition and disposition by an ETS in accordance with the present invention.

The file to be transformed by an ETS may be acquired or disposed of in a variety of ways. FIG. 8 summarizes the various paths of such acquisition and disposal. For a client 140 on a different operating system (OS) 142 than that of the ETS instance 144, all communication happens over the external network link 146. Otherwise, for client software 148 in the same OS 150 as the ETS instance 144, the file transfer may happen through the local OS file system 152. The client 148 and the ETS 144 are suitably connected by an internal "network" link 151. Similarly, disposition can happen through both the external network link 148 (which may be the same as the link 146) or the local file system 152. In the case of disposition, the results may also be packaged in such a way that a standard client 154 (e.g., mail system, facsimile, printer) on another OS 156 can also accept the transformed file. A standard client does not need to understand the rest of the ETS protocol.

For acquisition, a file may be available either in the file system 152 or via the computer network 146,148, which results in the file being sent to the file system 152. The two approaches are distinguished in the transformation request by the type of the acquisition and its parameters. If the type is NETWORK, then a pure number is the argument which represents the SIZE of the file to be received over the network 146. If the type is COPY, then the argument is a character string, which defines the location of the file in the file system 152, in order that the ETS 144 can obtain it from the specified location. Typically, file transfer over the network 146 is employed. The COPY acquisition type is useful when both the requesting application and the ETS instance 144 are under the same operating system. This is because both the requesting application and the ETS instance must have access to same file system. A shared file system (not shown), residing on an entirely different host on the network can also be used when both the client and the ETS have appropriate permissions to access the file system over the network.

If the original source of the file is some other hardware device (e.g., facsimile, scanner), then an intermediate agent (not shown) is responsible for the acquisition of the bits and depositing them on the network pipe (not shown) or in the file system 152. Note, however, that by using the COPY acquisition method on operating systems that deal with hardware devices in a uniform way (such as Unices), any hardware device can become the direct source of a file.

Furthermore, any input file may be encoded for various reasons (e.g., compression (reducing disk space and network traffic), transmission (sending binary 8-bit data over a 7-bit link)). This is accomplished via the encoding argument in the Transformation request.

Similar to the acquisition case, the results of the transformation may be disposed of in a variety of ways. Certain transformations may impose rigid requirements on the type of final output generated. For example, a print request (e.g., a transformation of the form <source mime type> <postscript printer>) to local printer 157 necessarily results in the output being on some form of "hard copy" such as paper, and its disposition necessarily requires physical "hard copy" transmission. Similar to the acquisition case, certain hardware devices may be the targets of the final disposition by using the COPY disposition type where, if the operating system supports it, the COPY destination is the hardware device rather than a conventional disk file.

On the other hand, for the more general case in which the final result is in the form of a traditional computer file, the mechanisms to return the file are also varied. While there are a very large number of methods of acquiring the source file for a transformation and a similarly large number of methods for disposing of the results of the transformation, the most common of these are shown in FIGS. 9A–9E. For simplicity of illustration, the initial connection, authentication, and other exchanges between the initiator (I) and the responder (R) are not shown. In FIGS. 9A–9E, ETS1 is the original requestor or initiator I and ETS2 is the original responder R. Except as noted, the communication process is ideal in the sense that potential negative acknowledgement(s) (NACK (s)) are not shown.

Figure 9A:
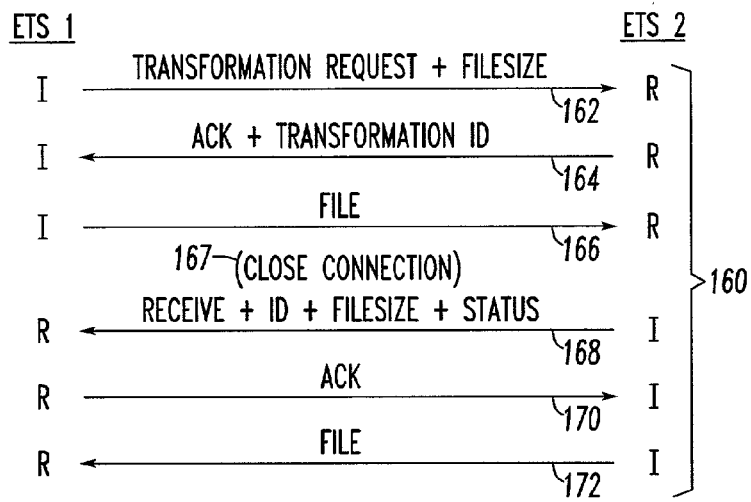
FIGS. 9A–9E show file acquisition and disposition communications between two peer ETSs in accordance with embodiments of the present invention.

FIG. 9A shows the RETURN disposition method 160. In this method, ETS1 indicates that ETS2 should return the results of the transformation to the initiator once it is completed. At 162, ETS1 sends a transformation request with the RETURN disposition method, the host address of the ETS1 (Table 1) as the disposition argument, and the file-size. As a security policy decision, the host address can be fixed at the initiator's host address (thus disallowing third party transfers). If this is acceptable to ETS2, then it returns an ACK along with a transformation ID at 164. ETS1 sends the file to ETS2 at 166. The ETS2 sends an ACK (not shown). Both sides close the connection at 167.

At this point, ETS2 processes the transformation order just received from ETS1. When the transformation order has been completed on ETS2, it opens a connection to ETS1 and sends the RECEIVE command along with the transformation ID, the status of the transformation, and the resulting file-size to ETS1 at 168. If this is acceptable to ETS1 (i.e., the ID is correct and it is able to receive the file), then ETS1 sends an ACK to ETS2 at 170. ETS2 sends the file to ETS1 at 172. The ETS1 sends an ACK (not shown), and both sides close the connection. Finally, ETS2 cleans-up all information about this transformation order.

Figure 9B:
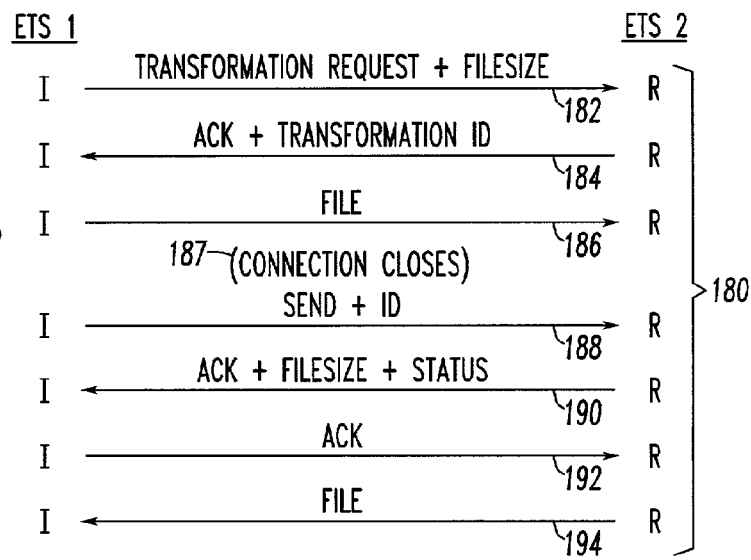

The HOLD disposition method 180 is shown in FIG. 9B. In this method, ETS1 requests ETS2 to hold on to the results of the transformation. Implicitly, ETS1 will, at a later time, initiate a connection and request that ETS2 return the result by using a SEND command (Send File request). The two sides negotiate the maximum amount of time that ETS2 will hold the result after which ETS2 is free to clean up the transformation order. At 182, ETS1 sends a transformation request with the HOLD disposition method, the number of minutes it would like ETS2 to hold the result before it is free to clean up, and the file-size. If this is acceptable to ETS2, it returns an ACK, which contains the maximum time that ETS2 is willing to hold the result, along with a transformation ID at 184. If the response from ETS2 (i.e., the amount of time it is willing to hold the result) is acceptable, ETS1 sends the file to ETS2 at 186. Otherwise, ETS1 and ETS2 close the connection. After 186, ETS2 sends an ACK (not shown) to ETS1, and both sides close the connection at 187.

Within the agreed upon HOLD time, ETS1 initiates a connection with ETS2 to retrieve the result. ETS1 sends a SEND command with the transformation ID at 188. If the transformation for this ID has not yet been completed, then ETS2 returns a NACK (not shown) with the PENDING response message. On the other hand, if the transformation for this ID has been completed, then ETS2 sends an ACK, the conversion status, and the resulting file-size at 190. If this is acceptable to ETS1 (i.e., it is able to receive the file), then ETS1 sends an ACK to ETS2 at 192. ETS2 sends the file to ETS1 at 194. The ETS1 sends an ACK (not shown), both sides close the connection, and ETS2 cleans-up all information about this transformation order.

Figure 9C:
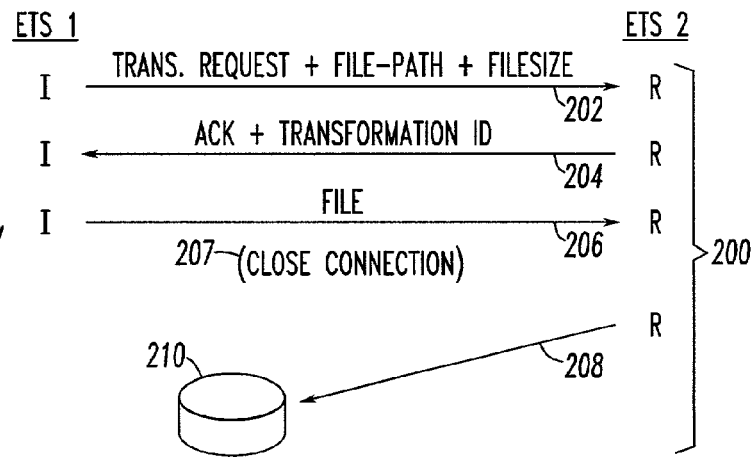

The COPY disposition method 200 is shown in FIG. 9C. In this method, in which the two sides share a common file system, ETS1 requests ETS2 to copy the final file transformation to the given file location. If the underlying operating system permits the operation, the COPY method may be employed to send the result to a device (such as a facsimile machine or a printer) by specifying the device as the final destination path. ETS1 sends a transformation request with the COPY disposition method, the file-path to where the final result should be placed as the disposition argument, and the file-size at 202. If this is acceptable to ETS2 (i.e., ETS2 has write permission on the relevant destination path), then it returns an ACK along with a transformation ID at 204. ETS1 sends the file to ETS2 at 206. The ETS2 sends an ACK (not shown), and both sides close the connection at 207. When the transformation order has been completed on ETS2, at 208, it copies the final result to the given destination 210 (e.g., disk, printer). If a mail address was specified along with the transformation request, then mail (not shown) is sent indicating the status of the result. Finally, ETS2 cleans-up all information about this transformation order.

Figure 9D:
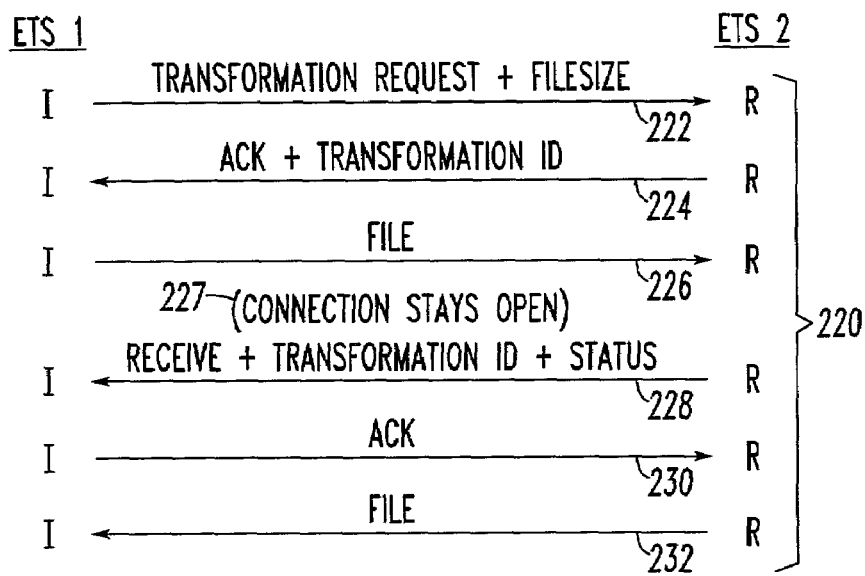

The WAITING disposition method 220 is shown in FIG. 9D. In this method, the initiator indicates that it would keep the network connection open until the transformation is completed. At that point, the responder returns the results using the open connection. ETS1 sends a transformation request with the WAITING disposition method and the file-size at 222. If this is acceptable to ETS2, it returns an ACK along with a transformation ID at 224. ETS1 sends the file to ETS2 at 226. The ETS2 sends an ACK (not shown), and ETS1 waits with the connection still open at 227. When the transformation order has been completed on ETS2, it sends the RECEIVE command to the waiting ETS1 along with the transformation ID, the status of the transformation and the resulting file-size at 228. If this is acceptable to ETS1 (i.e., the ID is correct and it is able to receive the file), then ETS1 sends an ACK to ETS2 at 230. ETS2 sends the file to ETS1 at 232. The ETS1 sends an ACK (not shown), and ETS2 cleans-up all information about this transformation order.

Figure 9E:
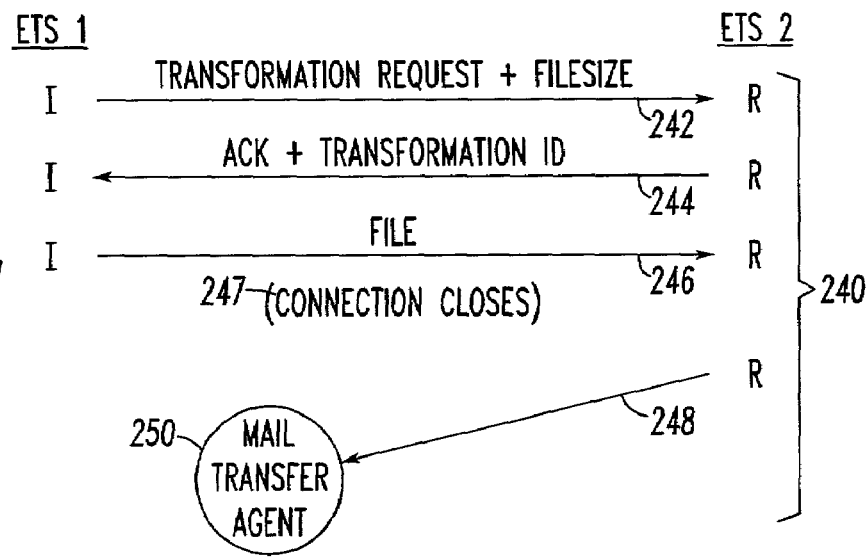

The MAIL disposition method 240 is shown in FIG. 9E. In this method, the ETS1 initiator indicates that the ETS2 responder should return the results of the transformation to the initiator as a mail message (i.e., e-mail). ETS1 sends a Transformation request with the MAIL disposition method, the mail address as the disposition argument, and the file-size at 242. As a security decision, the host part of the mail address can be fixed at the initiator's host address in order that a third party transfer is not possible. If this is acceptable to ETS2, then it returns an ACK along with a transformation ID at 244. ETS1 sends the file to ETS2 at 246. The ETS2 sends an ACK (not shown), and both sides close the connection at 247. When the transformation order has been completed on ETS2, it creates a mail message whose contents are the status of the conversion and the resulting file is packaged as an enclosure. The mail is then sent at 248 to the designated address through a suitable mail transfer agent (MTA) 250. Finally, ETS2 cleans-up all information about this transformation order.

Figure 10A:
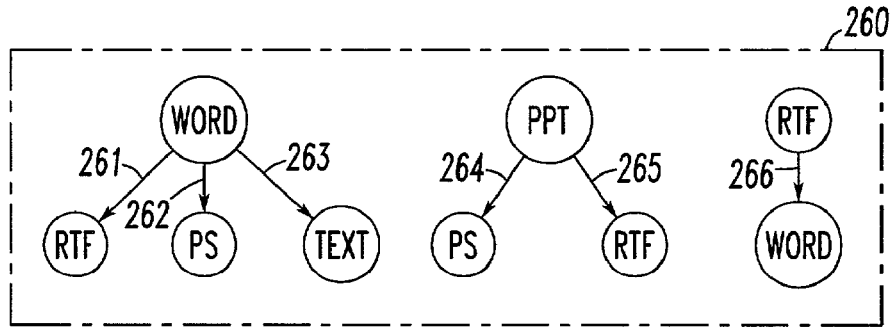
FIG. 10A shows wrappers and applications employed by an ETS in accordance with the present invention.
Figure 10B:
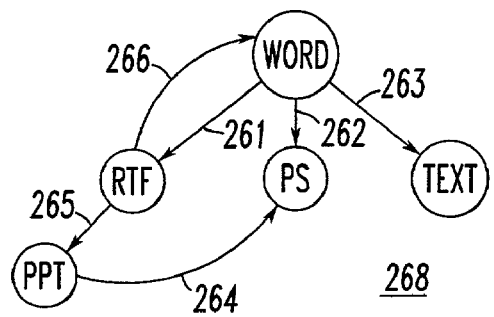
FIG. 10B shows a graph for the wrappers and applications of FIG. 10A.

FIG. 10A shows an example of an ETS (Instance A) 260 that has six local wrappers 261–266. The wrappers are: (1) 261: Word to RTF; (2) 262: Word to PS; (3) 263: Word to Text; (4) 264: PPT to PS; (5) 265: PPT to RFT; and (6) 266: RTF to Word. Of the above, wrappers 261, 262, 263 and 266 use the same application MS Word, and wrappers 264 and 265 use the application PowerPoint. FIG. 10B shows the corresponding graph 268 after merging together the duplicated nodes. For example, to go from a PPT file to a Text file, one may go through the following sequence of conversions: PPT to RTF (265); RTF to Word (266); and Word to Text (263).

Figure 11A:
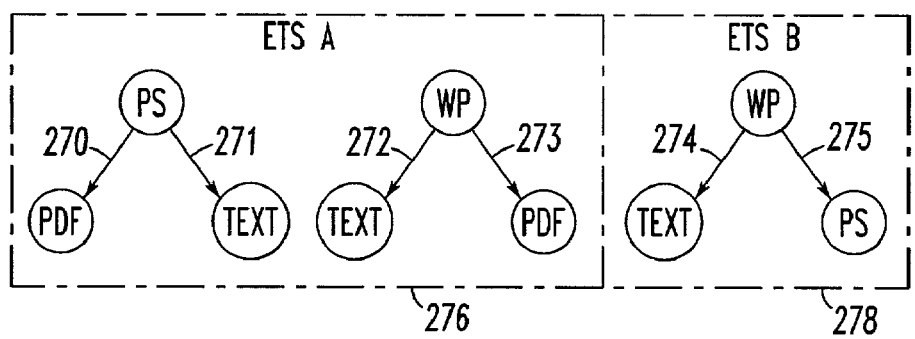
FIG. 11A shows wrappers and applications employed by two peer ETSs in accordance with the present invention.

Each edge is unique in a transformation graph and is further composed of one or more edgelets. Each edgelet represents a unique application wrapper (either locally available or remotely available). Consider the six wrappers 270–275 shown in FIG. 11A belonging to two different ETS instances (e.g., Instance A 276 is under Linux OS and Instance B 278 is under Windows OS). The wrappers 270–275 are as follows, for ETS A 276, 270: PS to PDF; 271: PS to Text; 272: WP (WordPerfect) to Text; and 273: WP to PDF, and for ETS B 278, 274: WP to Text, and 275: WP to PS.

Figure 11B:
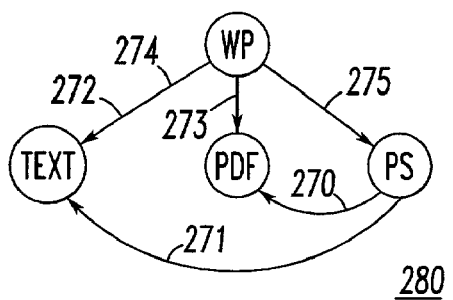
FIG. 11B shows a graph for the wrappers and applications of FIG. 11A.

The corresponding transformation graph 280, after merging together the wrappers 270–275 from each of the ETSs (A and B) 276,278, is shown in FIG. 11B. There are two edgelets (wrappers 272,274) corresponding to the edge representing the conversion from WordPerfect (WP) to Text. In addition to edge 273, there is another way (edges 275 and 270) of transforming a WordPerfect file to PDF via an intermediate format (i.e., PS). Thus, a WP to PDF transformation can be performed in two ways: a direct method, and a two-step conversion sequence.

If, however, the two exemplary WordPerfect applications are considered different (e.g., because one may want to distinguish between the Linux version and the Windows version), the two nodes corresponding to the WordPerfect format cannot be merged into a single node and the resulting graph would be different (not shown).

Each edgelet may also be associated with attributes employed for graph operations, and statistical and cost calculations. For example, these attributes include: (1) the number of times that the wrapper corresponding to the edgelet failed; (2) whether the edgelet is local or remote; (3) if local, whether it is built-in or not; (4) the speed; (5) fidelity; (6) monetary cost of the conversion; and (7) if remote, the speed of the network link.

In summary, an edge represents the capacity to perform a conversion, while an edgelet represents the actual agency (converter) through which the transformation is performed. The data stored by each structure reflects this division. The edge consists of the source and destination types, and an ordered list of one or more edgelets.

Figure 20:
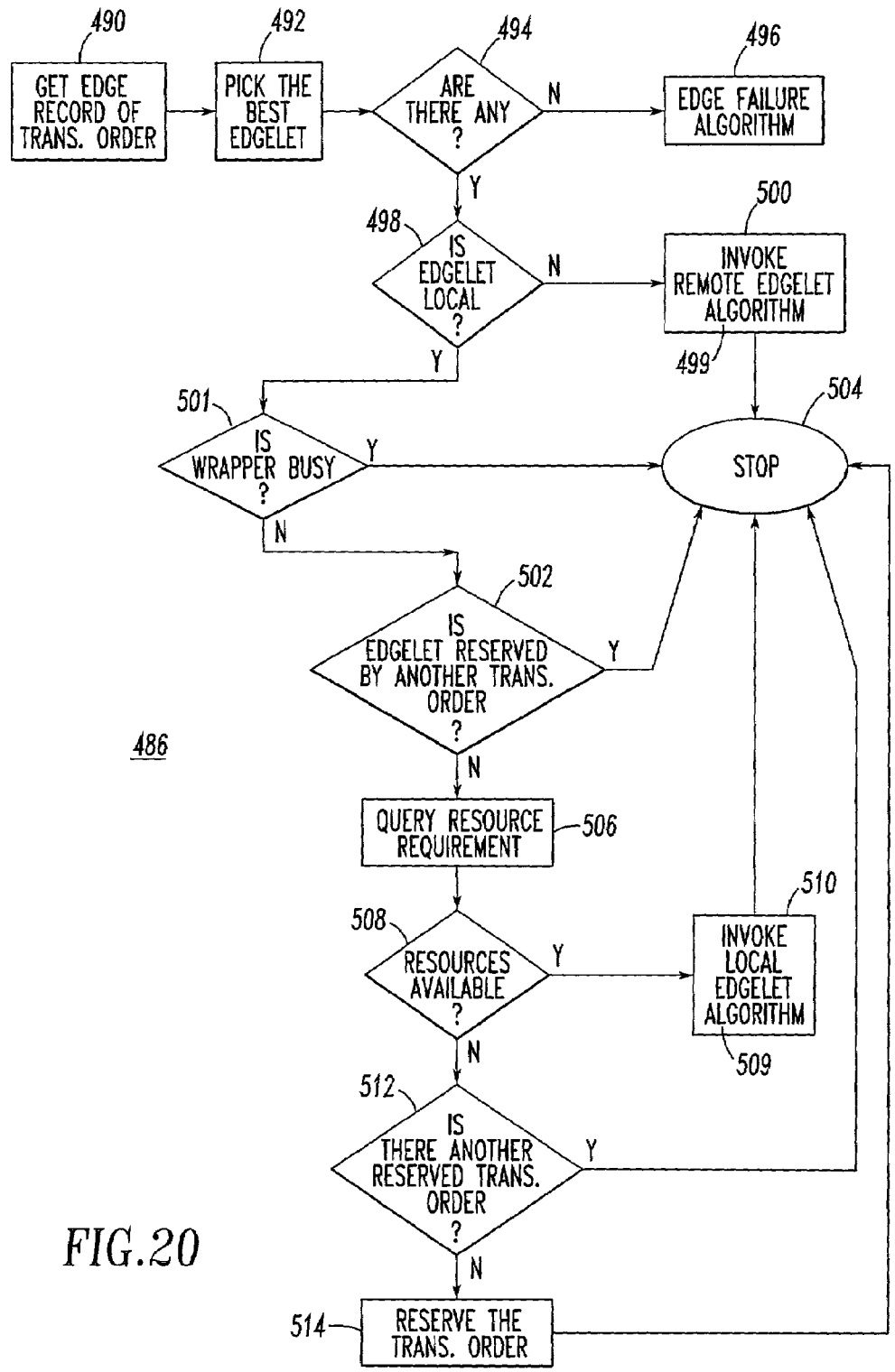
FIG. 20 is a flowchart of an Edgelet Pick algorithm employed by an ETS in accordance with the present invention.

The actual ordering of an edgelet list is subject to the ETS instance and may change to accommodate reliability, scalability and the like. This capacity is noted in the Edgelet Pick algorithm 486 (FIG. 20). The edgelet, in turn, includes information useful for executing the associated wrapper: invocation costs, wrapper path, and the current state of the wrapper (IDLE or not).

The graph module 96 of FIG. 5 also maintains a list of any edgelets that have failed too many times. Initially, this list is empty. Edgelets are inserted in this list during the operation of the ETS instance when they fail too many times (as discussed below in connection with updating the transformation order).

The transformation graph (e.g., 50 of FIG. 4) may also be represented as an adjacency matrix. An adjacency matrix is a square matrix where each row and each column represents a unique type. The matrix is initially filled with zeros. A logic zero (0) entry indicates that no conversion path exists between the file type indicated by the row to the file type indicated by the column. A logic one (1) is entered for the case where a one-step conversion path exists. An entry of one in the matrix also denotes that there is an edge in the corresponding graph. As a special case, a one is also entered for the trivial case of self-transformability (e.g., a PDF to PDF conversion is trivial, if not unnecessary, and no wrapper is really required). FIG. 12A shows an exemplary Adjacency Matrix 290, A, for the wrappers 261–266 of FIG. 10B.

As shown in FIG. 12B, a second matrix R, Reachability Matrix 292, is created from the first matrix, A 290. This new matrix, R, has the same dimension as the matrix A except that an entry of one (1) indicates that the particular transformation is possible using zero or more conversions. Preferably, a version of the Floyd-Warshall algorithm (see Cormen, T. H., et al., Introduction to Algorithms, pp. 552–565, The MIT Press, McGraw Hill Book Company, ISBN 0-262-03141-8) employs a dynamic programming method to obtain the Reachability Matrix R. The process is known as finding the transitive-closure of the Adjacency Matrix A. The idea of this algorithm is based on the observation that the Reachability Matrix R can be incrementally constructed by finding two-step conversion paths using some intermediate format. There can be two paths from one format type, i (a row entry in the matrix), to another format type, j (a column entry in the matrix): (a) the corresponding entry, $r_{ij}$, is already one, or (b) a path exists from the source type, i, to another intermediate type, k, and a path exists from the intermediate type, k, to the destination type, j.

Since there are n types of formats, by performing the above steps for all possible format types (i.e., k takes a value from 1 through n), the algorithm is guaranteed to find the Reachability Matrix R. The algorithm 300 is shown in FIG. 13. First, at 302, set matrix R=matrix A, and set temporary matrix T=NULL (all zeros). At 304, set k=1. Set i=1 at 306, and set j=1 at 308. Set the entry $t_{ij}$ in matrix T as follows: $t_{ij} = r_{ij}$ OR ($r_{ik}$ AND $r_{kj}$) at 310. Increment j by 1 at 312. If j is less than or equal to n at 314, then go to step 310. Otherwise, increment i by 1 at 316. If i is less than or equal to n, then go to step 308. Otherwise, set matrix R=matrix T at 320, and increment k by 1 at 322. If k is less than or equal to n at 324, then go to step 306. Otherwise, the algorithm 300 is completed at 326.

Ordinarily, the algorithm 300 can become very time consuming for very large matrices (e.g., order of ($n^3$) in the worst case), but since this is done very infrequently (i.e., only when the graph changes), this is usually of no consequence. There are many known techniques to speed up the computation if needed.

A feasibility check for a given transformation from a source type to destination type merely employs a lookup in the Reachability Matrix. This can be done very fast and, hence, one can rule out any infeasible transformation request as soon as the request is made. For example, in the Reachability Matrix 292 of FIG. 12B, PPT to Text is feasible, and Word to PPT is not feasible.

All ETSs in a peer network know the entire graph and the corresponding Reachability Matrix as long the security requirements allow each ETS to get the graph of every other ETS in the system.

Figure 21:
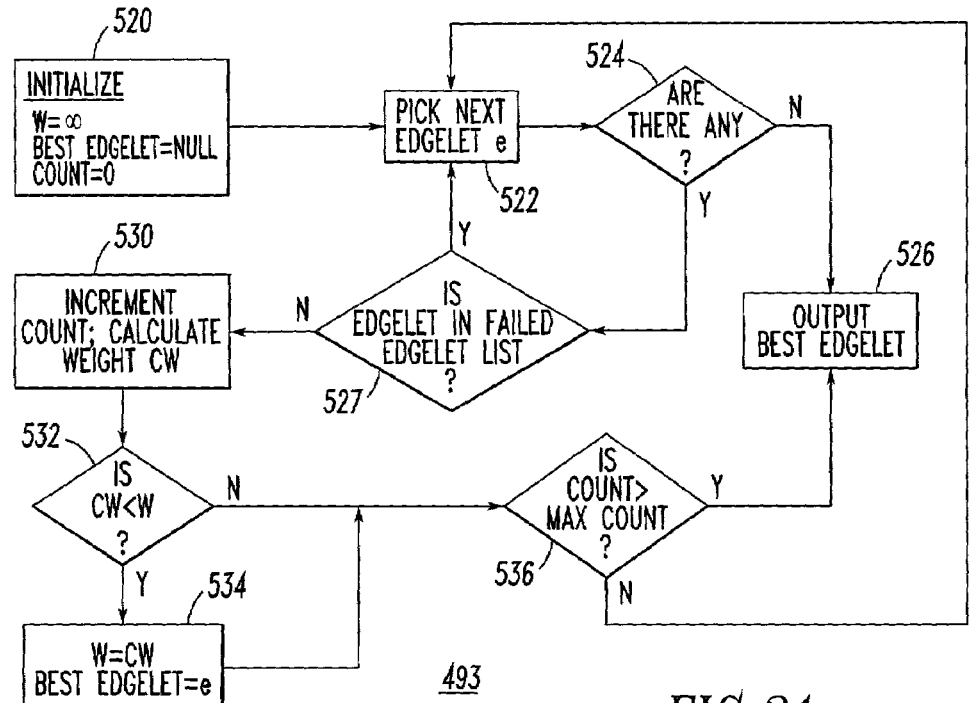
FIG. 21 is a flowchart of a Best Edgelet algorithm employed by an ETS in accordance with the present invention.

The ETS employs a three-stage algorithm (FIGS. 14–25) to obtain Quality-of-Service (QOS), reliability, and scalability. The three-stage transformation process includes: (1) a fast feasibility check; (2) Optimal Path selection (FIGS. 15 and 16); and (3) selecting the best edgelet or the converter (FIG. 21). Initially, each ETS instance publishes its available services to its peers in the form of a graph wherein each node is a labeled document format type. The edge, if it exists, represents the existence of at least one converter able to convert from one node format type to the other node format. The Reachability Matrix is also constructed. The three-step transformation path selection is efficient from a service point of view in that the validity of requests may be determined relatively quickly even when the graph is large and there are many edges in the graph.

In the exemplary method, the graph is defined only over the different format types with a single edge between two format types if and only if there is at least one edgelet that performs the necessary conversion between those two types. An alternative formulation would be to define the graph over all the combination of mime types and converters. However, this could, potentially, lead to a very large graph and since graph algorithms tend to degrade rapidly based on the number of edges and nodes in them, keeping the graph small pays off in terms of efficiency (both disk and/or memory storage of the graph and computation).

In order to use the exemplary three-step process, a prerequisite is the calculation of the Reachability Matrix (FIG. 12B) that is computed easily from the Adjacency Matrix (FIG. 12A), although this computation might be expensive. However, there are features of this matrix multiplication that can be used to reduce the expense of the computation. In any case, this is a startup expense (or re-startup) which can be amortized over the many transformation requests that an ETS is expected to receive. Given this pre-requisite Reachability Matrix, the three exemplary steps are summarized below.

First, a high-speed check of the feasibility of the requested transformation(s) is made employing a Reachability Matrix lookup. This matrix is constructed when the transformation graph is created or modified and can be used to very efficiently determine if the requested destination format can be obtained from the given source format using any combination of available converters. Second, the optimal path is selected (i.e., the series of edges of the graph that must be traversed in order to achieve the feasible transformation request). An optimal path is one that has the least "cost" of the set of feasible paths. Third, for each edge on the transformation path identified in the second step, above, select a specific converter from the set of available converters to traverse the edge. The ETS instance determines which transformation would be the best based on a dynamic vector of attributes characterizing each converter. This may be solved in linear time, which is based upon the count of edgelets for the edge.

Wrappers may be added or deleted while the ETS is running. The most common examples are when the system administrator adds/deletes a wrapper, a new peer is discovered (as discussed below in connection with dynamic updating), a peer shuts down, or when a peer informs the ETS that a wrapper is added/deleted. Wrapper deletion also takes place when the converter determines that a wrapper has failed too many times and must be removed. In any case, the graph needs to be updated. Adding/deleting edges is the consequence of adding/deleting edgelets, since an edge represents one or more edgelets.

For edgelet addition, the steps include: (1) finding the corresponding edge in the graph; (2) if there is no edge, then creating a new edge and recomputing the Adjacency Matrix, A, and recomputing the Reachability Matrix, R; and (3) adding to the list of edgelets for the edge.

For edge/edgelet deletion, the steps include: (1) finding the corresponding edge in the graph; (2) deleting the edgelet from the list of edgelets; and (3) if the list becomes empty, then deleting the edge and, also, recomputing the Adjacency Matrix, A, and recomputing the Reachability Matrix, R.

Figure 14:
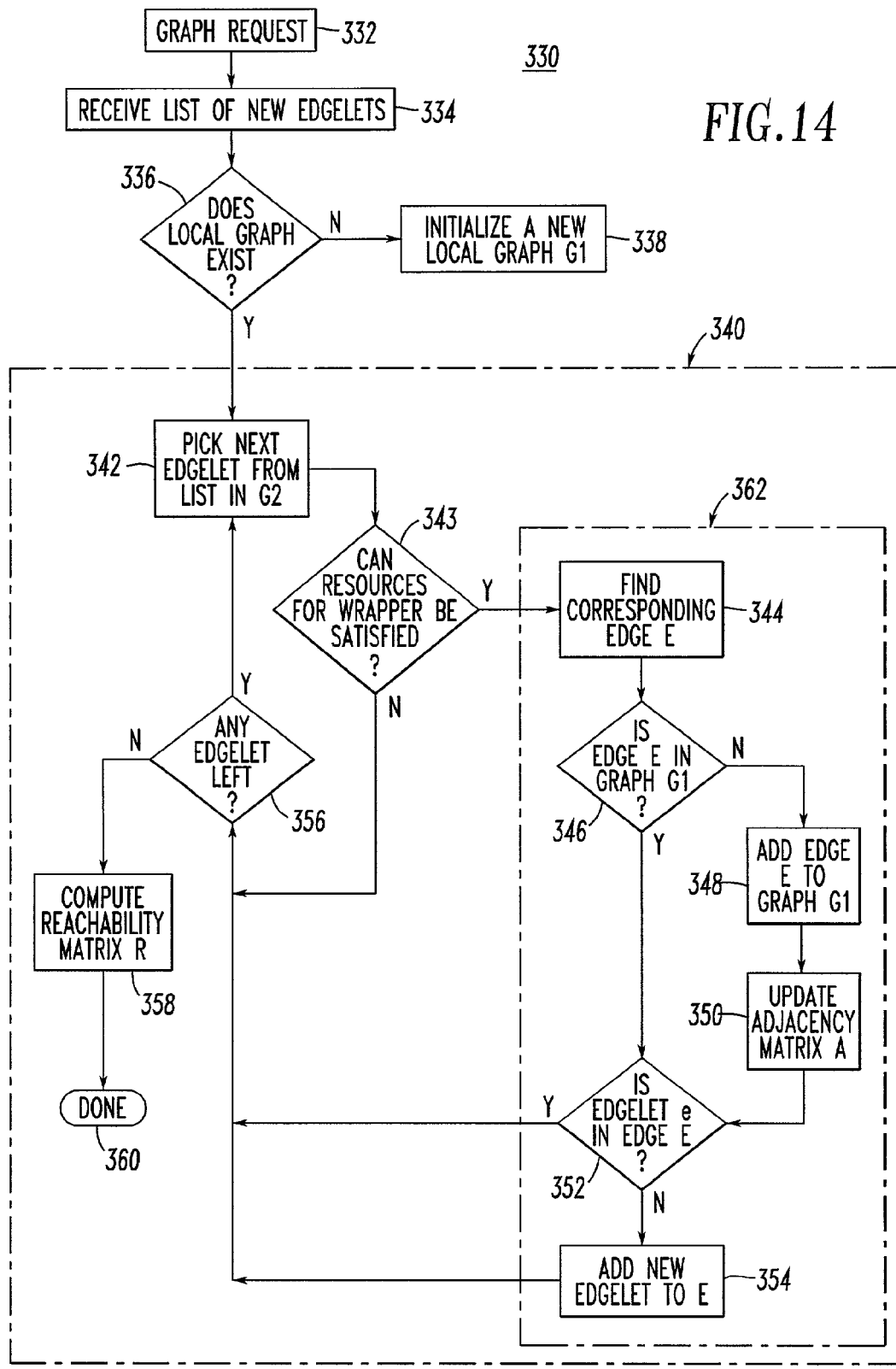
FIG. 14 is a flowchart of a Graph Formation algorithm employed by an ETS in accordance with the present invention.

FIG. 14 shows the Graph Formation algorithm 330. First, a graph request, either local or global, is issued from another ETS instance at 332. The local ETS receives a list of new edgelets at 334. If a local graph does not exist yet at 336, then initialize a new local graph G1=NULL at 338. Otherwise, for each edgelet in the received graph, G2, merge the edgelet (using the Graph Merge algorithm 340) to the local graph, G1, as a local/remote wrapper. For efficiency, only the Adjacency Matrix is updated when an edge is added. Finally, when all peer lists have been obtained and processed, the Reachability Matrix, R, is computed.

FIG. 14 represents the process by which two ETS transformation graphs are merged into a whole. This assumes the existence of an ETS with an existing local transformation graph (G1), which has just received a transformation graph (G2) from another ETS. ETS instances receive graphs as unrelated collections of edgelets. It is up to the receiving ETS instance to incorporate the edgelets into its own graph. The Graph Merge algorithm 340 performs as follows. At 342, pick a new edgelet, e, in G2. Local edgelets can be added only if the resources required are available. This is checked at 343. If the requirements cannot be met, then 356 is executed. That is, if the ETS does not have adequate resources to ever run an edgelet, then that edgelet is not added to the inventory (and the corresponding edges are not added to the graph G1). Thus, every edgelet in the inventory is guaranteed to be able to run given the sum total of all resources available to the ETS. If the requirements can be met, then at 344, the corresponding edge, E, for edgelet e is determined. At 346, it is determined whether edge E is in graph G1. If edge E is not in G1, then add the edge E to graph G1 at 348, and update the Adjacency Matrix at 350. Thus, if G1 does not have an edge corresponding to edgelet e, then create a new edge E, with a type corresponding to edgelet e's conversion type.

Otherwise, at 352, determine whether edgelet e is in edge E. Edgelets are grouped together in edges, which represent a single conversion service (e.g., a Postscript→PDF conversion). If an ETS instance knows of one or more edgelets that perform that conversion service, then its transformation graph possesses an edge of the corresponding type. Thus, if edgelet e is not present at 352, then add edgelet e to the edge E at 354. Regardless, at 356, determine if there are any unexamined edgelets left in G2. If there are, at 356, then go back to step 342 of the Graph Merge algorithm 340. Otherwise, at 358, compute the Reachability Matrix before completing the algorithms 330,340 at 360. Steps 344, 346, 348, 350, 352, and 354 define an Edgelet Add algorithm 362.

Figure 15:
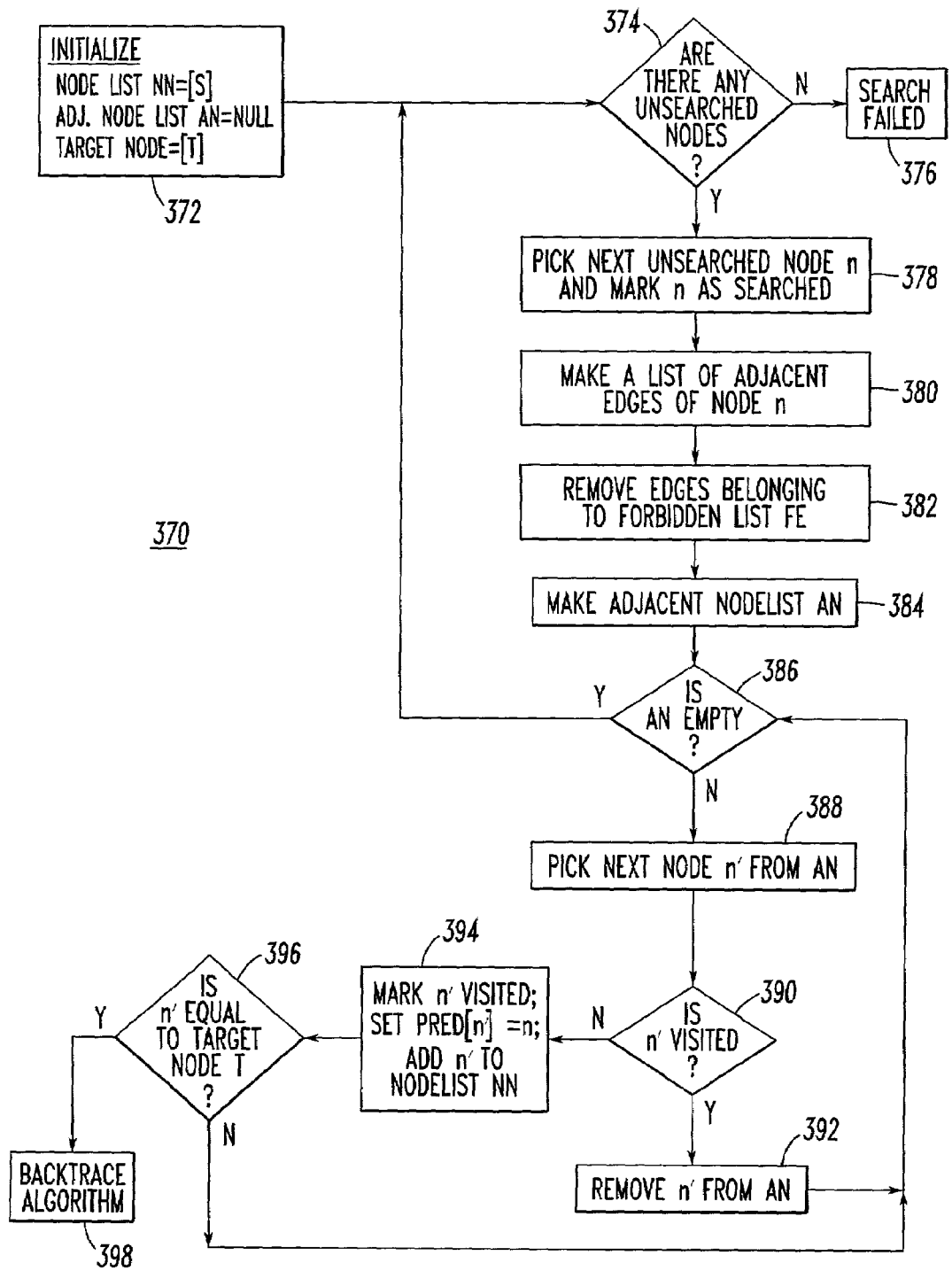
FIG. 15 is a flowchart of an Optimal Transformation Path (OTP) Selection algorithm employed by an ETS in accordance with the present invention.

Referring to FIG. 15, for Optimal Transformation Path (OTP) selection, the following information is given: (1) a pair of source and destination file format types; and (2) a list of forbidden edges (i.e., those edges that have failed too many times for this transformation order). The objective is to find the optimal path (i.e., a list of edges) using a suitable Shortest Path algorithm. In this embodiment, a variation of the Breadth-First Search (BFS) algorithm (Cormen et al., Introduction to Algorithms, pp. 469–75; 532–35) is used, although any suitable graph algorithm may be employed. In one embodiment of the present invention, ETS transformations are predicated on minimum wrapper count. That is, the transformation should, ideally, traverse the minimum possible number of edges.

Consider the problem of getting from format type A to format type D (in which the numbers in parentheses refer to cost). Try: (1)A→(10)B→(20)C→(30)D; versus: (2)A→(70)D. In this example, one would prefer the first route because there is no inherent penalty (e.g., the cost is 60 versus 70) in going through B and C to get to D. However, if there is a penalty to simply visiting intermediate points (i.e., intermediate conversions), then the direct path can turn out to be less expensive. This principle is employed in the OTP determination algorithm 370, which guarantees a shortest path if such a path is available. The exemplary Breadth-First Search progresses as follows. A transformation graph G, a start node S, a target node T, and a list of forbidden edges FE are assumed to be known. Edges are "forbidden" in the case of a conversion failure. If a conversion fails with a specific edge (i.e., all available wrappers on this edge have failed for this request), then that corresponding edge is marked as being forbidden.

Referring to FIG. 15, at 372, a new Node list, NN, is initialized including the source node S. The predecessor of node S is set to null (Pred(S)=NULL), and the node S is marked as unsearched and not visited. This node list is a queue of nodes to be visited by the Breadth-First Search. The predecessor table is employed to look up the node, which was searched directly before the target node, and to construct an optimal path in the final step. Also, the Adjacent Node list AN is set to NULL, and the Target Node is set to T.

Then, at 374, it is determined if there are any unsearched nodes in Node list NN. If no, then the search failed at 376. Otherwise, at 378, the next unsearched node, n, is picked in Node list NN, and node n is marked as searched. At 380, a list is made of the adjacent edges of node n, by finding all the out-directed edges of n, where n is the source node. Next, at 382, all the edges are removed which match any of the edges in the forbidden list FE. Then, at 384, the Adjacent Node list AN is set to the target nodes of all the found edges. An adjacent node has an edge in common with n, for example, if there is a path from Postscript to PDF, then PDF is adjacent to Postscript. If Adjacent Node list AN is empty at 386, then go back to step 374. Otherwise, at 388, pick the next node n' from the Adjacent Node list AN.

Next, at 390, the Node list NN is checked to find if node n' is visited already. If so, at 392, then node n' is removed from Adjacent Node list AN and that list is rechecked at step 386, to determine if the list is empty. Otherwise, if node n' was not visited, then it is marked as visited at 394. Also, the predecessor of n' is set to n (i.e., Pred(n')=n) and node n' is added to the Node list NN. Then, at 396, if node n' is equal to the target node T, then stop and execute the Backtrace algorithm 398 of FIG. 16. Otherwise, the Adjacent Node list AN is rechecked at step 386.

Figure 16:
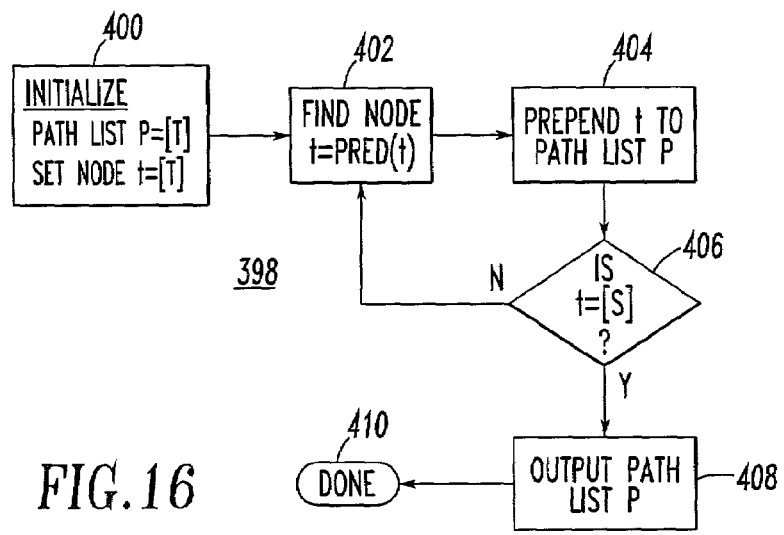
FIG. 16 is a flowchart of a Backtrace algorithm employed by an ETS in accordance with the present invention.

The Backtrace algorithm 398 of FIG. 16 begins by initializing the Path list P with the target node T, and setting a node t equal to target node T at 400. Then, at 402, the node t is set equal to Pred[t] (i.e., predecessor of node t). Next, at 404, add node t to the beginning of path list P. Then, at 406, if node t is the same as the source node S, then output the path list at 408, before completing the algorithm 398 at 410. Otherwise, resume execution at step 402. The output of the Backtrace algorithm 398 is an ordered list of edges, which represent the sequence of steps to be performed to accomplish the requested transformation.

Figure 17:
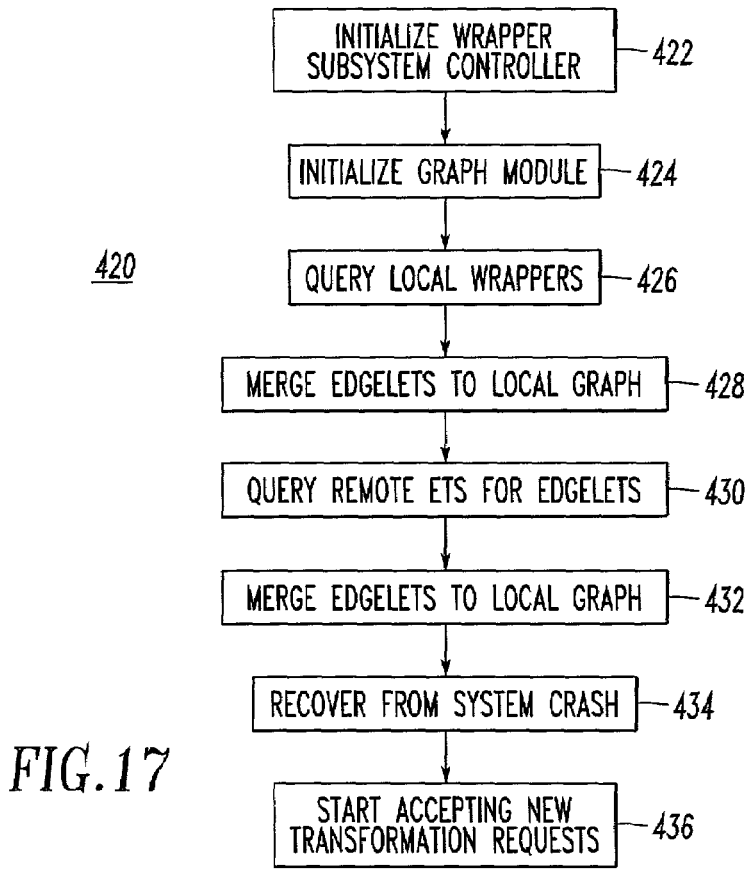
FIG. 17 is a flowchart of an initialization routine employed by the ETS of FIG. 5.

FIG. 17 shows the initialization routine 420 for the transformation module 92 of FIG. 5. During this initialization period, no new transformation requests are processed (i.e., module 92 is disabled). The initialization is started when instructed by the init module 76. First, at 422, the wrapper subsystem controller 102 is initialized. Then, the graph module 96 is initialized at 424. Next, at 426, the local wrappers 104,106 (through the wrapper subsystem controller 102) are queried for all locally available wrappers and that information is passed to the graph module 96. The graph module 96 then builds the transformation graph from this information at 428. Then, at 430, other ETSs from the Peer Host list are queried for their graphs. Remote graph information is received from each configured other ETS and the local transformation graph is extended to incorporate the remote ETS edgelets at 432. Next, at 434, if needed, recovery is provided from a system shutdown or a crash, and the pending and incomplete transformation orders are re-queued. This step is similar to processing normal transformation requests. Finally, new transformation requests are accepted at 436.

Figure 18:
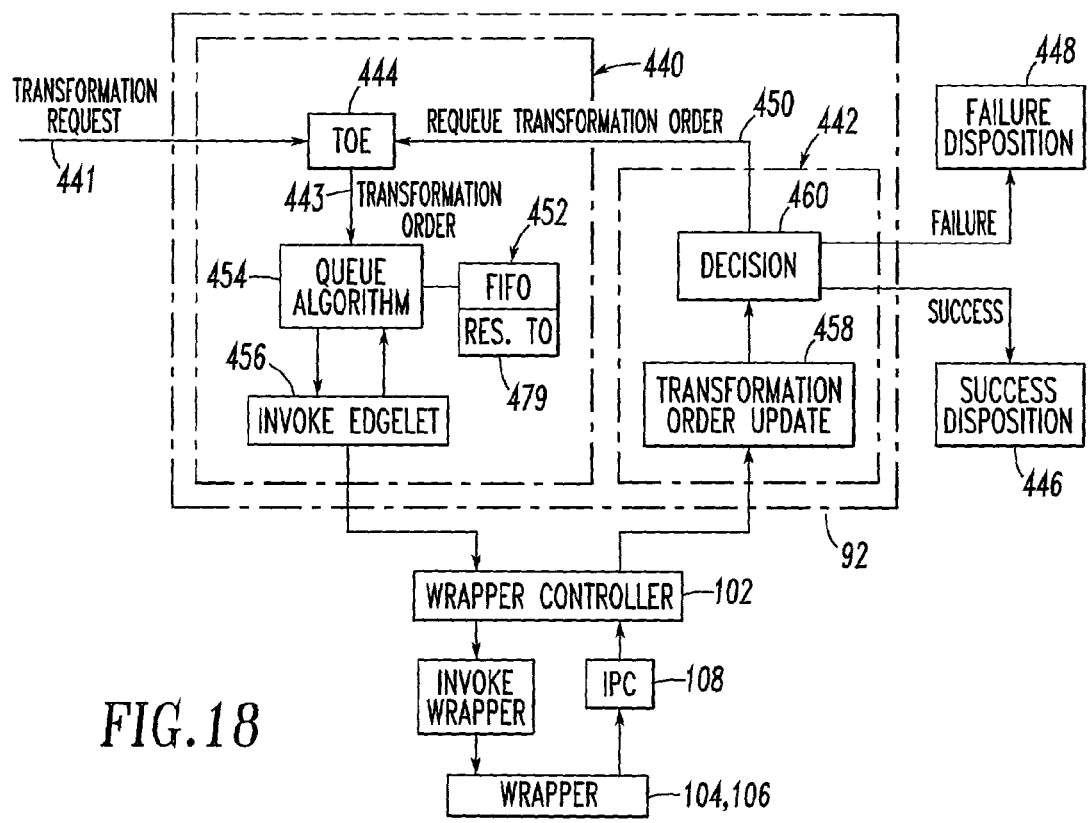
FIG. 18 is a block diagram of various interfaces and the queue processing and transformation order updating functions of the transformation module of the ETS of FIG. 5.

As shown in FIG. 18, there are two main purposes of the transformation module 92 during normal operation after the initialization phase of FIG. 17: (1) queue processing 440, which includes creating and queuing transformation orders as new transformation requests 441 are received; and (2) processing transformation orders 442.

Transformation orders 443 are created and entered (in response to a transformation order event (TOE) 444) in the queue processing 440 as discussed above at steps 127 and 128 of FIG. 7. Each transformation order 443 has global (i.e., pertaining to the transformation order as a whole) and edge information associated with it. Global information is for the entire transformation order, which contains parameters such as, for example, transformation ID, source/destination types, state, and the current Optimal Transformation Path (OTP). Some of the information is static (i.e., it does not change during the transformation process) and some is dynamic (e.g., state, Current Edge, failed edge-list). Also, for each edge in the current OTP, there is a separate record containing edge-based information. Again, some of the edge information are static and some other information are dynamic. Most of the data in the transformation order 443 is non-volatile (i.e., it is stored on the disk). When dynamic information changes, the information is written to the disk. The transformation orders may be deleted, at 446, after the request successfully completes. This is controlled by a parameter in the configuration file. Otherwise, the transformation order is deemed to have failed and the failure is handled at 448, or is requeued in the queue processing at 450. Volatile information only exists temporarily during the transformation process. Table 3 shows the exemplary transformation order parameters.

TABLE 3

Exemplary Transformation Order Parameters

| Parameter Class Sub-class | Parameter Name | Static or Dynamic | Comments |
|---|---|---|---|
| Global | | | Global parameters for the entire transformation order |
| (Non-volatile) | | | Permanently stored on the disk |
| | Transformation ID | S | An identifier for the transformation order for referencing to this order |
| | Host Addr | S | Address of the requesting host |
| | Mail Addr | S | Mail address for notification of failure |
| | State | D | Current state: IDLE/BUSY/WAITING/CONVSEND |
| | sMT | S | Source mime type (format type) |
| | dMT | S | Destination mime type |
| | Disposition | S | Disposition Type |
| | Disp Argument | S | Disposition Argument: mail address, device, file path for copying; the actual argument depends on the disposition type |
| | Encoding | S | Encoding type used for the file; the file may be sent encoded by the requester and may need to be decoded before transformation can begin |
| | Start Time | D | Last Time a conversion in a transformation order was initiated |
| | Return Attempts | D | Number of times failed attempting to return result |
| | Return File Path | D | The location and name of the result file; after the completion of the transformation the file is taken from here and disposed according to disposition type and argument given |
| | Trans Status | D | Pending/Failed/Success |
| | OTP | D | List of Edges in the Optimal Transformation path |
| | Current Edge | D | Current Edge in OTP to be executed |
| | Current Edgelet | D | Current wrapper under consideration |
| | Failed Edge List | D | List of edges that have failed during this transformation order; used to calculate OTP |
| (Volatile) | | | Stored in the memory but lost after a system crash |
| | Time-Out handle | D | A link to the current timer used for time-out event |
| Edge | | | Parameters for each edge in the Optimal Transformation Path |
| (Non-Volatile) | | | Permanently stored in disk |
| | Edge Id | S | Id of the edge in the OTP |
| | sMT | S | Source format type |
| | dMT | S | Destination format type |
| | Source file-size | D | Size of the source file |
| | Edge try counts | D | How many times the edge has been tried |
| | Last edgelet Id | D | Id of the last edgelet tried unsuccessfully |
| | Current Edgelet | D | Id of the current edgelet under consideration |
| | Remote ID | D | If the current edgelet is remote then the remote ETS sends a Transformation ID when a request is submitted; this is the Remote ID entry (NULL if it is local) |
| | Failed Edgelet Ids | D | List of failed edgelets for this edge |
| | Num Timeouts | S | When a poll of the state of the current edgelet returns PENDING then how many time-outs to allow before declaring that the edgelet has failed |
| (Volatile) | Result file | D | The result file if successful Stored in memory only |
| | Statistics | D | Conversion time, network latency |

The parameters in the transformation order 443 are initialized as follows. First, set the static data: (Transformation ID, Host Address, Mail Address, sMT, dMT, Disposition, Disposition Argument, and Encoding). Then, set the dynamic data (State=IDLE; Start Time=actual start time; Return Attempts=0; Return File Path=NULL; Transformation Status=PENDING; OTP=list of edges in the current OTP; Current Edge=First edge in the OTP; Current Edgelet=NULL; Failed Edge list=NULL; and Time-out handle=link to a timer). Next, for each edge in the OTP, set the following static data for each edge record (set Edge Id from the OTP, sMT, dMT, Num Timeouts (from configuration file 110)). Next, for each edge in the OTP, set the following dynamic data for each edge record (for the first edge set the source file-size, for the rest it is zero; Edge try counts=0; Last Edgelet Id=NULL; Current Edgelet=NULL; Remote ID=NULL; Failed Edgelet lists=NULL; and Result file=NULL).

All transformation orders 443 are placed in a first-in-first-out (FIFO) queue 452 by the queue algorithm 454. During the actual processing of transformation orders 443, the elements of this FIFO queue might be re-arranged (as discussed below), but only to avoid extreme conditions. Hence, in most cases, orders 443 are processed in the sequence they were received.

The transformation module 92 is responsible for: (1) at 456, executing each of the conversions, for each of the transformation orders 443, in sequence, and transmitting the conversion request to the wrapper subsystem 74 of FIG. 5, in order to execute the conversion; and (2) at 458, receiving feedback from the wrapper subsystem 74 as to the success or failure of the specific conversion, and updating the transformation orders, in order that the next step in the sequence can take place. The operation of the transformation module 92 is intimately tied to the operation of the wrapper subsystem 74. Specifically, for reliability purposes, the transformation module 92 is aware of the resource requirements and conflicts involved in invoking the exemplary wrappers 104,106 and behaves accordingly. Also, at 460, the transformation module 92 suitably detects any failures in the wrappers 104,106 and initiates any necessary actions.

The queue processing 440 checks the FIFO queue 452 for any free transformation order 443, which can be scheduled for the next step in the conversion. This leads to the execution of an edgelet (for some of the transformation orders 443) which, in turn, leads to a request to the wrapper controller 102 for executing the wrapper. When a wrapper finishes execution, the wrapper controller 102 informs the transformation order update 458 to update the state of a particular transformation order in preparation for the next step. At this point, the transformation order update 458 determines one of the following: (1) a transformation has completed successfully, in which case the order is removed from the FIFO queue 452 and the disposition module 446 is informed of the same; (2) the transformation order has failed, in which case the order is removed from the queue 452 and a failure is reported at 448; or (3) the step has succeeded or failed and the order is re-queued 450 for further processing.

The key event, which triggers the processes of FIG. 18, is the transformation order event (TOE) 444. This event may be generated in one of two ways: (1) a new transformation request 441 arrives and is entered in the FIFO queue 452; or (2) the transformation order update 458 system finishes execution (primarily because a wrapper has finished execution).

When a wrapper belongs to a remote ETS (not shown), the nature of the sequence of steps remains the same, except that the request 441 is communicated to the remote ETS through the communication module 78 of FIG. 5. The results are communicated back to the transformation module 92 using the IPC 108 of FIG. 5.

The queue processing 440 schedules the transformation orders 443 by checking the FIFO queue 452 whenever a TOE 444 is received. As mentioned above, in order for this process to be effective, the queue processing algorithm 454 takes into account the resource requirements and the edgelets' availability.

Each edgelet has certain resources it might require before it can be activated. The resources available to an ETS can also vary over time, either due to changes in its configuration file 110 (FIG. 5) or due to the fact that other edgelets, currently active, have their own resource requirements. On the other hand, it is also necessary to ensure that a particular transformation request 441 will eventually run (i.e., to ensure that a resource intensive edgelet will eventually obtain the resources it needs and will never be permanently starved). A resource management (RM) module 470 (of the transformation module 92 of FIG. 5) ensures this as follows. ETS resources consist of a text label and an associated quantity, which defines how much of the labeled resource is available. The administrator sets the quantity during configuration. These quantities are a factor in determining how many instances of an edgelet can run at any one time. On boot up, when the inventory of edgelets is being made, an edgelet is queried about the services it provides and the resources it requires to provide the services. The resources required by the edgelet are defined by the same labels used by the ETS node, along with a quantity indicating the amount used during invocation. These labels and quantities are administrator-defined. While they represent real system resources, they need not reflect the actual physical resources provided by the OS (e.g., the administrator may choose to limit the resources given to the ETS).

When an edgelet is invoked at 456, the necessary resources are removed from the ETS' resource pool. These resources are returned to the pool when the edgelet completes. If the resources are not available at invocation time, then the edgelet's invocation is deferred until later. If the ETS does not have adequate resources to ever run an edgelet, then that edgelet is not added to the inventory (and the corresponding edgelets are not added to the edges in the graph). Thus, every edgelet in the inventory is guaranteed to be able to run given the sum total of all resources available to the ETS.

In the exemplary embodiment, before an edgelet can be used, the corresponding wrapper meets two requirements: (1) it is IDLE; and (2) the resources it needs are available in the global pool. If the edgelet is idle and the resources are available, then the edgelet is activated and the resources it needs are removed from the global pool. Upon deactivation these resources are freed (but not necessarily returned to the global ETS pool, as discussed below). If the edgelet is not idle, then the transformation is re-queued.

On the other hand, if the edgelet is idle, but adequate resources are not available, then the transformation order 443 and the edgelet are locked and the former removed from the transformation FIFO queue 452. As each currently active edgelet is deactivated, its freed resources, instead of being returned to the global pool, are maintained in a reserved pool. Eventually, it is possible that all available resources are in the reserved pool. At this time, the locked edgelet is, by the above guarantee, able to run.

The final aspect to ensuring non-starvation is the handling of the transformation FIFO queue 452 as discussed below in connection with the Edgelet Pick algorithm 486 of FIG. 20. In summary, before any transformation orders from the FIFO queue 452 are considered, the locked transformation order and edgelet are considered, if they exist. Thus, the moment an edgelet is deactivated, its resources are returned (and added to the reserved pool). If the reserved pool is adequate for the locked edgelet, then it is activated.

The wrappers, which are invoked at 456, need resources from the limited global pool of resources. These resources need to be allocated properly to avoid any resource contention or starvation. Printers and other such devices, memory, and disk-space are the normal elements of the resource pool. Each application associated with the local wrappers is also considered a limited resource. Some can be invoked only once and others can be invoked several times. This number is obtained by querying the wrappers as discussed below.

There are three classes of resource pools defined by the ETS according to usage: (1) an Unused Pool (which can be used by any of the wrappers); (2) a Reserved Pool (which can be used only by reserved transformation orders); and (3) an In-Use Pool (which are locked by the executing wrapper).

The FIFO queue 452 can hold a suitable number of transformation orders, but there is a special reserved slot 479, which contains only one reserved transformation order (TO). A transformation order can be reserved when it becomes difficult to meet its resource requirements and needs special attention in order to avoid waiting indefinitely for resources to free up. This is where the Reserved Pool of resources plays a role. Whenever there is a reserved transformation order, the resources freed by wrappers on completion are put in the Reserved Pool, which can only be used by the reserved transformation order.

Figure 19:
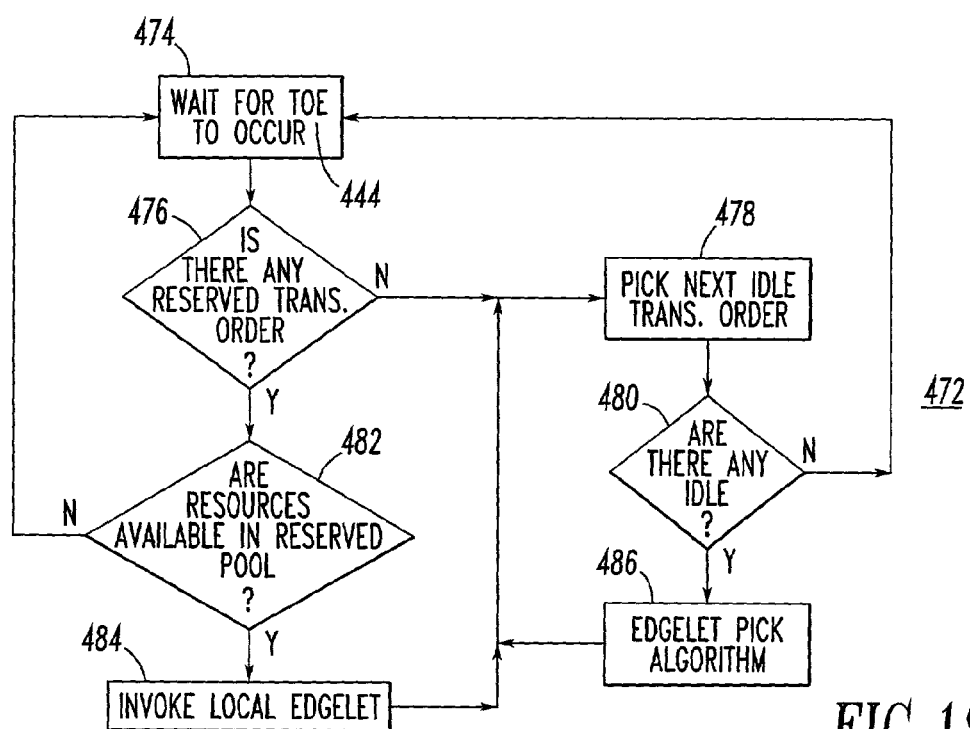
FIG. 19 is a flowchart of transformation order queue processing for the transformation module of the ETS of FIG. 5.

FIG. 19 shows the transformation order queue processing routine 472. First, at 474, the routine 472 waits for a TOE 444 to occur. Next, at 476, if there is no reserved transformation order, then the next IDLE transformation order is picked from the FIFO queue 452 at 478. Only one reserved transformation order is kept in the special slot 479 of the FIFO queue 452. If there is no idle transformation order, then step 474 is repeated. Otherwise, the Edgelet Pick algorithm 486 (FIG. 20) is executed, after which the next IDLE transformation order is picked at 478. Otherwise, if there is a reserved transformation order at 476, and if the resources in the Reserved Pool are sufficient for the wrapper to be executed at 482, then the Local Edgelet is invoked at 484 as discussed below. Otherwise, step 474 is repeated. After step 484, the next IDLE transformation order is picked at 478.

The Edgelet Pick algorithm 486 of FIG. 20 works on non-reserved transformation orders. First, at 490, the Current Edge is obtained from the edge record of the Transformation Order, and the Current Edgelet is set equal to NULL. Then, at 492, the Best Edgelet is picked for the edge by employing the Best Edgelet algorithm 493 of FIG. 21. This selection is based on one of many types of cost calculations performed on the vector of attributes. By changing the way the cost is calculated, one can tune the order in which the edgelets are chosen. For example, for a relatively very high speed of service, one may choose only the faster third-party applications and/or those applications which are local or nearer to the controlling server.

Figure 23:
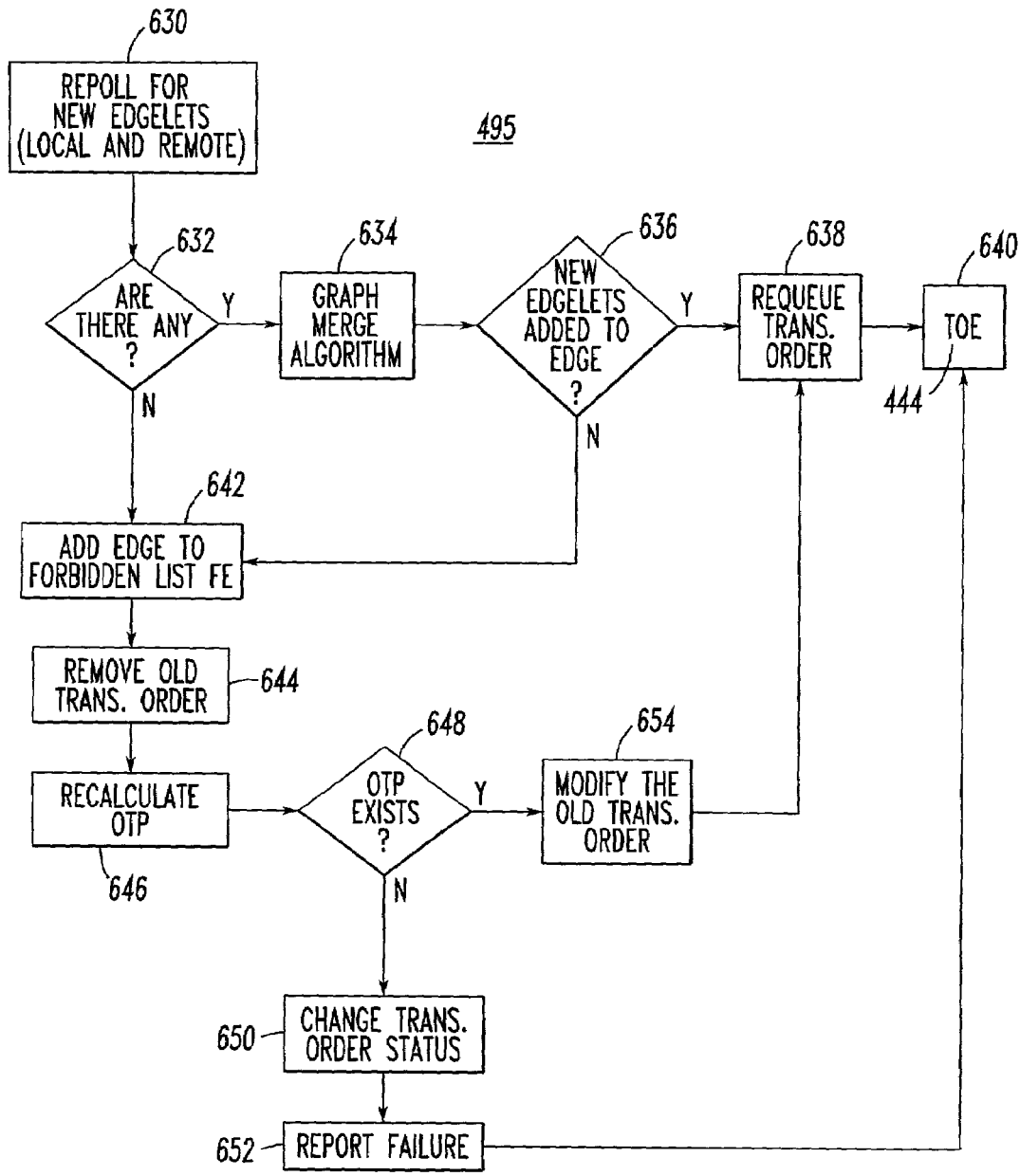
FIG. 23 is a flowchart of an Edge Failure algorithm employed by an ETS in accordance with the present invention.

Next, at 494, if an edgelet is not found, then the Edge Failure algorithm 495 of FIG. 23 is invoked at 496. Otherwise, if the corresponding edgelet (wrapper plus application or device) is not local at 498, then the Transformation Order State is set to CONVSEND (Table 3) and the Remote Edgelet algorithm 499 is invoked at 500 as discussed below. Otherwise, if the corresponding edgelet is local, then it is determined at 501 if the corresponding wrapper is busy. If so, then the routine stops at 504. Otherwise, at 502, it is determined if the edgelet is reserved by some other transformation order. If so, then the routine stops at 504 for the current transformation order and the algorithm continues at 478 of FIG. 19. Otherwise, the resource requirements of the edgelet are determined at 506. Then, if the resources are available from Unused Pool at 508, the Local Edgelet algorithm 509 is invoked at 510 as discussed below. Otherwise, at 512, if there is another reserved transformation order in the slot 479 of FIG. 18, then the routine stops at 504. Otherwise, the transformation order is marked as reserved at 514 (and put in the reserved slot 479) after which the routine stops at 504.

FIG. 21 shows the Best Edgelet algorithm 493. The input at this point is an Edge. The function of the algorithm 493 is to pick the best edgelet of all the edgelets associated with the Edge. First, at 520, the Edge is obtained, a weight W is set to infinity, the Best Edgelet is set to NULL, and the edgelet count is set to 0. Then, at 522, the next edgelet, e, on the list is picked. Next, at 524, if there is no next edgelet, then the Best Edgelet is output at 526, which output may be NULL to indicate the non-existence of the best edgelet. Otherwise, at 527, it is determined if this edgelet, e, is in one of the two failed edgelet lists. If so, then step 522 is repeated.

There are two kinds of failed edgelets: (1) those discovered during processing of the transformation order under consideration, which are stored in the failed edgelet list 528 of FIG. 5 (Table 3) of the transformation order; and (2) those found to be have failed too many times are considered useless, which are and kept in a separate list 529 in the graph module 96. Both the lists 528,529 are considered here.

Otherwise, if the edgelet is not in one of the failed edgelet lists, then the edgelet count is incremented and the weight, CW, is calculated at 530. The weight is determined as a function of static costs for the edge plus costs that are a function of the file being converted using that edge (e.g., some values may be a function of file-size). Once the resulting cost vector has been calculated, it is stored as a normalized value (e.g., the square root of the sum of the squares of the individual values). This is based on one of many types of cost calculations performed on the vector of attributes. By changing the way the cost is calculated, one can tune the order in which the edgelets are chosen. For example, for a relatively very high speed of service, one may choose only the faster third-party applications and/or the applications which are local or nearer to the controlling server.

Next, at 532, it is determined if the calculated weight CW is less than W. If so, then W is set to CW and the Best Edgelet is set to edgelet e at 534. If not (or after 534), at 536, if the edgelet count is greater than a Max Count (as defined by the configuration file 110 of FIG. 5), then the Best Edgelet is output at 526 (which can be NULL). Otherwise, step 522 is repeated.

As discussed above, there are two edgelet invocation algorithms: local 509 and remote 499 of FIG. 20. For the Local Edgelet algorithm 509, the steps are as follows. If the edgelet is reserved, then allocate the resources from the Reserved Pool to the wrapper and put the resources in the InUse Pool. Otherwise, allocate the resources from the Unused Pool to the wrapper and put the resources in the InUse Pool. Next, the wrapper is invoked. Invocation of the wrapper is discussed below. Essentially, invocation involves providing suitable information to the wrapper such that it can provide suitable feedback for the transformation order update 458 of FIG. 18. Finally, a local timer is started and the local invocation is completed.

The Remote Edgelet algorithm 499 steps are as follows. First, a Transformation request is created with sMT (source format type) and dMT (destination format type) (Table 3) of the Edge under consideration. The Disposition type is set to a configurable option (e.g., RETURN, WAIT), the file-size is set, and the IPC command and argument are set. This is similar to local wrapper invocation, except that this information is not sent to the remote ETS. The transformation module 92 of FIG. 5 keeps a lookup table of transformation requests sent to a remote ETS. When a query is made by the local ETS or a request is sent by the remote ETS, the IPC commands are used to communicate it to the transformation module 92. Next, the Transformation request is sent to the remote ETS. Then, the remote timer is started and the remote invocation is completed. Again, at this point, the feedback messages are sent to the transformation order update 458 of FIG. 18, which suitably acts and interprets the messages.

Figure 22A:
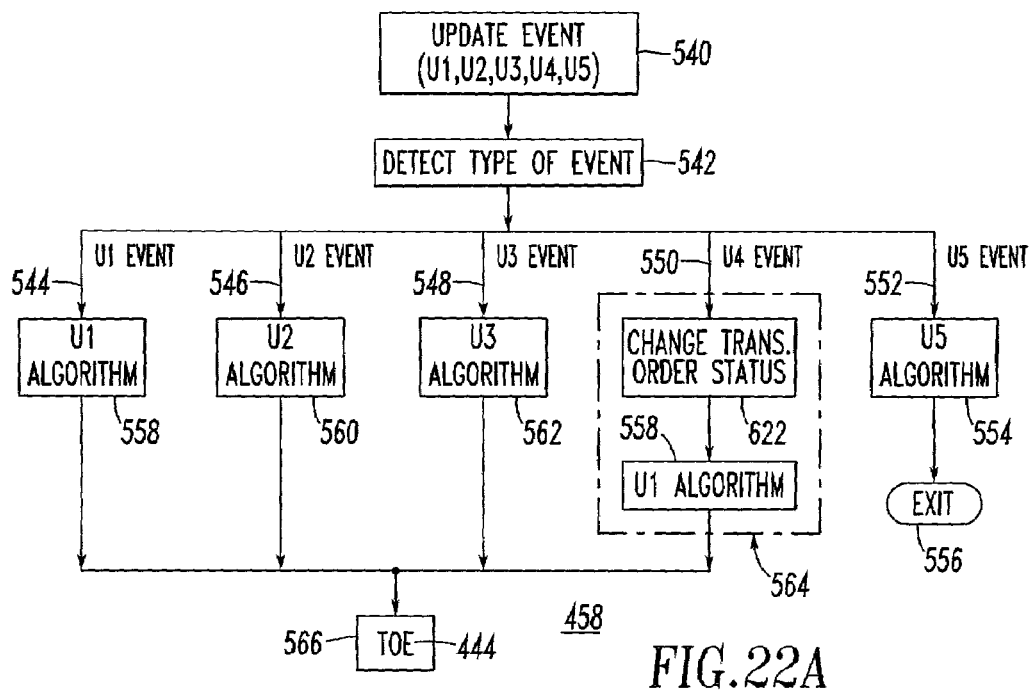
FIG. 22A is a flowchart employed by an ETS to update transformation orders in accordance with the present invention.

As shown in FIG. 22A, updating the transformation order is dependent on the events that happen after the invocation of the wrapper. The generation of these events is tied to the wrapper subsystem 74 of FIG. 5 and the wrapper failure model (as discussed below) that is employed. One of five events, U1–U5, of interest to the transformation order update 458 of FIG. 18, can occur as shown at 540. One of these events 544,546,548,550,552 is detected at 542. For the first event U1 544, a local wrapper's invocation fails immediately, or, in the case of remote wrappers, a negative acknowledgement (NACK) is received as a result of a transformation request. For the second event U2 546, a local wrapper's invocation is successful, or for remote wrappers, a positive acknowledgement (ACK) is received from the remote ETS. The third event U3 548 occurs, if the results are returned by the remote ETS for remote wrappers, or if the local conversion completes successfully for local wrappers. The fourth event U4 550 occurs if a local conversion is unsuccessful, or if a message is sent back by the remote ETS with a failure notice. The fifth event U5 552 occurs if the IPC 108 of FIG. 18 fails and, thus, cannot communicate back to the transformation module 92. The last event 552 is a significant failure of the system and the administrator is first notified, various data are cleaned up, and the ETS is shutdown.

The overall process used by the transformation order update 458 is shown in FIG. 22A. If the event type is U5

552, then the U5 algorithm 554 is applied before exiting at 556. Otherwise, one of the appropriate algorithms 558,560, 562,564 is applied to the corresponding event 544,546,548, 550, respectively. Finally, after the U1–U4 algorithms 558, 560,562,564, a TOE 444 is generated at 566.

Figure 22B:
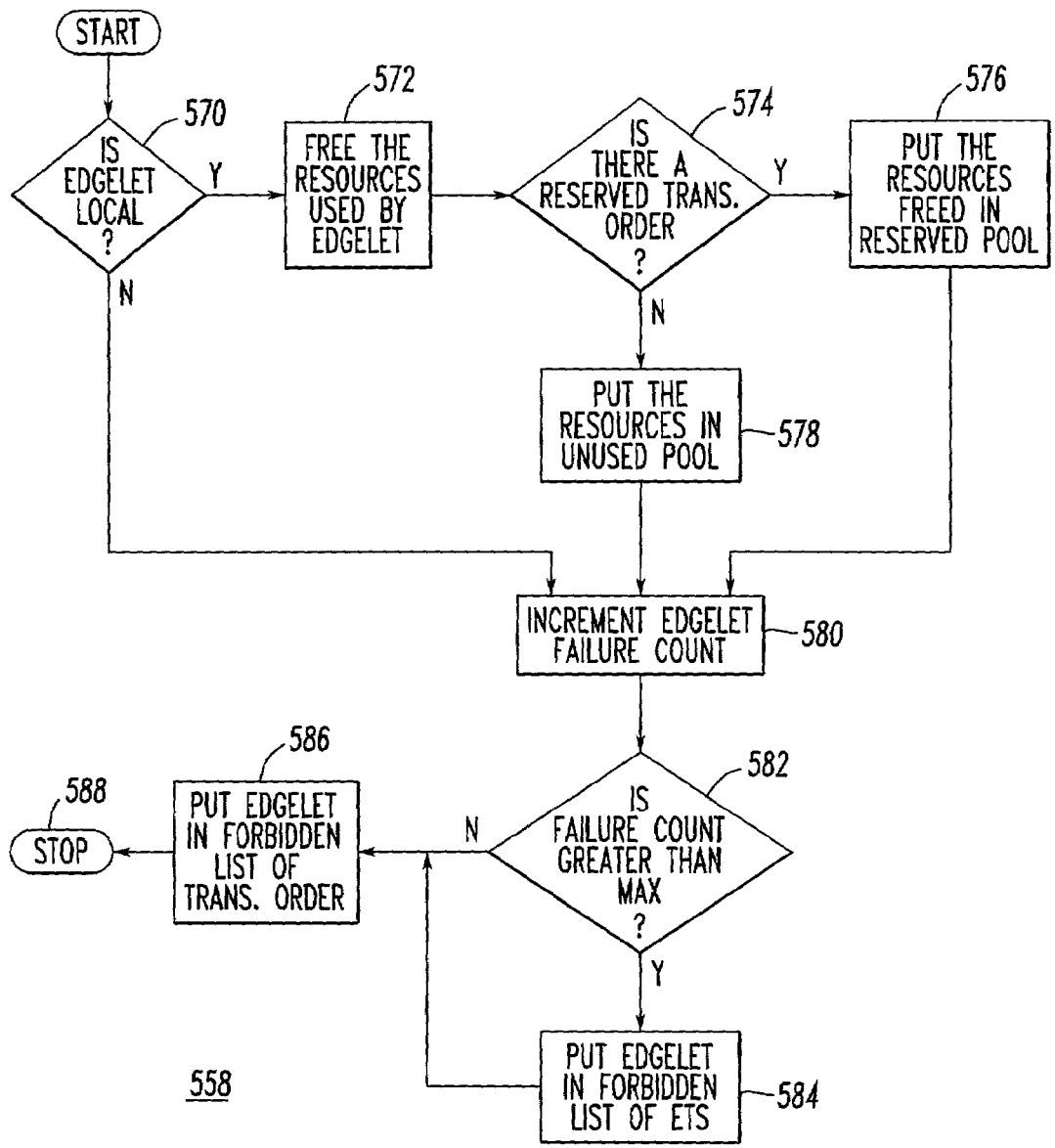
FIGS. 22B and 22C are flowcharts for processing Transformation Order Events (TOEs) employed by an ETS in accordance with the present invention.

FIG. 22B shows the algorithm 558 for event U1 544 of FIG. 22A. First, at 570, if this is a local edgelet, then the resources employed by the edgelet are freed at 572. Next, at 574, if there is a reserved transformation order, then the resources used by the edgelet are put in the Reserved Pool at 576. Otherwise, the resources are put in the Unused Pool at 578. Next, at 580, the failure count of the edgelet is incremented. This step is also executed if the edgelet was not local at 570. Then, at 582, if the edgelet failure count exceeds the maximum edgelet failure count from the configuration file 110 (Table 1), then the edgelet is put in the edgelet failed (forbidden) list 529 of FIG. 5 of the ETS at 584, after which the routine proceeds to step 586. Otherwise, at 586, the edgelet is put in the failed (forbidden) edgelet list 528 (FIG. 5, Table 3) of the transformation order, which is then re-queued (450 of FIG. 18) before the routine stops at 588.

For the algorithm 560 for the event U2 546 of FIG. 22A, the transformation order state is set to BUSY.

Figure 22C:
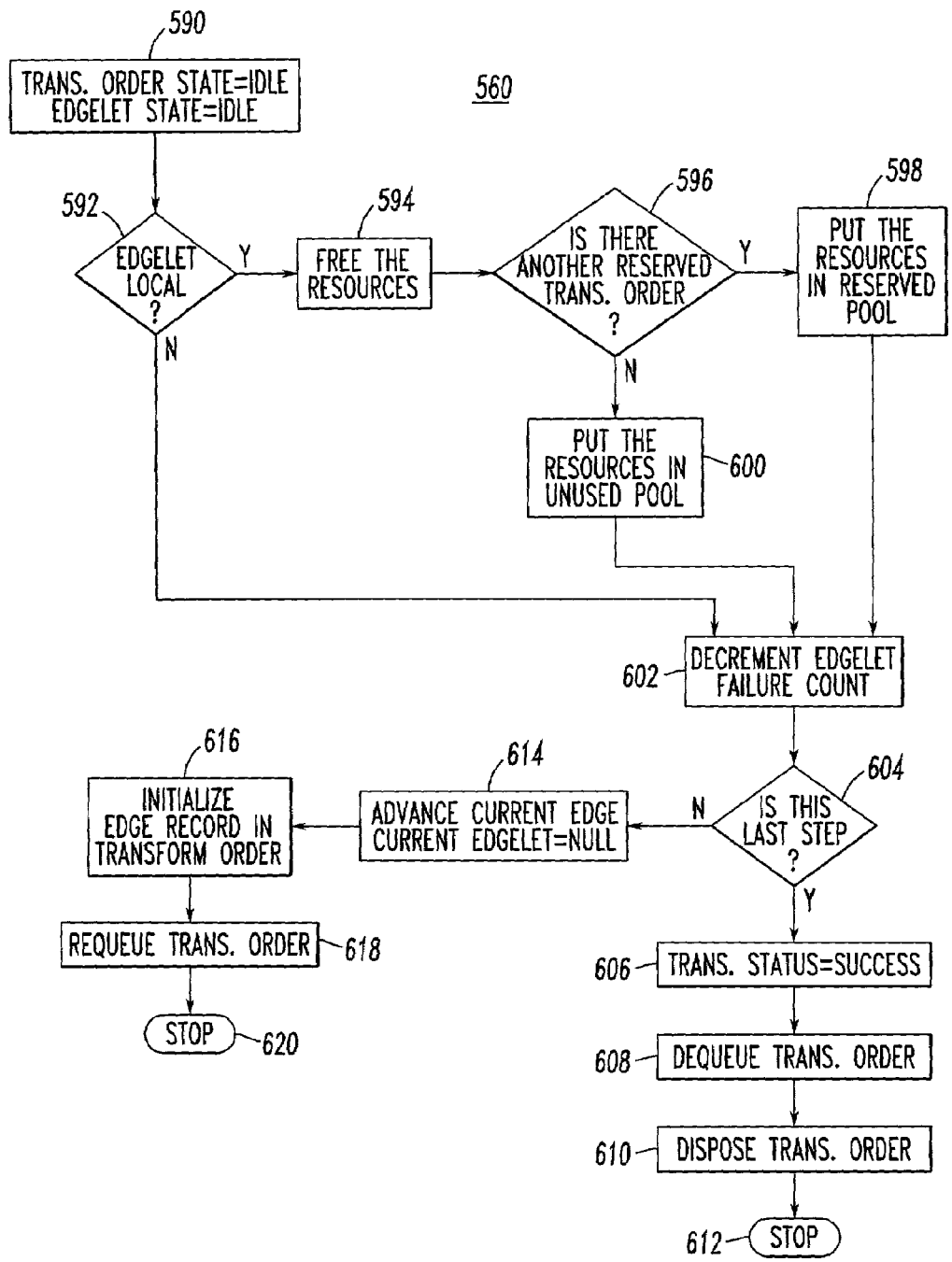

FIG. 22C shows the algorithm 562 the event U3 548 of FIG. 22A. First, at 590, the Transformation Order State and the Edgelet State are both set to IDLE. Next, at 592, if this is a local edgelet, then the resources used by the edgelet are freed at 594. Then, at 596, if there is another reserved transformation order, then the resources used by the edgelet are put in the Reserved Pool at 598. Otherwise, the resources are put in the Unused Pool at 600. Next, the edgelet failure count is decremented at 602. This step is also executed if the edgelet was not local at 592. Then, at 604, it is determined if this is the last step in the transformation order. If so, then the Transformation Status is changed to SUCCESS at 606, the transformation order is de-queued at 608, the transformation order is handed over (446 of FIG. 18) to the disposition module 94 at 610, and the algorithm stops at 612. Otherwise, if this was not the last step at 604, then the Current Edge in the transformation order is advanced to the next edge in the OTP, and the Current Edgelet is set to NULL at 614. Next, at 616, the Edge Record in the transformation order is initialized. Finally, the transformation order is re-queued at 618 (450 of FIG. 18) before the algorithm stops at 620.

As shown in FIG. 22A, in the case of the event U4 550, the state of the transformation order is set to IDLE at 622, and the U1 algorithm 558 is performed as discussed above in connection with FIG. 22B.

In the case of the event U5 552 of FIG. 22A, the algorithm 554 notifies the administrator, the ETS instance is cleaned up, all data is written to the disk, and the ETS instance is shut down.

During execution of the Edgelet Pick algorithm 486 of FIG. 20, it is possible that no proper wrappers are found for an Edge. In this case, the Edge Failure algorithm 495 of FIG. 23 is invoked at 496. The Edge Failure algorithm 495 is part of the transformation order update 458 of FIG. 18. First, at 630, a local or remote repoll is performed for new wrappers. If a repoll of remote ETSs is not allowed, then only local wrappers would be discovered. Next, at 632, if new wrappers are found (or if any old wrappers are missing), then the Graph Merge algorithm 340 of FIG. 14 is executed at 634. Then, at 636, it is determined if at least one new edgelet got added to the Edge under consideration. If so, then the transformation order is re-queued (450 of FIG. 18) at 638 and then a TOE 444 is generated at 640. Otherwise, if no edgelet was added to the Edge, then the Edge is added to the forbidden edge list, FE, associated with the graph module 96 of FIG. 5 at 642. This step is also executed if no new edgelet was added to the Edge under consideration at 636. Next, the old transformation order is removed from the queue 452 at 644 and the OTP is recalculated at 646. Then, at 648, if the OTP does not exist, then the Transformation Status is set to FAILED at 650, and a failure is reported and cleaned up at 652, before a TOE 444 is generated at 640. Otherwise, if an OTP exists at 648, then the old transformation order is modified with the new OTP at 654 and is re-queued (450 of FIG. 18) in the transformation order queue at 638. Finally, a TOE 444 is generated at 640.

If an edge fails (i.e., there are no edgelets left on that edge because they have all failed), then a configuration parameter of the configuration file 110 of FIG. 5 (Table 1) controls the subsequent behavior. If the configuration parameter is set to repoll, then all the known ETS instances are re-interrogated to see if additional ETS instances have come alive or if known ETSs have new (i.e., previously unknown) edgelets. If so, the transformation path is recalculated and the transformation proceeds. If not, then the transformation fails.

Edgelets are preferably weighted by using dynamic vectors. A dynamic vector consists of a set of costs, which are updated in response to messages from other ETS instances. A dynamic vector can consist of static, dynamic and functional costs. A static cost is a cost that is not changed by the ETS itself—these costs are determined by querying the wrapper at startup. Dynamic costs may be initialized at startup, but then change as the ETS accumulates information during its operation. For example, a heavily used edgelet may have its cost increased in order to reflect scalability concerns. An unreliable wrapper may see its cost increase to discourage the ETS from using that wrapper. Functional costs are costs that are a function of the converter and the file being converted. An example of a functional cost would be a cost per megabyte for converting a file. The cost profile is determined within the configuration file 110, from each wrapper and by events triggering cost updates.

Costs are stored as vectors or ordered lists of costs where the position determines the costs' meaning. For example, an edgelet's cost may be a vector of reliability cost, initial invocation cost and network distance cost. When an edgelet's cost is evaluated, it is given a specific file. The cost vector for that specific file/edgelet interaction is determined. This vector is then normalized to determine the aggregate cost of the operation.

An exemplary list of cost vector items include: (1) edgelet failure count (EFC): EFC can take both negative and positive values (if negative, its effect is to reduce overall cost); (2) Local or Remote (R): R=0 for a local edgelet and R=1 for remote edgelet; (3) quality of conversion (Q): this value can be set by the administrator or can be dynamically updated using an external agent; and (4) File-size (FS): obtained from the file to be converted (this is not necessarily the same as the original file since the intermediate files may be of different sizes).

An exemplary calculation of a Cost vector is shown in Equation 1:

$$\text{Cost} = (W_{EFC} \times EFC) + (W_R \times R) + (W_Q \times Q) + (W_{FS} \times FS \times \text{COST\_PER\_KB}) + (W_I \times \text{COST\_PER\_INVOCATION}) \quad \text{(Eq. 1)}$$

wherein:

$W_{EFC}$, $W_R$, $W_Q$, $W_{FS}$ and $W_I$ are weights for EFC, R, Q, FS and Invocation, respectively. These weights may be pre-set in the configuration file 110 by the administrator to assign a relative importance to each of the cost components.

COST_PER_KB is cost per each kilobyte of data to be converted.

COST_PER_INVOCATION is the cost of using the wrapper (and its associated application). Both these latter two quantities are obtained through a wrapper query.

Such exemplary cost calculations can also be extended to the edge cost calculations in addition to edgelet cost calculations. This cost information can then be used in the OTP determination algorithm 370 of FIG. 15 in order to further optimize the path selection process. In this manner, one can force the path selection process to pick a path, which is not necessarily the shortest in terms of number of steps, but which is perhaps lower in terms of overall monetary cost.

The wrapper controller module 102 of FIG. 5 is responsible for: (1) interpreting and forwarding requests (of exemplary wrappers 104,106 for information or for invocation) from the transformation module 92; (2) interpreting feedback from the wrappers 104,106 (after they have completed the task given) through the IPC 108; and (3) sending the feedback information to the transformation module 92.

The exemplary communications between the wrapper 104,106 and the ETS 70 are asymmetrical. Communications from the ETS to a wrapper are via spawning (if the wrapper is external to the ETS), a remote transformation request initiation, or a function call (if the wrapper is a built-in). On the other hand, all communications from the wrapper 104, 106 to the ETS 70 are accomplished via the mechanisms of the IPC 108. The precise details of the IPC mechanisms to be used are dependent on the particular operating system and the configuration selected. An exemplary generic method is to pass three arguments to each wrapper during invocation (in addition to the arguments employed to perform the conversion): the IPC which performs the messaging (to the ETS 70) on behalf of the wrapper 104,106, and two arguments for that IPC. The two latter arguments provide the information to the IPC 108 needed to perform its task. The first identifies, for example, the appropriate port (for TCP/IP based IPC), pipe-name (for named-pipe based IPC), and directory (file-based IPC) to be used to send the message. The second argument is the path to the file to be used to record the message in the event of a failure. This can happen if the ETS 70 shuts down between sending a conversion request to the wrapper 104,106 and the wrapper completing the corresponding conversion. In this case, the IPC 108 appends the message to the given message file, which is read when the ETS 70 boots up the next time.

Given the central role of IPC in an ETS, it is important to be able to ascertain whether the IPC 108 is functioning correctly. To this end, each IPC mechanism defines a self-test mechanism which can be invoked by the ETS 70 and which returns a definitive answer as to whether the IPC mechanism is functioning. This self-test mechanism (or IPC ping) is employed whenever a transformation request, which has been successfully sent, times-out. At this point, the ETS 70 has two hypotheses about the wrapper 104,106 corresponding to the edgelet: (1) that it is still working; or (2) that it has finished, but is unable to communicate with the ETS 70 because of an IPC failure. The self-test feature enables the ETS 70 to establish which of these two hypotheses is correct.

If the first hypothesis is correct, then a STATUS request to the IPC command will result in an IPC message (pending, completed successfully or completed unsuccessfully). On the other hand, a non-response suggests that the second hypothesis might be correct. Since the IPC 108 is central to the functioning of an ETS, the self-test confirms this hypothesis. A self-test failure results in the immediate shutdown of the ETS 70. The IPC self-test is used in the edgelet/wrapper invocation algorithms 499,509 of FIG. 20.

As discussed above, wrappers serve as an interface between the ETS instance and applications. Wrappers are employed to "coerce" applications to provide conversion services that they were not necessarily designed to provide. Wrappers can range from simple software "scripts" to "human-in-the-loop" wrappers. Simple scripts instruct the application to open the document, convert it, save the conversion and quit. At the other extreme, a specific conversion might require a human agent to launch the application, open the document within the application, interactively perform the conversion and save the resulting new document.

The wrappers are designed to be queried for static information about their capabilities, cost information and resource requirements, and dynamic information about the state and status of conversions. When queried, a wrapper returns the following exemplary static information: (1) Conversion type: Source type and Destination type; (2) Application name: the name of the application it employs (e.g., MS Word, Ghostscript); (3) Resources: a list of parameter name=value pairs (e.g., PRINTER=1, MEMORY=20 Mb, and NUM_INVOCATION=3, which states that the application can have a maximum of three concurrent invocations); and (4) Costs: a list of parameter name=value pairs (e.g., COST_PER_KBYTE=1, and COST_PER_INVOCATION=2). The wrapper, when queried, also returns the following exemplary dynamic information: Conversion Status: COMPLETED/FAILED/PENDING for each conversion request.

There are three types of wrappers known to the ETS 70: (1) built-in: these are internal to the ETS; (2) script: these are the most common local wrappers for complex applications and are external to the ETS; and (3) remote: wrappers belonging to other ETS instances. The first two types are referred to as local wrappers since they are directly accessible to the ETS.

An example of wrapper invocation is as follows. If the wrapper is local, a command line is constructed to contain: (1) ipcMessageSender: Name of the IPC command; (2) ipcPort: Port number for IPC communication; (3) ipcMessageFile: Message file for IPC; (4) TOID: Id of the transformation order; (5) EdgeletID: Id of the edgelet; (6) SrcPath: location of the source file; (7) DestPath: location of the destination file; (8) SrcType: source format type; and (9) DestType: Destination format type. A system call to execute the wrapper with this command is issued. If this fails, then the edgelet is immediately marked as failed and removed. If the local wrapper is built-in, then the wrapper is invoked as a function call, with exactly the same parameters as above, and an error return is treated again exactly as above. If the edgelet is remote, then a transformation request is sent to the remote ETS.

Internally, the wrapper maintains two types of information. The first type is the number of times that the application associated with the wrapper is active. Each time a wrapper is successfully invoked it increases this number by one. Similarly, this number is decremented when the application completes the conversion either successfully or unsuccessfully. The number of times an application can be invoked is limited by a parameter obtained by querying the wrapper (NUM_INVOCATION). Usually, this number is one for most applications, but for some applications this number can be greater than one. Second, for each conversion request, the wrapper maintains a table of invocations. For each invocation entry, the wrapper keeps all the information that is passed to it (e.g., src type, dest type, transformation ID, IPC, conversion status). When a query is made as to the status of the conversion, the wrapper compares the transformation ID passed in the query to one in the table and reports accordingly. The conversion status can be COMPLETED, FAILED or PENDING. Alternatively, this functionality can also be built into the ETS instead of the wrapper. In this case, the ETS maintains this information for all local wrappers (or edgelets).

When either a local or remote wrapper is invoked (510 or 500, respectively, of FIG. 20), a non-failure results in both the transformation order and the edgelet being placed in the BUSY state. If the edgelet is remote, on invocation, the transformation order is put into a CONVSEND state. The transition from this state occurs when the edgelet sends an IPC message indicating a successful request transmission or its failure. The result is the same as above—a success results in transition to the BUSY state, and a failure results in the edgelet being removed immediately and the transformation order remains in the IDLE state. In all three cases, the transformation module 92 of FIG. 5 starts a timer. The timer duration depends on whether this is a remote or a local edgelet. This duration is also modified as the ETS 70 learns more about the specific edgelet.

When a conversion is completed, all three types of edgelets (built-in, script, and remote) return a message to the transformation module 92 via the IPC 108 indicating the status of the conversion. Then, the transformation order is transitioned to the IDLE state, its internal step count is moved to the next edge, and appropriate statistics are recorded. Similarly, the edgelet is transitioned to the IDLE state and its statistics are updated. On a failure, the transformation order is transitioned to the IDLE state and the failed edgelet list 458 of FIG. 5 is updated to include this failed edgelet. The edgelet is similarly transitioned to the idle state and its statistics are updated to reflect the failure.

On the other hand, if the timer expires before an IPC message is received by the wrapper controller 102 of FIG. 5, then the transformation module 92 issues a STATUS request to the wrapper through the wrapper controller 102. A failure to receive a response to the STATUS request leads to a check if the IPC 108 is at fault. If it is functioning correctly, then the edgelet is deemed to have failed and is removed from the system (i.e., this is treated like an initial invocation failure). If, however, the STATUS response indicates that the conversion is still PENDING, another timer is set and the transformer waits. This process of setting timers, checking status and repeating on a PENDING response is terminated by checking if the number of timeouts exceeds a configuration constant (i.e., a number, Max Time-outs, that is established in the configuration file 110).

Finally, the length of the timer is adjusted depending on the statistics collected over time. For example, as experience is gained, edgelets known to be slow have their timeouts lengthened. The reverse is not the case (i.e., fast edgelets do not have their timeouts reduced). As another example, the timeouts can be adjusted to allow for parameters specific to the transformation request such as the source mime type (i.e., certain input formats may be harder to convert, and, thus, take longer), size of file, or source-target format type interactions.

In general, prior known transformations were either monolithic (meaning that only one type of atomic conversion was being performed), or knowledgeable (meaning that the material within the converted file could be examined by the system). The exemplary ETS 70 manages a diverse set of file formats in the absence of a common scheme for identifying good or bad conversions. In addition, the interaction between diverse transformation applications and files can result in a successful conversion with one application, even though the conversion failed with another application.

Faults can occur at several points along the transformation process. In particular, the exemplary ETMS system 40 of FIG. 3 distinguishes between the failure of the application, the wrapper, the document, the document-application combination and the ETS instance. In addition, the ETS 70 distinguishes a component failure from failures in the communication method used between the components. This is achieved using a "black box" conversion model. This approach incorporates operating system diagnostics with a qualified failure model which allows making reasonable guesses that a problem is unique to a file, unique to a converter, or unique to an interaction between the file and the converter. If the wrapper invocation fails, then this is a significant failure and the wrapper is taken offline and an operator is notified. If the application fails, then the wrapper informs the ETS instance of the failure along with any associated information it might be able to extract from the application. The ETS 70 uses this information with a leaky bucket fault counter for the conversion. If the application fails too often, then it is taken offline and an operator is notified. Finally, the ETS 70 determines if the communication channel between the wrapper and the ETS instance has failed. Since this is a generic failure (i.e., all wrappers will experience this failure), an operator is notified and the ETS 70 is shutdown.

Figure 24:
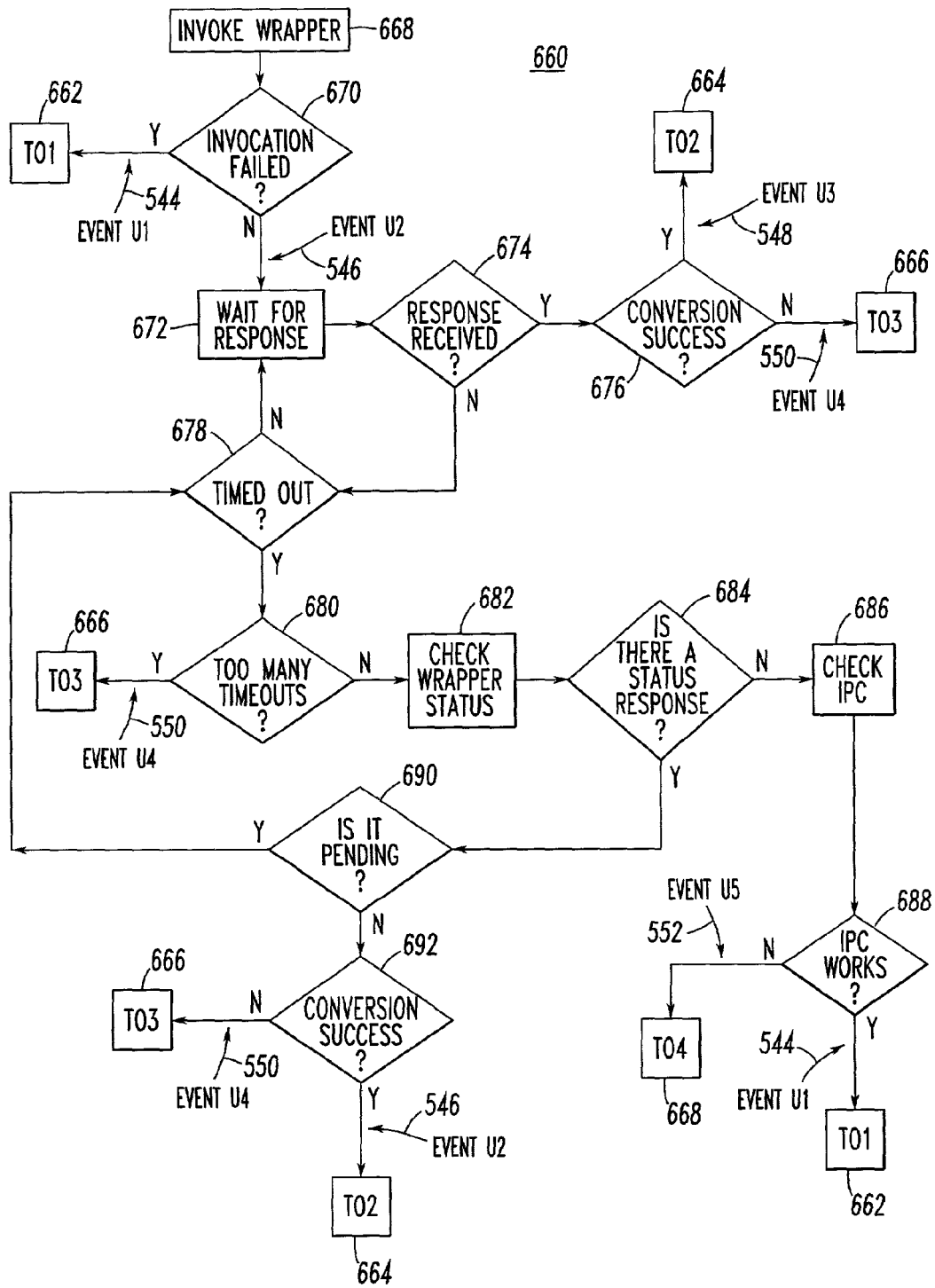
FIG. 24 is a flowchart of a Wrapper Invocation Failure algorithm employed by an ETS in accordance with the present invention.

FIG. 24 shows the Wrapper Invocation Failure algorithm 660. In the event of a failure, the execution of the conversion may be terminated TO1–TO4 in one of four ways: (1) Invocation failure TO1 662—remove the edgelet from the transformation graph and requeue the transformation order; (2) Successful conversation TO2 664—decrement the edgelet failure count, and move the successful transformation to the next step; (3) Failed conversation TO3 666—increment the edgelet failure count, and re-queue the transformation order; and (4) Catastrophic failure TO4 668—terminate the wrapper, terminate the ETS instance controlling the wrapper, and alert the operator.

TO1 662 through TO4 668 are referred to as Termination Options. FIG. 24 also shows the events U1 544, U2 546, U3 548, U4 550 and U5 552 of FIG. 22A. First, at 668, the wrapper is invoked. If invocation leads to immediate failure at 670 (event U1 544), then terminate with TO1 662. Otherwise, a successful invocation (event U2 546) is followed by waiting for a response at 672. If a response is received at 674 and if the conversion completes successfully at 676 (event U3 548), then terminate with TO2 664. Otherwise, if the conversion fails at 676 (event U4 550), then terminate with TO3 666. On the other hand, if no response is received at 674 and if a time-out occurs during the conversion at 678, then it is determined if too many time-outs occurred (given by max wrapper time-outs in the configuration file) at 680. If max time-outs have occurred at 680 (event U4 550), then terminate with TO3 666. Otherwise, the wrapper is queried about the status of the conversion at 682. If the status check does not return at 684, then check the IPC mechanism 108 of FIG. 5 using its self-test feature at 686. If the IPC self-test succeeds at 688 (event U1 544), then terminate with TO1 662. Otherwise, if the IPC self-test fails at 688 (event U5 552), then terminate with TO4 668. Otherwise, when a status check returns at 684 and the status is not pending at 690, then it is determined if there was a conversion complete (success) at 692 (event U2 546). If so, then terminate with TO2 664. Otherwise, when a status check returns with a conversion failed at 692 (event U4 550), then terminate with TO3 666. Otherwise, when a status check returns with a conversion pending at 690, return and wait for another timeout at 678.

In order to gracefully return to its current state when an ETS is shut down or when it crashes, suitable information about a transformation request is kept both in RAM and on disk. On startup, the crash recovery module 98 of FIG. 5 is responsible for returning to a known state. It does so by reading the disk-based store of transformation orders and processes each of them. The Current Edge and Current Edgelet fields of the transformation order provide the necessary information about the stage in the OTP of the transformation order.

Figure 25:
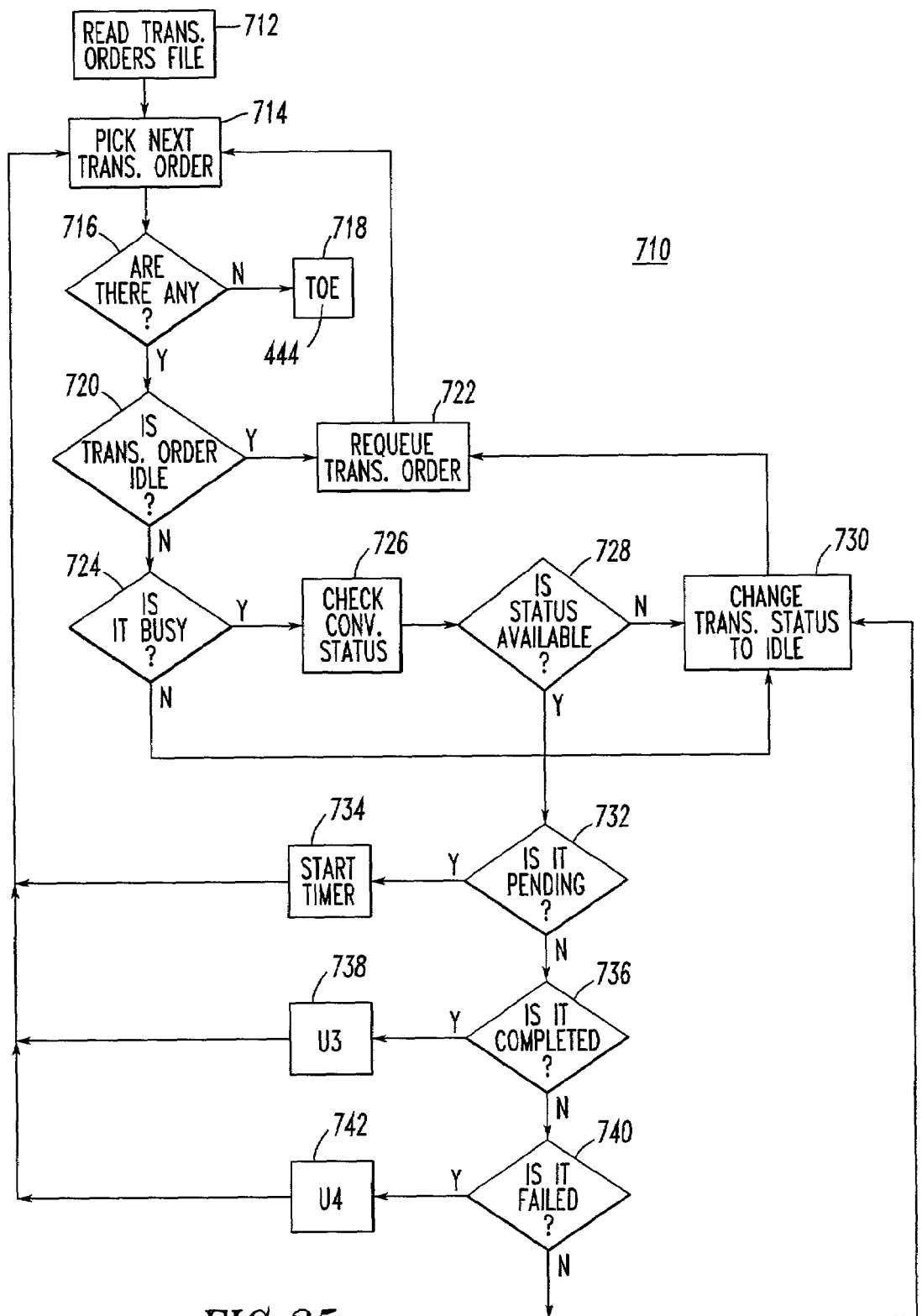
FIG. 25 is a flowchart of a crash recovery mechanism employed by the crash recovery module of the ETS of FIG. 5.

The crash recovery mechanism 710 of FIG. 25 employs some of the algorithms in transformation order update 458. First, at 712, the transformation orders file is read and the next transformation order is picked at 714. Then, if no orders are left at 716, a TOE 444 is generated at 718. Otherwise, if the transformation order state is IDLE at 720, then that transformation order is re-queued at 722 and step 714 is repeated. Otherwise, if the transformation order state is BUSY at 724, then the conversion status of the wrapper is checked at 726. If the conversion status is available at 728, then the status is obtained. Otherwise, the transformation order State is set to IDLE at 730, the transformation order is re-queued at 722, and step 714 is repeated. Otherwise, after 728, if the conversion status is PENDING at 732, then the timer is started at 734, and step 714 is repeated. Otherwise, if the conversion status is COMPLETED at 736, then algorithm U3 562 of FIG. 22A is applied at 738 after which step 714 is repeated. Otherwise, if the conversion status is FAILED at 740, then the algorithm U4 564 of FIG. 22A is applied at 742, after which step 714 is repeated. Otherwise, step 730 is repeated.

The State Information Tracking module 100 of FIG. 5 manages various housekeeping variables that are relevant to a specific transformation request, and ensures that these variables are synchronized between primary storage (e.g., the working memory of the ETS 70) and secondary storage (e.g., disk files). While the former function is merely one of convenience, the latter is critical when recovering from system shutdown—either due to an orderly shutdown or to catastrophic failures (i.e., system crashes). Both features are achieved in this module 100 by ensuring that any writes (i.e., changes) to a variable are immediately reflected both in system working memory (RAM) and in the disk file.

The information which is permanently stored by the ETS 70 includes: (1) the configuration file 110: this may be updated as and when necessary by the administrator; (2) Authorized host list file: a list of all the authorized hosts which are allowed to access this ETS; (3) Peer list file, which contains all the hosts that this ETS is allowed to access; (4) Transformation orders file: this disk file of transformation orders is updated every time any of the transformation order records change (disposed transformation orders are removed from this file and are logged in the logging subsystem) (not shown)); (5) Intermediate results files: employed for incomplete transformation orders; and (6) edgelet performance statistics.

Information which is kept only during the operation of the ETS instance includes: (1) the failed edgelet lists 528,529 of FIG. 5; (2) the failed Edge list; (3) the Adjacency and the Reachability Matrices; (4) remote transformation orders table: a lookup table of transformation requests sent by the ETS 70 to any remote ETSs; and (5) the transformation graph: a list of edges and their associated edgelets. The statistics on the edgelets are also kept both in RAM and on disk. This can be reloaded on boot-up.

Discovery of peer ETSs is accomplished through several mechanisms. First, the configuration file 110 lists the known servers (and their authentication keys and mechanisms). Second, a single known server (via the configuration file 110) can be queried for all the other servers known by it. In this case, the initiator can request that the remote server send its list of known ETSs. Thus, the single known server can lead to the discovery of the potentially full set. This, however, can be restricted (and hence the approach can fail) if an ETS is configured to not propagate such information. Third, by employing Peer-to-Peer Updating, ETSs can be authorized to send out (and receive) information about themselves and other known peers using IP multicast methods.

When an ETS instance starts up, it queries known ETS instances (however discovered) for their transformation graphs. The request can be for only local converters (i.e., edgelets that are under the direct control of the responding ETS) or global (i.e., all conversions known to the ETS). However, a global response is not mandatory (i.e., the responding ETS may be configured to only respond with local edgelets). The requesting ETS cannot infer whether a given edgelet is local or remote—the responding ETS simply guarantees that it is able to perform the corresponding conversion.

When an ETS fails (or shuts down), peer ETS instances can discover this fact directly if a multi-cast message is sent or indirectly via a non-response to a subsequent request. In either case, the receiving ETS reacts by pruning its graph of all edgelets provided by the sending ETS and, if the resulting graph has edges with no edgelets left, pruning the graph of such edges. An ETS may retain a list of failed peers that may be re-queried on need. That is, if a pruned graph results in the potential removal of an edgelet, these peers may be re-queried in the event that they were restarted between the time of failure and the present time. In all these cases, the Adjacency and Reachability Matrices are recomputed when an edge is removed (or added).

Finally, the list of known peers can be changed for any ETS by editing the configuration file 110 and sending a "reconfigure" message to the ETS 70. The details of the mechanism for sending such a message are dependent on the operating system and can range from sending a signal (on Unix type systems) to directly logging on the ETS's console and issuing a re-configure command.

In order to propagate information between ETS instances, several methods may be employed. The multicast method employs facilities in the TCP/IP protocol that enable interested and registered entities to collectively share information by transmitting only one packet instead of N−1 packets (where there are N interested and registered entities). The use of this facility employs support from the underlying operating system and the acquisition of a registered multicast address from an appropriate authority such as the Internet Assigned Numbers Authority (IANA) as the ETS multi-cast address. Each ETS desiring to send a message to other (not specifically known) peers, sends a UDP message in a specified format to this multi-cast address. Each ETS desirous of receiving such messages registers such a desire using standard TCP/IP mechanisms. Upon receipt of such a message, each ETS re-multicasts such a message if necessary. This is determined by a counter in the UDP packet (called time-to-live) which is a small integer (selected by the sending ETS) and which is decremented each time the message is propagated (e.g., when the counter reaches 0, it is no longer propagated). Since multi-cast UDP is not inherently safe (i.e., the message is not guaranteed to be delivered), these messages are simply advisory. The UDP multicast messages contain information that the sender considers valuable.

An alternative mechanism that does not rely on specialized facilities is to propagate the update information by passing a message to a limited number of "nearest" neighbors who, in turn, propagate the information to their nearest neighbors and so on. In order to bring closure to this process, a time-to-live (TTL) counter is employed, which counter is incremented on each transmission. Thus, the initial transmission might set the TTL counter to 5, the next transmission to 4, and so on. However, an ETS instance may choose not to propagate it any further and terminate it unilaterally. Otherwise, the ETS instances receiving a message with a TTL of 0 do not re-transmit and the process comes to closure.

Wrappers can be added or deleted independent of the operation of the ETS instance. Detection of wrapper addition/deletion can happen in the following ways: (1) shutdown and restart: the usual boot sequence takes care of the problem smoothly; (2) by sending a special message to the running ETS to re-initialize itself: the method of sending the message depends on the facilities provided by the underlying mechanism (Signals are used when they are available since they are easy to use in a secure manner. When they are not, authorized administrators can connect to the running ETS and explicitly issue a reinitialize command. This is, in general, more complicated and less secure than the first method.); (3) after an Edge Failure by repolling the local wrappers directory; (4) repolling the wrappers directory periodically after a fixed time interval; (5) a multicast message is sent by the peers; (6) a wrapper fails catastrophically during execution; and (7) stale cache: every time a remote ETS communicates it sends a timestamp of its last boot; if this timestamp does not match the number in the table of the local Peer Host list, then the ETS repolls the remote ETS.

Quality of Service is provided by various mechanisms. First, each converter possesses a vector of attributes. The elements of this vector can be static (i.e., they are not changed during the operation of the ETS) or dynamic (i.e., they are changed as the knowledge of the converter increases over time). Attributes can include, for example, direct cost (i.e., the amount billed for using the converter), the quality of the conversion, and the time needed for the conversion. These attributes are changed either due to data collected by the instance "automatically" or through user interaction. For example, the quality of the converter may be a "figure of merit" obtained from the evaluation of previous users of this converter.

Second, redundancy plays a role in optimal choice of converters and transformations. Diverse conversion applications have divergent behaviors when transforming files. In particular, a single transformation from type A to type B may be successfully executed by one application and fail outright when handled by another application. In addition, random factors during execution can cause a conversion to fail. Reliability is enhanced by allowing both redundant and diverse converters and ETS instances to exist at any time. In this fashion, a conversion can be repeated with one or more different converters in case of failure. Otherwise, if no converters remain, then the edge is removed from the transformation graph and a new transformation path is determined. If no such path exists, then the request cannot be satisfied (and a failure message is returned to the original requester).

Third, in addition to exploiting redundancy, the process of picking alternate converters can be used to provide a scalable service. The number of services available does not affect the transformation graph, only the pick process. Scalable services can be provided by intelligently picking a choice for a conversion service. If a service is being heavily used, then redundant services can be brought on line in order that transformations can be distributed to these alternative instances.

An important characteristic of the exemplary ETS 70 is its ability to transform data from a set of input devices in their "native" formats to other formats. The ETS 70 uses suitable combinations of one or more of original software applications, appropriate translators, or discovered optimal sequences of translators that are best suited to this transformation from source format to target format. The primary objective of providing such a service is efficient viewing, archiving, and classifying of information generated for consumption in a heterogeneous network of producers and consumers of information.

As office automation becomes more commonplace, the need for general-purpose acquisition, transformation and disposition services becomes more apparent. In particular, transformation services may be employed by all the following applications: personal document transformation, Product Data Management (PDM) systems, enterprise document management, workflow systems, e-mail, calendar software, supply-chain management, and automated voice transcriptions and delivery. Each form of software may employ a different delivery mechanism. For example, a PDM system or Document Management System (DMS) may want converted files copied to a specific location on a networked drive, while e-mail systems should receive results as e-mail packages.

As an infrastructure service, the exemplary ETS 70 has the capacity to interact with a variety of file transfer systems. The ETS treats file transfer as a necessary part of the service, and does not explicitly distinguish between an ETS instance and other clients for the purpose of file return. The results of a transformation requested by an ETS instance (or a transformation requested by a client (e.g., a user, another application)) may be returned via a wide variety of methods (e.g., e-mail, surface mail, network copy, local copy, held for future retrieval).

Engineering applications, just as in the case of office applications, have been one of an evolution of different types of applications, formats and versions over the last 20 years. Different versions of these applications have proliferated across different departments and organizations over time. Even when standards such IGES (International Graphic Exchange Standard) were used there were variations of interpretations of the standards. The problem of varied formats and versions led to the problem of inter-operability of the different applications as integrated suites of tools. The National Institute for Standards and Technology (NIST)—sponsored PDES/STEP (Product Data Exchange Standard/Standard Transfer Exchange Protocol) effort addresses this part of the interoperability problem. However, even with these standards interoperability is a vexing problem. Based on an NIST sponsored study by Research Technology Institute (RTI), the auto industry incurs about $1 billion in transformation costs and its efforts to achieve inter-operability every year in its supply chain. The costs of mitigation of translations are about $100 million, while the second order costs in terms of rework and redesign are the rest of those costs. Most of the mitigation costs are in the area of creating and using point-to-point translators manually and tuning these translators. This does not include costs of translation of office applications as there are no special efforts expended in this area, which are generally left to the individual user. Thus, the effect of the improper transformation problem in the engineering industry is very large. The exemplary ETS 70 provides the ability to manage current and future transformations by using the original applications themselves or by using existing translators and their variants to create the desired target formats for viewing, archiving and classifying engineering product information.

The medical domain also has a network of consumers and producers of information. However, the producers and consumers of information, even for a given patient, change over time, and are across several institutional and geographic boundaries. The medical domain provides an interesting set of challenges for the ETS 70 in that it requires the linkage of a number of testing and diagnostic devices such as electrocardiograph, MRI, ultrasound and x-rays. Those devices generate data and produce outputs for consumption locally. However, these pieces of information are not easily available to others outside the medical organization without either making a copy or else requesting a copy from other medical entities. In addition, there are differences in the formats and other information that are used in the exchange of information among hospitals, laboratories, doctors' offices and payers (generally insurance companies). Further, the issue of transmitting data using a secure mechanism (e.g., communication channels and encryption) makes the availability of all of the information about a patient to the consumer of the information (generally the care provider) even more complicated. Thus, the transformation and transmission of appropriate information needs to be streamlined in order to be readable through a number of delivery devices (e.g., telephones, computers, handheld devices). The exemplary ETS 70 as a transformation server can be interposed as a service between such devices and the consumers and producers of patient information. Medical information is different from engineering information as all information generated on the patient is part of the entire history of the patient, and the data, once created, does not change. Hence, any information on a patient once transformed to human readable form can be stored for future use indefinitely. This problem can be solved with the ETS 70 through easy task delivery from a repository that stores the transformed information. Again, the ETS 70 provides an infrastructure solution to medical transformation service which is critical to the distribution of patient information produced across many institutional and geographical boundaries to the appropriate information consumers.

Because of the ad hoc introduction of computers and manual archiving processes of digital documents, there is the potential loss of very large amounts of valuable information. This problem is even more acute considering the number of versions and models of machines and their software and other compatibility issues. The exemplary ETS 70 provides an infrastructure management solution where different policies of archiving along with standardized formats of storage for different classes of documents are provided as an integral part of the work process. As documents are generated, their archival mechanisms can be triggered through the ETS to insert the document in a suitable repository for immediate and indefinite availability.

Other such ETS transformation servers may be suitably customized by a particular industry to reflect the tools employed in that industry.

The same argument for the need for transformation services can be used for document/information delivery through multiple and different modes such as e-mail, web based delivery and wireless devices. In the case of specific domains, such as legal, bio-informatics and government domains, as was described for the engineering and medical domains, the exemplary ETS 70 can be suitably employed.

Spoken language translations have become an important aspect of communication because of increased globalization of Information Technology. A popular free language translator is Babelfish which can translate between a number of European languages. One can incorporate such language translators in the exemplary ETSs to convert, for example, English text to French text. This can be useful in e-mail systems which go across language borders.

Computer languages, such as, for example, Java, C, and Fortran, are also as varied as the spoken languages. Often, there is a need for translating computer software written in one language to another language to maintain compatibility. One of the simplest and often used translations is to convert a software program written in, for example, C language to the machine language (or binary code) for a specific hardware/OS platform (e.g., Linux running on an Intel x86 platform). Whenever, there is a need to manage the language translation process, the exemplary ETS can be employed to automate it.

In one embodiment of the invention, a transformation request includes a file of voice data and a unique identifier, which identifies the person, application or device which originated the voice data. Upon receipt of this transformation request, including the voice data file and the unique identifier, a selected converter at one of the ETSs obtains a voice profile from a suitable data repository (e.g., disk) and employs the voice profile and a suitable voice-to-text application to convert the voice data file to text data. The voice profile may also include disposition instructions for the original voice data file and the resulting text data file.

A voice-to-text application, such as IBM's ViaVoice, first needs to be "trained" to properly recognize a person's voice. The voice profile is an application specific representation of the typical characteristics of a particular voice. This voice profile can then be stored in some suitable data repository. So, in addition to the voice data, such a converter needs to know the voice profile of the person, application or device. The exemplary ETS employs the unique identifier to extract the correct voice profile from the repository and hand it over to the wrapper along with the voice file for conversion to text. Upon completion of the conversion to text, the ETS disposes of the result in the specified manner. Default methods of disposition of the resultant text and the original voice files can also be stored in the repository along with the voice profile data. It is likely that the format of the voice file needed by the converter may not be the same as the source of the voice data. In this case, the transformation process may need suitable conversion steps for voice format translations before conversion to text.

The voice data is often generated by a person, but in certain cases voice data may be generated (synthesized) by a device or a software application. Such devices or applications are becoming more common where voice based interfaces are becoming more common. In such a case, the unique identifier identifies the voice profile of the device or application instead of a person.

In another embodiment of the invention, one of the data formats may be a facsimile message having a predefined format, such as a laboratory medical report with a plurality of entry fields. A transformation request includes the facsimile message, a unique identifier to identify the format of the report, and a type field to define an output report having a plurality of fields. Upon receipt of this transformation request, including the facsimile message, the unique identifier and the type field, a selected converter at one of the ETSs extracts data from the entry fields of the laboratory medical report and populates the data in the fields of the output report.

Although exemplary transformations provided by the ETSs are disclosed, a wide range of transformations may be performed. For example, there may be many different combinations of wrappers. If only one edge is needed for the transformation, then the edgelet may either be remote or local with respect to the ETS. If two edges are needed for the transformation, then there are four different possibilities: (1) both edgelets are local; (2) the first edgelet is local and the second edgelet is remote; (3) the first edgelet is remote and the second edgelet is local; and (4) both edgelets are remote with respect to the ETS. Here, remote means that the edgelet is on a different ETS, which may be physically right next to the first ETS.

While for clarity of disclosure reference has been made herein to the exemplary printer 157 for displaying or outputting information, it will be appreciated that such information may be stored, computer modified, or combined with other data. All such processing shall be deemed to fall within the terms "display" or "displaying" as employed herein.

It will be appreciated that while reference has been made to the exemplary host machine 1, a wide range of other processors such as, for example, mainframe computers, mini-computers, workstations, personal computers (PCs), microcomputers, Personal Digital Assistants, and other single or multiple microprocessor-based computers may be employed.

Devices which have embedded micro-controllers such as, for example, printers and facsimile machines, and devices with embedded operating systems such as, for example, gaming-machines and MP3 music players, can also have scaled-down versions of the ETS. In this fashion, these devices can become part of the ETMS' peer network and perform suitable conversions. Thus, a transformation request may be sent directly to a printer, facsimile machine, gaming-machine, MP3 player or other device employing the ETS.

It will also be appreciated that while reference has been made to the exemplary communication network 82, a wide range of communication mechanisms between clients and ETSs may be employed such as, for example, a local area network (LAN), a wide area network (WAN), intranet, extranet, global communication network, wireless communication system or network, and the Internet.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A data transformation system for use in a heterogeneous computer system, said data transformation system comprising:
at least one client adapted to initiate a request for transformation of data in a first data format to data in a second data format;
a plurality of peer transformation servers, each of said transformation servers including a plurality of data converters and a representation of available data transformations between a plurality of input data formats associated with at least some of said transformation servers and a plurality of output data formats associated with at least some of said transformation servers, said representation including a plurality of unidirectional edges, with each one of said edges extending from one of said input and output data formats to another of said input and output data formats, said transformation servers collectively including at least one of said data converters for each of said edges, at least one of said transformation servers adapted to receive said request for transformation of data, select at least one intermediate data format from a plurality of different intermediate data formats and select at least one intermediate data transformation from said first data format to said selected at least one intermediate data format and a final data transformation from a final one of said selected at least one intermediate data format to said second data format, with each of said intermediate and final data transformations being associated with a corresponding one of said edges, said at least one of said transformation servers adapted to initiate a plurality of said data converters corresponding to said selected intermediate and final data transformations, in order to obtain said data in the second data format, and dispose said data in the second data format; and
a communication network adapted to provide communication among said transformation servers and said client.

2. A data transformation system for use in a heterogeneous computer system, said data transformation system comprising:
at least one client adapted to initiate a request for transformation of data in a first data format to data in a second data format;
a plurality of peer transformation servers, each of said transformation servers including a plurality of data converters and a representation of available data transformations between a plurality of input data formats associated with at least some of said transformation servers and a plurality of output data formats associated with at least some of said transformation servers, said representation including a plurality of unidirectional edges, with each one of said edges extending from one of said input and output data formats to another of said input and output data formats, said transformation servers collectively including at least one of said data converters for each of said edges, at least one of said transformation servers adapted to receive said request for transformation of data and select at least one intermediate data transformation from said first data format to at least one intermediate data format and a final data transformation from said intermediate data format to said second data format, with each of said intermediate and final data transformations being associated with a corresponding one of said edges, said at least one of said transformation servers adapted to initiate a plurality of said data converters corresponding to said selected intermediate and final data transformations, in order to obtain said data in the second data format, and dispose said data in the second data format; and a communication network adapted to provide communication among said transformation servers and said client, wherein each of said transformation servers further includes a matrix having said input data formats, said output data formats and a value for each pair of said input and output data formats, said value representing whether a data transformation from said input data format to said output data format of said pair is feasible; and wherein said one of said transformation servers accesses said matrix of said one of said transformation servers to determine if said request for a transformation of data is feasible before selecting said intermediate and final data transformations.

3. The data transformation system of claim 2 wherein said matrix is a reachability matrix.

4. The data transformation system of claim 1 wherein said one of said transformation servers employs a breadth-first search to select said intermediate and final data transformations.

5. The data transformation system of claim 4 wherein said one of said transformation servers includes an adjacency matrix having said input data formats, said output data formats and a value for each pair of said input and output data formats, said value representing whether a data transformation directly from said input data format to said output data format of said pair is possible; and wherein said one of said transformation servers further includes a routine to convert said adjacency matrix to said reachability matrix.

6. The data transformation system of claim 1 wherein said transformation servers further collectively include a plurality of said data converters for at least one of said edges; and wherein said one of said transformation servers selects and initiates one of said plurality of data converters for said at least one of said edges.

7. The data transformation system of claim 6 wherein said transformation servers include a first transformation server and a second transformation server, said first transformation server includes a first data converter for one of said edges, said second transformation server includes a second data converter for said one of said edges; and wherein said one of said transformation servers includes an algorithm to evaluate and select one of said first and second data converters for said one of said edges.

8. The data transformation system of claim 7 wherein each of said first and second data converters has a cost associated with said one of said edges; and wherein said algorithm evaluates the costs of said first and second data converters to select one of said first and second data converters for said one of said edges.

9. The data transformation system of claim 7 wherein each of said first and second data converters has a time duration associated with said one of said edges; and wherein said algorithm evaluates the time durations of said first and second data converters to select one of said first and second data converters for said one of said edges.

10. The data transformation system of claim 7 wherein each of said first and second data converters has a quality value associated with said one of said edges; and wherein said algorithm evaluates the quality values of said first and second data converters to select one of said first and second data converters for said one of said edges.

11. The data transformation system of claim 7 wherein each of said first and second data converters has a conversion performance vector associated with said one of said edges; and wherein said algorithm evaluates the conversion performance vectors of said first and second data converters to select one of said first and second data converters for said one of said edges.

12. The data transformation system of claim 11 wherein said conversion performance vector includes a plurality of attributes, which are selected from the list comprising: a count of conversion failures by a corresponding one of said data converters, whether said corresponding one of said data converters is local or remote with respect to said one of said transformation servers, a value representing quality of conversion by said corresponding one of said data converters, and a size of a file to be converted by said corresponding one of said data converters.

13. The data transformation system of claim 11 wherein said conversion performance vector includes a direct cost attribute, a quality attribute and a time duration attribute, with each of said attributes having a weight value associated therewith.

14. The data transformation system of claim 13 wherein at least one of said attributes has a static value.

15. The data transformation system of claim 13 wherein at least one of said attributes has a dynamic value.

16. The data transformation system of claim 6 wherein said transformation servers include a first transformation server, a second transformation server and a third transformation server, said first transformation server includes a first data converter for one of said edges, said second transformation server includes a second data converter for said one of said edges, said third transformation server includes a third data converter for said one of said edges; wherein said third transformation server is offline; and wherein said one of said transformation servers includes an algorithm to evaluate and select one of said first and second data converters for said one of said edges.

17. The data transformation system of claim 1 wherein said client is a transformation server.

18. The data transformation system of claim 1 wherein said communication network is a computer network; and wherein said client is a computer communicating on said computer network.

19. The data transformation system of claim 1 wherein said transformation servers include a first transformation server and a second transformation server, said first transformation server includes a set of data converters for at least some of said edges, said second transformation server includes a corresponding set of said data converters for said at least some of said edges; and wherein said one of said transformation servers includes an algorithm to evaluate and select from the data converters of said set and the data converters of said corresponding set.

20. The data transformation system of claim 19 wherein each of said first and second data converters has a conversion performance vector associated with said one of said edges; and wherein said algorithm evaluates the conversion performance vectors of said first and second data converters to select one of said first and second data converters for said one of said edges.

21. The data transformation system of claim 19 wherein said one of said transformation servers is said first transformation server; and wherein said first transformation server includes a first routine to invoke a data converter of said first transformation server, and a second routine to invoke a data converter remote from said first transformation server and associated with said second transformation server.

22. The data transformation system of claim 1 wherein said first and second data formats are selected from the list comprising a file, facsimile data, scanned data, and image data.

23. The data transformation system of claim 1 wherein at least one of said first and second data formats is an application specific format.

24. The data transformation system of claim 1 wherein at least one of said first and second data formats is a hard copy.

25. The data transformation system of claim 1 wherein at least one of said first and second data formats is selected from the list comprising HTML, RTF, facsimile data, scanned data, image data, and printed data.

26. The data transformation system of claim 1 wherein said first and second data formats are selected from the list of data formats comprising a file, facsimile data, scanned data, image data, an application specific format, a hard copy, HTML, and RTF; and wherein said one of said transformation servers acquires said data in said first data format in one of said data formats and disposes said data in said second data format in a different one of said data formats.

27. The data transformation system of claim 1 wherein said request includes a data file in said first data format, a definition of said second data format, and an instruction for disposing said data in the second data format.

28. The data transformation system of claim 27 wherein said instruction is selected from the list comprising: holding said data in the second data format for a predetermined time for subsequent retrieval of said data in the second data format and opening a connection on said communication network between said client and said one of said transformation servers before returning said data in the second data format to said client, returning said data in the second data format by opening a connection between said one of said transformation servers and said client before returning said data in the second data format to said client, keeping a connection open on said communication network between said client and said one of said transformation servers until after receiving said data in the second data format, mailing said data in the second data format, and copying said data in the second data format.

29. The data transformation system of claim 28 wherein said instruction is mailing said data in the second data format in an electronic mail message over said communication network.

30. The data transformation system of claim 28 wherein said one of said transformation servers has disk storage; and wherein said instruction is copying said data in the second data format to said disk storage.

31. The data transformation system of claim 28 wherein one of said transformation servers has disk storage; and wherein said instruction is copying said data in the second data format to said disk storage over said communication network.

32. The data transformation system of claim 1 wherein said at least one client includes a plurality of client applications and a plurality of transformation servers; and wherein said one of said transformation servers includes a routine for receiving requests from each of said client applications and transformation servers, and a queue for storing said received requests.

33. The data transformation system of claim 1 wherein said data in a first data format was created by an application; and wherein said one of said transformation servers initiates at least one data converter including a corresponding application to obtain said data in the second data format.

34. The data transformation system of claim 1 wherein said data in a first data format was created by a first application; and wherein said one of said transformation servers initiates at least one data converter including a different second application to obtain said data in the second data format.

35. The data transformation system of claim 1 wherein said data in a first data format was created by a first application; wherein said one of said transformation servers initiates at least one data converter including a corresponding first application to obtain data in said selected at least one intermediate data format, and initiates at least one data converter including a second different application to obtain said data in said second data format.

36. The data transformation system of claim 35 wherein said one of said transformation servers includes an algorithm to evaluate and select said at least one data converter including a corresponding first application and said at least one data converter including a second different application.

37. The data transformation system of claim 35 wherein some of said data converters are remote from said one of said transformation servers; and wherein said one of said transformation servers includes a routine to invoke said remote data converters.

38. The data transformation system of claim 35 wherein some of said data converters are local to said one of said transformation servers; and wherein said one of said transformation servers includes a routine to invoke said local data converters.

39. The data transformation system of claim 35 wherein a first set of said data converters are remote from said one of said transformation servers, and a second set of said data converters are local to said one of said transformation servers; and wherein said one of said transformation servers includes an algorithm to evaluate and select some of said first and second sets of said data converters, a routine to invoke one of the first set of said data converters, and a routine to invoke one of the second set of said data converters.

40. The data transformation system of claim 39 wherein said edges include a first edge, a second edge and a third edge; wherein said transformation servers include a first transformation server having a first data converter for the first edge, and a second transformation server having a second data converter for the second edge, said first and second transformation servers being remote from said one of said transformation servers, which has a third data converter for the third edge; and wherein said algorithm evaluates and selects the first data converter in the first transformation server, the second data converter in the second transformation server, and the third data converter in said one of said transformation servers.

41. A method for transforming data in a heterogeneous computer system, said method comprising the steps of:
  initiating a request for transformation of data in a first data format to data in a second data format;
  communicating said request over a communication network;
  receiving said request in one of a plurality of peer transformation servers;
  including with each of said peer transformation servers a plurality of data converters and a representation of data transformations between a plurality of input data formats associated with at least some of said peer transformation servers and a plurality of output data formats associated with at least some of said peer transformation servers;
including with said representation a plurality of unidirectional edges, with each one of said edges extending from one of said input and output data formats to another of said input and output data formats;
providing at least one of said data converters for each of said edges;
selecting at least one intermediate data format from a plurality of different intermediate data formats;
selecting at least one intermediate data transformation from said first data format to said selected at least one intermediate data format;
selecting a final data transformation from a final one of said selected at least one intermediate data format to said second data format;
initiating a plurality of said data converters corresponding to said selected intermediate and final data transformations, in order to obtain said data in the second data format; and
disposing said data in the second data format.

42. The method of claim 41 further comprising:
including with each of said data converters a wrapper and at least one of an application and a device; and
employing a common application programming interface to a corresponding one of said peer transformation servers with each of said wrappers.

43. The method of claim 42 further comprising:
employing a script as one of said wrappers.

44. The method of claim 42 further comprising:
requesting interaction by a human being from one of said wrappers.

45. The method of claim 44 further comprising:
employing hard copy as said second data format;
printing said hard copy; and
requesting disposition of said hard copy by said human being.

46. The method of claim 41 further comprising:
employing a data file as said second data format; and
sending said data file over said communication network.

47. The method of claim 46 further comprising:
sending said data file as part of an electronic mail message.

48. The method of claim 46 further comprising:
receiving said sent data file from said communication network; and
displaying said received data file.

49. The method of claim 48 further comprising:
printing said received data file.

50. The method of claim 41 further comprising:
sending a status request regarding said request for transformation of data over said communication network;
receiving said status request; and
returning a current status of said requested transformation over said communication network.

51. The method of claim 41 further comprising:
sending a request to cancel said request for transformation of data over said communication network;
receiving said request to cancel; and
canceling said requested transformation.

52. The method of claim 41 further comprising:
including with said request for transformation of data a source type to define said first data format, a destination type to define to said second data format; a file of said data in said first data format, and disposition instructions for said data in said second data format; and
communicating said source type, said destination type, said file, and said disposition instructions over said communication network.

53. The method of claim 41 further comprising:
including with each of said data converters a wrapper and at least one of an application and a device;
employing a configuration file in a local transformation server to define a plurality of remote transformation servers; and
polling at least some of said remote transformation servers to determine a list of available wrappers.

54. The method of claim 41 further comprising:
adding another data converter to one of said peer transformation servers for one of said edges;
maintaining a constant representation of said edges; and
defining for said one of said edges at least two edgelets corresponding to a previous data converter and said added data converter for said one of said edges.

55. The method of claim 54 further comprising:
evaluating costs associated with said at least two edgelets; and
selecting one of said data converters corresponding to one of said edgelets having the least cost.

56. The method of claim 41 further comprising:
detecting a failure of one of said data converters; and
invoking an alternative one of said data converters.

57. The method of claim 41 further comprising:
deleting one of said edges; and
recomputing said representation.

58. The method of claim 41 further comprising:
detecting a failure of one of said data converters;
reselecting at least one intermediate data transformation from said first data format to at least one intermediate data format;
reselecting a final data transformation from said reselected intermediate data format to said second data format; and
reinitiating a plurality of said data converters corresponding to said reselected intermediate and final data transformations, in order to obtain said data in the second data format.

59. The method of claim 41 further comprising:
detecting a failure of one of said data converters;
polling at least some of said peer transformation servers to locate a data converter corresponding to said failed one of said data converters;
reselecting at least one intermediate data transformation from said first data format to at least one intermediate data format;
reselecting a final data transformation from said reselected intermediate data format to said second data format; and
reinitiating a plurality of said data converters corresponding to said reselected intermediate and final data transformations, in order to obtain said data in the second data format.

60. The method of claim 41 further comprising:
employing a conversion performance vector associated with one of said edges;
including with said conversion performance vector a plurality of attributes and a plurality of weight values;
employing a file having a file-size and one of said input and output electronic formats;
employing as one of said attributes a cost which is a function of said file-size and the data converters for said one of said edges; and evaluating the conversion performance vector to select one of said data converters for said one of said edges.

61. The method of claim 41 further comprising:
initiating a request for transformation of data in a third data format to data in a fourth data format;
selecting one data transformation from said third data format to said fourth data format;
initiating one of said data converters corresponding to said selected one data transformation, in order to obtain said data in the fourth data format; and
disposing said data in the fourth electronic format.

62. The method of claim 41 further comprising:
employing a first transformation server including a first data converter for one of said edges;
employing a second transformation server including a second data converter for another one of said edges; and
initiating said first and second data converters, in order to obtain said data in the second electronic format.

63. The method of claim 41 further comprising:
employing a first transformation server including a first data converter for one of said edges and a second data converter for another one of said edges; and
initiating said first and second data converters, in order to obtain said data in the second electronic format.

64. A method for transforming data in a heterogeneous computer system, said method comprising the steps of:
initiating a request for transformation of data in a first data format to data in a second data format;
communicating said request over a communication network;
receiving said request in one of a plurality of peer transformation servers;
including with each of said peer transformation servers a plurality of data converters and a representation of data transformations between a plurality of input data formats associated with at least some of said peer transformation servers and a plurality of output data formats associated with at least some of said peer transformation servers;
including with said representation a plurality of unidirectional edges, with each one of said edges extending from one of said input and output data formats to another of said input and output data formats;
providing at least one of said data converters for each of said edges;
selecting at least one intermediate data transformation from said first data format to at least one intermediate data format;
selecting a final data transformation from said intermediate data format to said second data format;
initiating a plurality of said data converters corresponding to said selected intermediate and final data transformations, in order to obtain said data in the second data format;
disposing said data in the second data format; and
determining if said request for a transformation of data is feasible before selecting said intermediate and final data transformations.

65. A method for transforming data in a heterogeneous computer system, said method comprising the steps of:
initiating a request for transformation of data in a first data format to data in a second data format;
communicating said request over a communication network;
receiving said request in one of a plurality of peer transformation servers;
including with each of said peer transformation servers a plurality of data converters and a representation of data transformations between a plurality of input data formats associated with at least some of said peer transformation servers and a plurality of output data formats associated with at least some of said peer transformation servers;
including with said representation a plurality of unidirectional edges, with each one of said edges extending from one of said input and output data formats to another of said input and output data formats;
providing at least one of said data converters for each of said edges;
selecting at least one intermediate data transformation from said first data format to at least one intermediate data format;
selecting a final data transformation from said intermediate data format to said second data format;
initiating a plurality of said data converters corresponding to said selected intermediate and final data transformations, in order to obtain said data in the second data format;
disposing said data in the second data format;
employing a file of voice data;
employing a unique identifier, which identifies a person, application or device which originated the voice data;
including said file of voice data and said unique identifier with said request for transformation of data;
accessing a voice profile based upon said unique identifier; and
employing said voice profile to convert said file of voice data to text data.

* * * * *

UNITED STATES PATENT AND TRADEMARK OFFICE
CERTIFICATE OF CORRECTION

PATENT NO. : 7,065,588 B2 Page 1 of 1
APPLICATION NO. : 09/928256
DATED : June 20, 2006
INVENTOR(S) : Suresh L. Konda, Michael Collins and Pranab K. Nag It is certified that error appears in the above-identified patent and that said Letters Patent is hereby corrected as shown below:

Col. 3, line 9 "a priori" should eb italicized --*a priori*--.

Col. 24, line 41, "$r_{1j}$" should read --$r_{ij}$--.

Col. 24, line 51, "$t_{1j}$" should read --$t_{ij}$--.

Col. 24, line 52, "$t_{1j} = r_{1j}$ OR ($r_{1k}$ AND $r_{kj}$)" should read --$t_{ij} = r_{ij}$ OR ($r_{ik}$ AND $r_{kj}$)--.

Signed and Sealed this

Ninth Day of January, 2007

JON W. DUDAS
*Director of the United States Patent and Trademark Office*